United States Patent
Xu et al.

(10) Patent No.: US 12,452,869 B2
(45) Date of Patent: Oct. 21, 2025

(54) INDICATION OF UNUSED UPLINK SHARED CHANNEL OCCASIONS

(71) Applicant: QUALCOMM Incorporated, San Diego, CA (US)

(72) Inventors: Huilin Xu, Temecula, CA (US); Ahmed Elshafie, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 18/184,760

(22) Filed: Mar. 16, 2023

(65) Prior Publication Data

US 2024/0314787 A1 Sep. 19, 2024

(51) Int. Cl.
*H04W 72/02* (2009.01)
*H04W 72/21* (2023.01)

(52) U.S. Cl.
CPC .................................. *H04W 72/21* (2023.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56

See application file for complete search history.

(56) References Cited

U.S. PATENT DOCUMENTS

2022/0183061 A1* 6/2022 Wang ................ H04W 74/0808
2023/0041108 A1* 2/2023 Zhang ................... H04W 72/23

* cited by examiner

*Primary Examiner* — Bo Hui A Zhu
(74) *Attorney, Agent, or Firm* — Holland & Hart LLP

(57) ABSTRACT

Methods, systems, and devices for wireless communications are described. In some wireless communication systems, a user equipment (UE) may receive control signaling indicating a set of uplink shared channel occasions within a configured grant period. Each uplink shared channel occasion may include a set of slots for transmitting an uplink shared channel message (e.g., repetitions of the uplink shared channel message or a transport block). The UE may transmit the uplink shared channel message in the set of slots of a first uplink shared channel occasion of the uplink shared channel occasions in accordance with the control information. The UE may transmit an uplink control information message indicating that one or more slots of the set of slots are unused. The one or more unused slots of the first uplink shared channel occasion may be skipped during the configured grant period.

27 Claims, 22 Drawing Sheets

INDICATION OF UNUSED UPLINK SHARED CHANNEL OCCASIONS

FIELD OF TECHNOLOGY

The following relates to wireless communications, including indication of unused uplink shared channel occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support indication of unused uplink shared channel occasions. For example, the described techniques provide for a user equipment (UE) receiving control signaling indicating a set of one or more uplink shared channel occasions within a configured grant period. Additionally, the control signaling may also enable DMRS bundling. Each uplink shared channel occasion may include a plurality of slots for transmitting an uplink shared channel message (e.g., repetitions of the uplink shared channel message or a transport block). The UE may transmit the uplink shared channel message using the set of slots of a first uplink shared channel occasion of the set of uplink shared channel occasions in accordance with the control information. In some examples, the UE may transmit uplink control information (UCI) indicating that one or more slots of the set of slots are unused. The one or more unused slots of the first uplink shared channel occasion may be skipped during the configured grant period.

A method for wireless communication at a UE is described. The method may include receiving control information indicating a plurality of uplink shared channel occasions within a configured grant period, where each uplink shared channel occasion of the set of multiple uplink shared channel occasions includes a set of multiple slots for transmitting a set of multiple uplink shared channel repetitions, transmitting the set of multiple uplink shared channel repetitions in the set of multiple slots of a first uplink shared channel occasion of the set of multiple uplink shared channel occasions in accordance with the received control information, and transmit UCI indicating that one or more slots of the set of multiple slots of the first uplink shared channel occasion are unused, where the one or more unused slots of the first uplink shared channel occasion are skipped during the configured grant period.

An apparatus for wireless communication at a UE is described. The apparatus may include a processor, memory coupled with the processor, and instructions stored in the memory. The instructions may be executable by the processor to cause the apparatus to receive control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions, transmit the set of multiple uplink shared channel repetitions in the set of multiple slots of a first uplink shared channel occasion of the set of multiple uplink shared channel occasions in accordance with the received control information, and transmit UCI indicating that one or more slots of the set of multiple slots of the first uplink shared channel occasion are unused, where the one or more unused slots of the first uplink shared channel occasion are skipped during the configured grant period.

Another apparatus for wireless communication at a UE is described. The apparatus may include means for receiving control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions, means for transmitting the set of multiple uplink shared channel repetitions in the set of multiple slots of a first uplink shared channel occasion of the set of multiple uplink shared channel occasions in accordance with the received control information, and means for transmit UCI indicating that one or more slots of the set of multiple slots of the first uplink shared channel occasion are unused, where the one or more unused slots of the first uplink shared channel occasion are skipped during the configured grant period.

A non-transitory computer-readable medium storing code for wireless communication at a UE is described. The code may include instructions executable by a processor to receive control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions, transmit the set of multiple uplink shared channel repetitions in the set of multiple slots of a first uplink shared channel occasion of the set of multiple uplink shared channel occasions in accordance with the received control information, and transmit UCI indicating that one or more slots of the set of multiple slots of the first uplink shared channel occasion are unused, where the one or more unused slots of the first uplink shared channel occasion are skipped during the configured grant period.

In some examples of the method, apparatuses, and non-transitory computer-readable medium described herein, transmitting the UCI may include operations, features, means, or instructions for transmitting, via the UCI, a bit indicating that each slot of the set of multiple slots of the first uplink shared channel occasion of the set of multiple uplink shared channel occasions may be unused for transmitting the set of multiple uplink shared channel repetitions associated with the first uplink shared channel occasion.

In some examples of the method, apparatuses, and non-transitory computer-readable medium described herein, transmitting the UCI may include operations, features, means, or instructions for transmitting, via the UCI, a bit indicating that a first slot of the first uplink shared channel occasion or a first repetition resource of the first uplink shared channel occasion may be unused for transmitting a first uplink shared channel repetition of the set of multiple uplink shared channel repetitions associated with the first uplink shared channel occasion.

In some examples of the method, apparatuses, and non-transitory computer-readable medium described herein, the UCI indicates that a resource block of a set of multiple resource blocks of the first slot or the first repetition resource may be unused for transmitting the first uplink shared channel repetition of the set of multiple uplink shared channel repetitions associated with the first uplink shared channel occasion.

In some examples of the method, apparatuses, and non-transitory computer-readable medium described herein, the UCI indicates that a resource block of a set of multiple resource blocks may be unused for transmitting the set of multiple uplink shared channel repetitions via the one or more slots of the set of multiple slots in the first uplink shared channel occasion.

In some examples of the method, apparatuses, and non-transitory computer-readable medium described herein, transmitting the UCI may include operations, features, means, or instructions for transmitting, via the UCI, a bit indicating that a group of slots of the first uplink shared channel occasion or a group of repetition resources of the first uplink shared channel occasion may be unused for transmitting the set of multiple uplink shared channel repetitions associated with the first uplink shared channel occasion.

Some examples of the method, apparatuses, and non-transitory computer-readable medium described herein may further include operations, features, means, or instructions for receiving a control message triggering the UE to transmit the UCI indicating that each slot of the first uplink shared channel occasion may be unused, a first slot of the first uplink shared channel occasion may be unused, a first repetition resource of the first uplink shared channel occasion may be unused, a group of slots of the first uplink shared channel occasion may be unused, a group of repetition resources of the first uplink shared channel occasion may be unused, or any combination thereof.

Some examples of the method, apparatuses, and non-transitory computer-readable medium described herein may further include operations, features, means, or instructions for transmitting a capability message indicating a capability of the UE to transmit the UCI indicating that each slot of the first uplink shared channel occasion may be unused, a first slot of the first uplink shared channel occasion may be unused, a first repetition resource of the first uplink shared channel occasion may be unused, a group of slots of the first uplink shared channel occasion may be unused, a group of repetition resources of the first uplink shared channel occasion may be unused, or any combination thereof.

In some examples of the method, apparatuses, and non-transitory computer-readable medium described herein, the capability message indicates the capability of the UE to transmit the UCI indicating that each slot of the first uplink shared channel occasion may be unused based on a power level of the UE satisfying a power level threshold, a complexity level of the UE, a UE type, or any combination thereof.

A method for wireless communication at a network entity is described. The method may include transmitting control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions, receiving the set of multiple uplink shared channel repetitions in the set of multiple slots of a first uplink shared channel occasion of the set of multiple uplink shared channel occasions in accordance with the transmitted control information, and receiving UCI indicating that one or more slots of the set of multiple slots of the first uplink shared channel occasion are unused, where the one or more unused slots of the first uplink shared channel occasion are skipped during the configured grant period.

An apparatus for wireless communication at a network entity is described. The apparatus may include a processor, memory coupled with the processor, and instructions stored in the memory. The instructions may be executable by the processor to cause the apparatus to transmit control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions, receive the set of multiple uplink shared channel repetitions in the set of multiple slots of a first uplink shared channel occasion of the set of multiple uplink shared channel occasions in accordance with the transmitted control information, and receive UCI indicating that one or more slots of the set of multiple slots of the first uplink shared channel occasion are unused, where the one or more unused slots of the first uplink shared channel occasion are skipped during the configured grant period.

Another apparatus for wireless communication at a network entity is described. The apparatus may include means for transmitting control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions, means for receiving the set of multiple uplink shared channel repetitions in the set of multiple slots of a first uplink shared channel occasion of the set of multiple uplink shared channel occasions in accordance with the transmitted control information, and means for receiving UCI indicating that one or more slots of the set of multiple slots of the first uplink shared channel occasion are unused, where the one or more unused slots of the first uplink shared channel occasion are skipped during the configured grant period.

A non-transitory computer-readable medium storing code for wireless communication at a network entity is described. The code may include instructions executable by a processor to transmit control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions, receive the set of multiple uplink shared channel repetitions in the set of multiple slots of a first uplink shared channel occasion of the set of multiple uplink shared channel occasions in accordance with the transmitted control information, and receive UCI indicating that one or more slots of the set of multiple slots of the first uplink shared channel occasion are unused, where the one or more unused slots of the first uplink shared channel occasion are skipped during the configured grant period.

In some examples of the method, apparatuses, and non-transitory computer-readable medium described herein, receiving the UCI may include operations, features, means, or instructions for receiving, via the UCI, a bit indicating that each slot of the set of multiple slots of the first uplink shared channel occasion of the set of multiple uplink shared channel occasions may be unused for transmitting the set of multiple uplink shared channel repetitions associated with the first uplink shared channel occasion.

In some examples of the method, apparatuses, and non-transitory computer-readable medium described herein, receiving the UCI may include operations, features, means, or instructions for receiving, via the UCI, a bit indicating that a first slot of the first uplink shared channel occasion or a first repetition resource of the first uplink shared channel occasion may be unused for transmitting a first uplink shared channel repetition of the set of multiple uplink shared channel repetitions associated with the first uplink shared channel occasion.

In some examples of the method, apparatuses, and non-transitory computer-readable medium described herein, the UCI indicates that a resource block of a set of multiple resource blocks of the first slot or a first repetition resource may be unused for transmitting the first uplink shared channel repetition of the set of multiple uplink shared channel repetitions associated with the first uplink shared channel occasion.

In some examples of the method, apparatuses, and non-transitory computer-readable medium described herein, the UCI indicates that a resource block of a set of multiple resource blocks may be unused for transmitting the set of multiple uplink shared channel repetitions via one or more slots of a set of multiple slots in the first uplink shared channel occasion.

In some examples of the method, apparatuses, and non-transitory computer-readable medium described herein, receiving the UCI may include operations, features, means, or instructions for receiving, via the UCI, a bit indicating that a group of slots of the first uplink shared channel occasion or a group of repetition resources of the first uplink shared channel occasion may be unused for transmitting the set of multiple uplink shared channel repetitions associated with the first uplink shared channel occasion.

Some examples of the method, apparatuses, and non-transitory computer-readable medium described herein may further include operations, features, means, or instructions for transmitting a control message triggering a UE to transmit the UCI indicating that each slot of the first uplink shared channel occasion may be unused, a first slot of the first uplink shared channel occasion may be unused, a group of slots of the first uplink shared channel occasion may be unused, or any combination thereof.

Some examples of the method, apparatuses, and non-transitory computer-readable medium described herein may further include operations, features, means, or instructions for receiving a capability message indicating a capability of a UE to transmit the UCI indicating that each slot of the first uplink shared channel occasion may be unused, a first slot of the first uplink shared channel occasion may be unused, a first repetition resource of the first uplink shared channel occasion may be unused, a group of slots of the first uplink shared channel occasion may be unused, a group of repetition resources of the first uplink shared channel occasion may be unused, or any combination thereof.

In some examples of the method, apparatuses, and non-transitory computer-readable medium described herein, the capability message indicates the capability of the UE to transmit the UCI indicating that each slot of the first uplink shared channel occasion may be unused based on a power level of the UE satisfying a power level threshold, a complexity level of the UE, or a UE type, or any combination thereof.

A method for wireless communications at a UE is described. The method may include receiving control information indicating a set of multiple uplink shared channel occasions within a configured grant period, where each uplink shared channel occasion of the set of multiple uplink shared channel occasions includes a set of multiple slots for transmitting a transport block, transmitting a first transport block in the set of multiple slots of a first uplink shared channel occasion of the set of multiple uplink shared channel occasions in accordance with the received control information, and transmitting UCI indicating that one or more slots of the set of multiple slots of the first uplink shared channel occasion are unused, where the one or more unused slots of the first uplink shared channel occasion are skipped during the configured grant period.

An apparatus for wireless communications at a UE is described. The apparatus may include a processor, memory coupled with the processor, and instructions stored in the memory. The instructions may be executable by the processor to cause the apparatus to receive control information indicating a set of multiple uplink shared channel occasions within a configured grant period, where each uplink shared channel occasion of the set of multiple uplink shared channel occasions includes a set of multiple slots for transmitting a transport block, transmit a first transport block in the set of multiple slots of a first uplink shared channel occasion of the set of multiple uplink shared channel occasions in accordance with the received control information, and transmit UCI indicating that one or more slots of the set of multiple slots of the first uplink shared channel occasion are unused, where the one or more unused slots of the first uplink shared channel occasion are skipped during the configured grant period.

Another apparatus for wireless communications at a UE is described. The apparatus may include means for receiving control information indicating a set of multiple uplink shared channel occasions within a configured grant period, where each uplink shared channel occasion of the set of multiple uplink shared channel occasions includes a set of multiple slots for transmitting a transport block, means for transmitting a first transport block in the set of multiple slots of a first uplink shared channel occasion of the set of multiple uplink shared channel occasions in accordance with the received control information, and means for transmitting UCI indicating that one or more slots of the set of multiple slots of the first uplink shared channel occasion are unused, where the one or more unused slots of the first uplink shared channel occasion are skipped during the configured grant period.

A non-transitory computer-readable medium storing code for wireless communications at a UE is described. The code may include instructions executable by a processor to receive control information indicating a set of multiple uplink shared channel occasions within a configured grant period, where each uplink shared channel occasion of the set of multiple uplink shared channel occasions includes a set of multiple slots for transmitting a transport block, transmit a first transport block in the set of multiple slots of a first uplink shared channel occasion of the set of multiple uplink shared channel occasions in accordance with the received control information, and transmit UCI indicating that one or more slots of the set of multiple slots of the first uplink shared channel occasion are unused, where the one or more unused slots of the first uplink shared channel occasion are skipped during the configured grant period.

In some examples of the method, apparatuses, and non-transitory computer-readable medium described herein, transmitting the UCI may include operations, features, means, or instructions for transmitting, via the UCI, a bit indicating that each slot of the set of multiple slots of the first uplink shared channel occasion of the set of multiple uplink shared channel occasions may be unused for transmitting the first transport block associated with the first uplink shared channel occasion.

In some examples of the method, apparatuses, and non-transitory computer-readable medium described herein, transmitting the UCI may include operations, features, means, or instructions for transmitting, via the UCI, a bit indicating that a first slot of the first uplink shared channel occasion may be unused for transmitting the first transport block associated with the first uplink shared channel occasion.

A method for wireless communications at a network entity is described. The method may include transmitting control information indicating a set of multiple uplink shared channel occasions within a configured grant period, where each uplink shared channel occasion of the set of multiple uplink shared channel occasions includes a set of multiple slots for transmitting a transport block, receiving a first transport block in the set of multiple slots of a first uplink shared channel occasion of the set of multiple uplink shared channel occasions in accordance with the transmitted control information, and receiving UCI indicating that one or more slots of the set of multiple slots of the first uplink shared channel occasion are unused, where the one or more unused slots of the first uplink shared channel occasion are skipped during the configured grant period.

An apparatus for wireless communications at a network entity is described. The apparatus may include a processor, memory coupled with the processor, and instructions stored in the memory. The instructions may be executable by the processor to cause the apparatus to transmit control information indicating a set of multiple uplink shared channel occasions within a configured grant period, where each uplink shared channel occasion of the set of multiple uplink shared channel occasions includes a set of multiple slots for transmitting a transport block, receive a first transport block in the set of multiple slots of a first uplink shared channel occasion of the set of multiple uplink shared channel occasions in accordance with the transmitted control information, and receive UCI indicating that one or more slots of the set of multiple slots of the first uplink shared channel occasion are unused, where the one or more unused slots of the first uplink shared channel occasion are skipped during the configured grant period.

Another apparatus for wireless communications at a network entity is described. The apparatus may include means for transmitting control information indicating a set of multiple uplink shared channel occasions within a configured grant period, where each uplink shared channel occasion of the set of multiple uplink shared channel occasions includes a set of multiple slots for transmitting a transport block, means for receiving a first transport block in the set of multiple slots of a first uplink shared channel occasion of the set of multiple uplink shared channel occasions in accordance with the transmitted control information, and means for receiving UCI indicating that one or more slots of the set of multiple slots of the first uplink shared channel occasion are unused, where the one or more unused slots of the first uplink shared channel occasion are skipped during the configured grant period.

A non-transitory computer-readable medium storing code for wireless communications at a network entity is described. The code may include instructions executable by a processor to transmit control information indicating a set of multiple uplink shared channel occasions within a configured grant period, where each uplink shared channel occasion of the set of multiple uplink shared channel occasions includes a set of multiple slots for transmitting a transport block, receive a first transport block in the set of multiple slots of a first uplink shared channel occasion of the set of multiple uplink shared channel occasions in accordance with the transmitted control information, and receive UCI indicating that one or more slots of the set of multiple slots of the first uplink shared channel occasion are unused, where the one or more unused slots of the first uplink shared channel occasion are skipped during the configured grant period.

In some examples of the method, apparatuses, and non-transitory computer-readable medium described herein, receiving the UCI may include operations, features, means, or instructions for receiving, via the UCI, a bit indicating that each slot of the set of multiple slots of the first uplink shared channel occasion of the set of multiple uplink shared channel occasions in unused for transmitting the first transport block associated with the first uplink shared channel occasion.

In some examples of the method, apparatuses, and non-transitory computer-readable medium described herein, receiving the UCI may include operations, features, means, or instructions for transmitting, via the UCI, a bit indicating that a first slot of the first uplink shared channel occasion may be unused for transmitting the first transport block associated with the first uplink shared channel occasion.

A method for wireless communications at a UE is described. The method may include receiving control information indicating an enabling DMRS bundling for a set of multiple uplink shared channel occasions within a configured grant period, where each uplink shared channel occasion of the set of multiple uplink shared channel occasions includes a set of one or more slots for transmitting a set of multiple uplink shared channel repetitions, and where the DMRS bundling is based on a phase continuity between the set of slots, transmitting the set of multiple uplink shared channel repetitions in the set of slots of a first uplink shared channel occasion of the set of multiple uplink shared channel occasions in accordance with the received control information, and transmitting UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

An apparatus for wireless communications at a UE is described. The apparatus may include a processor, memory coupled with the processor, and instructions stored in the memory. The instructions may be executable by the processor to cause the apparatus to receive control information indicating an enabling DMRS bundling for a set of multiple uplink shared channel occasions within a configured grant period, where each uplink shared channel occasion of the set of multiple uplink shared channel occasions includes a set of one or more slots for transmitting a set of multiple uplink shared channel repetitions, and where the DMRS bundling is based on a phase continuity between the set of slots, transmit the set of multiple uplink shared channel repetitions in the set of slots of a first uplink shared channel occasion of the set of multiple uplink shared channel occasions in accordance with the received control information, and transmit UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

Another apparatus for wireless communications at a UE is described. The apparatus may include means for receiving control information indicating an enabling DMRS bundling for a set of multiple uplink shared channel occasions within a configured grant period, where each uplink shared channel occasion of the set of multiple uplink shared channel occasions includes a set of one or more slots for transmitting a set of multiple uplink shared channel repetitions, and where the DMRS bundling is based on a phase continuity between the set of slots, means for transmitting the set of multiple uplink shared channel repetitions in the set of slots of a first uplink shared channel occasion of the set of multiple uplink shared channel occasions in accordance with the received control information, and means for transmitting UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

A non-transitory computer-readable medium storing code for wireless communications at a UE is described. The code may include instructions executable by a processor to receive control information indicating an enabling DMRS bundling for a set of multiple uplink shared channel occasions within a configured grant period, where each uplink shared channel occasion of the set of multiple uplink shared channel occasions includes a set of one or more slots for transmitting a set of multiple uplink shared channel repetitions, and where the DMRS bundling is based on a phase continuity between the set of slots, transmit the set of multiple uplink shared channel repetitions in the set of slots of a first uplink shared channel occasion of the set of multiple uplink shared channel occasions in accordance with the received control information, and transmit UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

In some examples of the method, apparatuses, and non-transitory computer-readable medium described herein, the phase continuity between the set of slots may be broken based on the one or more unused slots, the one or more unused slots associated with one or more uplink shared channel repetitions of the set of multiple uplink shared channel repetitions.

In some examples of the method, apparatuses, and non-transitory computer-readable medium described herein, the UCI indicates that a resource block used in a first slot of the set of slots may be unused in a second slot in the set of slots, the first slot adjacent to the second slot in the first uplink shared channel occasion, and where the phase continuity between the set of slots may be broken based on the UCI.

In some examples of the method, apparatuses, and non-transitory computer-readable medium described herein, the phase continuity between the set of slots may be broken based on a quantity of silent time units after the one or more unused slots of the first uplink shared channel occasion may be greater than a time threshold.

In some examples of the method, apparatuses, and non-transitory computer-readable medium described herein, the phase continuity between the set of slots may be broken based on the UCI indicating an unused slot of the first uplink shared channel occasion or an unused resource block of a first slot of the first uplink shared channel occasion.

In some examples of the method, apparatuses, and non-transitory computer-readable medium described herein, the UCI indicates that the phase continuity between the set of slots may be broken.

A method for wireless communications at a network entity is described. The method may include transmitting control information indicating enabling DMRS bundling for a set of multiple uplink shared channel occasions within a configured grant period, where each uplink shared channel occasion of the set of multiple uplink shared channel occasions includes a set of one or more slots for transmitting a set of multiple uplink shared channel repetitions and where the DMRS bundling is based on a phase continuity between the set of slots, receiving the set of multiple uplink shared channel repetitions in the set of slots of a first uplink shared channel occasion of the set of multiple uplink shared channel occasions in accordance with the transmitted control information, and receiving UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

An apparatus for wireless communications at a network entity is described. The apparatus may include a processor, memory coupled with the processor, and instructions stored in the memory. The instructions may be executable by the processor to cause the apparatus to transmit control information indicating enabling DMRS bundling for a set of multiple uplink shared channel occasions within a configured grant period, where each uplink shared channel occasion of the set of multiple uplink shared channel occasions includes a set of one or more slots for transmitting a set of multiple uplink shared channel repetitions and where the DMRS bundling is based on a phase continuity between the set of slots, receive the set of multiple uplink shared channel repetitions in the set of slots of a first uplink shared channel occasion of the set of multiple uplink shared channel occasions in accordance with the transmitted control information, and receive UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

Another apparatus for wireless communications at a network entity is described. The apparatus may include means for transmitting control information indicating enabling DMRS bundling for a set of multiple uplink shared channel occasions within a configured grant period, where each uplink shared channel occasion of the set of multiple uplink shared channel occasions includes a set of one or more slots for transmitting a set of multiple uplink shared channel repetitions and where the DMRS bundling is based on a phase continuity between the set of slots, means for receiving the set of multiple uplink shared channel repetitions in the set of slots of a first uplink shared channel occasion of the set of multiple uplink shared channel occasions in accordance with the transmitted control information, and means for receiving UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

A non-transitory computer-readable medium storing code for wireless communications at a network entity is described. The code may include instructions executable by a processor to transmit control information indicating enabling DMRS bundling for a set of multiple uplink shared channel occasions within a configured grant period, where each uplink shared channel occasion of the set of multiple uplink shared channel occasions includes a set of one or more slots for transmitting a set of multiple uplink shared channel repetitions and where the DMRS bundling is based on a phase continuity between the set of slots, receive the set of multiple uplink shared channel repetitions in the set of slots of a first uplink shared channel occasion of the set of multiple uplink shared channel occasions in accordance with the transmitted control information, and receive UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

In some examples of the method, apparatuses, and non-transitory computer-readable medium described herein, the phase continuity between the set of slots may be broken based on the one or more unused slots, the one or more unused slots associated with one or more uplink shared channel repetitions of the set of multiple uplink shared channel repetitions.

In some examples of the method, apparatuses, and non-transitory computer-readable medium described herein, the UCI indicates that a resource block used in a first slot of the set of slots may be unused in a second slot in the set of slots, the first slot adjacent to the second slot in the first uplink shared channel occasion, and where the phase continuity between the set of slots may be broken based on the UCI.

In some examples of the method, apparatuses, and non-transitory computer-readable medium described herein, the phase continuity between the set of slots may be broken based on a quantity of silent time units after the one or more unused slots of the first uplink shared channel occasion may be greater than a time threshold.

In some examples of the method, apparatuses, and non-transitory computer-readable medium described herein, the phase continuity between the set of slots may be broken based on the UCI indicating an unused slot of the first uplink shared channel occasion or an unused resource block of a first slot of the first uplink shared channel occasion.

In some examples of the method, apparatuses, and non-transitory computer-readable medium described herein, the UCI indicates that the phase continuity between the set of slots may be broken.

DETAILED DESCRIPTION

Figure 1:
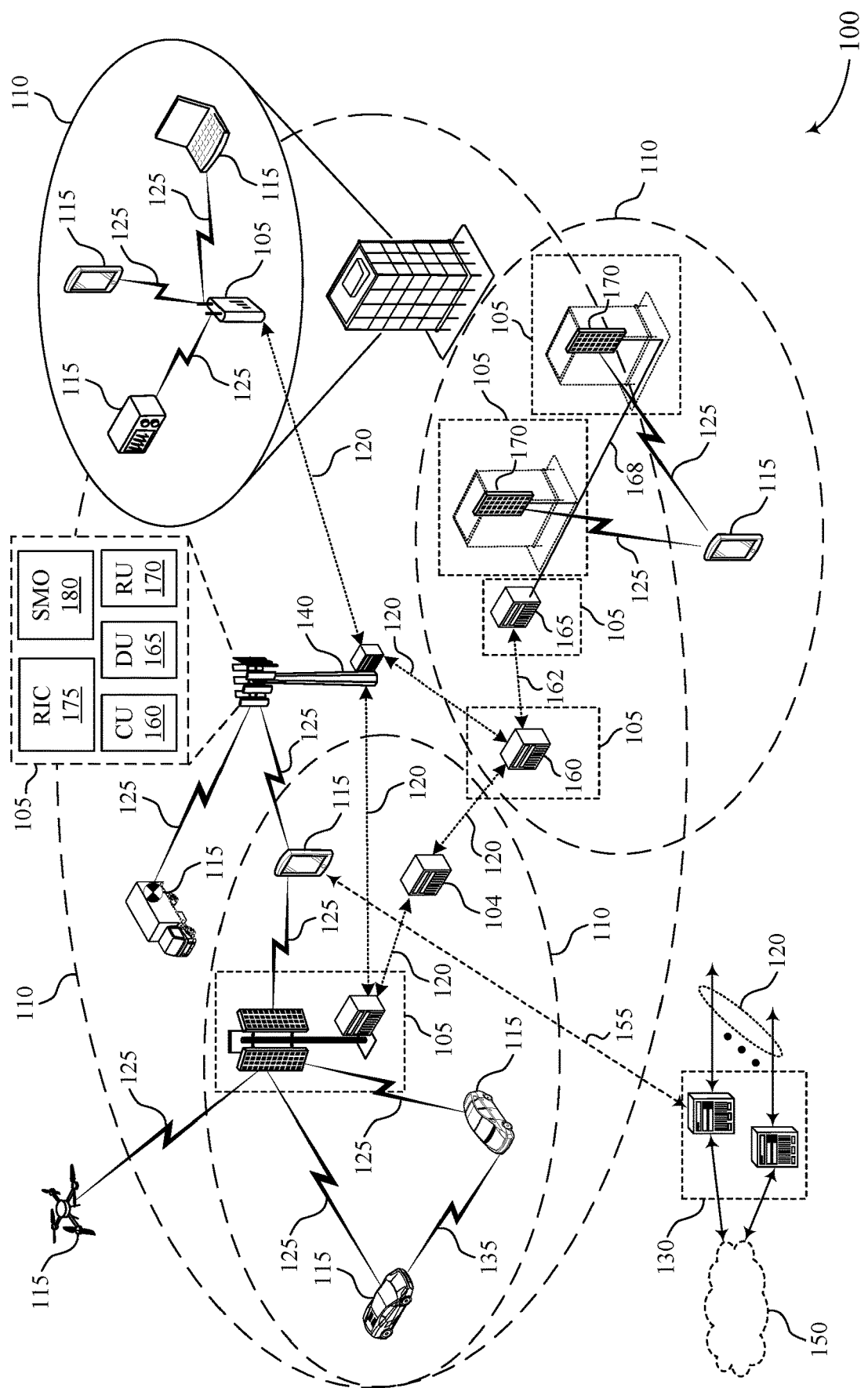
FIG. 1 illustrates an example of a wireless communications system that supports indication of unused uplink shared channel occasions in accordance with one or more aspects of the present disclosure.

In some wireless communication systems, user equipments (UEs) (e.g., extended reality (XR) UEs) may transmit periodic uplink traffic (e.g., video frames) with variable data burst sizes. XR transmissions may include virtual reality (VR), augmented reality (AR), or mixed reality (MR) transmissions. In such cases, a network entity may allocate a configured grant period with multiple physical uplink shared channel (PUSCH) occasions, where each PUSCH occasion may include multiple slots for transmitting a PUSCH message. This may be useful for transmitting XR data frames or similar types of variable data. In some examples, the UE may use a portion of the slots of a PUSCH occasion to transmit the PUSCH message as the size of a data packet for a transport block may be less than the quantity of allocated slots of the PUSCH occasion. For example, when transmitting the transport block, the UE may use half of the slots allocated for the PUSCH occasion and the UE may skip the remaining (and empty) slots. In such cases, the network entity may be unaware of which slots of a PUSCH occasion the UE has skipped (e.g., which slots are unused). If the network entity has to detect which slots of a PUSCH occasion the UE has not used, the network entity may perform extensive processing procedures to make such determinations, which may result in increased delays, reduced accuracy of communications, and reduced reliability in the wireless communication system.

To support a more robust communication system and reduce the processing load and complexity at the network entity, the UE may transmit control information indicating the unused slots of a PUSCH occasion. The UE may indicate the unused slots of a PUSCH occasion to the network entity via a bit of the control information. The control information may include a PUSCH-level indication, a slot-level indication, or a group-level indication to indicate the unused slots of a PUSCH occasion. For example, the UE may transmit repetitions of a PUSCH message via the slots of a PUSCH occasion and the UE may use a portion of the slots of the PUSCH occasion to accurately transmit the PUSCH message via the PUSCH repetitions. In some other examples, the UE may transmit a PUSCH message (e.g., a transport block) over multiple slots of a PUSCH occasion. However, in some cases, the UE may use a portion of the slots of the PUSCH occasion. In such examples, the UE may transmit the control information to the network entity to indicate the unused slots of the PUSCH occasion in accordance with the techniques described herein.

Additionally, or alternatively, the UE may be enabled to perform demodulation reference signal (DMRS) bundling with the PUSCH occasions when transmitting repetitions of a PUSCH over one of the PUSCH occasions. However, as DMRS bundling may be based on phase continuity between slots, if the UE indicates that one or more slots of a PUSCH occasion are unused, the phase continuity may be broken. As such, the UE and the network entity may define how these types of indications may affect the phase continuity of the DMRS bundling. Such techniques for indicating unused slots of a PUSCH occasion may further enhance wireless communications between the UE and the network entity.

Aspects of the disclosure are initially described in the context of wireless communications systems. Additional aspects of the disclosure are described herein with reference to a wireless communications system, resource configurations, and a process flow. Aspects of the disclosure are further illustrated by and described herein with reference to apparatus diagrams, system diagrams, and flowcharts that relate to indication of unused uplink shared channel occasions.

FIG. 1 illustrates an example of a wireless communications system 100 that supports indication of unused uplink shared channel occasions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless selfbackhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support indication of unused uplink shared channel occasions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, UEs 115 (e.g., XR UEs 115) may transmit periodic uplink traffic (e.g., video frames) with variable data burst sizes. XR transmissions may include VR, AR, or MR transmissions. In such cases, a network entity 105 may allocate a configured grant period with multiple PUSCH occasions, where each PUSCH occasion may include multiple slots for transmitting a PUSCH message. This may be useful for transmitting XR data frames or similar types of variable data. In some examples, the UE 115 may use a portion of the slots of a PUSCH occasion to transmit the PUSCH message as the size of a data packet for a transport block may be less than the quantity of allocated slots of the PUSCH occasion. For example, when transmitting the transport block, the UE 115 may use half of the slots allocated for the PUSCH occasion and the UE 115 may skip the remaining (and empty) slots. In such cases, the network entity 105 may be unaware of which slots of a PUSCH occasion the UE 115 has skipped (e.g., which slots are unused). If the network entity 105 has to detect which slots of a PUSCH occasion the UE 115 has not used, the network entity 105 may perform extensive processing procedures to make such determinations, which may result in increased delays, reduced accuracy of communications, and reduced reliability in the wireless communications system 100.

To support a more robust communication system and reduce the processing load and complexity at the network entity 105, the UE 115 may transmit control information indicating the unused slots of a PUSCH occasion. The UE 115 may indicate the unused slots of a PUSCH occasion to the network entity 105 via a bit of the control information. The control information may include a PUSCH-level indication, a slot-level indication, or a group-level indication to indicate the unused slots of a PUSCH occasion. For example, the UE 115 may transmit repetitions of a PUSCH message via the slots of a PUSCH occasion and the UE 115 may use a portion of the slots of the PUSCH occasion to accurately transmit the PUSCH message via the PUSCH repetitions. In some other examples, the UE 115 may transmit a PUSCH message (e.g., a transport block) over multiple slots of a PUSCH occasion. However, in some cases, the UE 115 may use a portion of the slots of the PUSCH occasion. In such examples, the UE 115 may transmit the control information to the network entity 105 to indicate the unused slots of the PUSCH occasion in accordance with the techniques described herein.

Additionally, or alternatively, the UE 115 may be enabled to perform DMRS bundling with the PUSCH occasions when transmitting a PUSCH message over one of the PUSCH occasions. However, as DMRS bundling may be based on phase continuity between slots, if the UE 115 indicates that one or more slots of a PUSCH occasion are unused, the phase continuity may be broken. As such, the UE 115 and the network entity 105 may define how these types of indications may affect the phase continuity of the DMRS bundling. Such techniques for indicating unused slots of a PUSCH occasion may further enhance wireless communications between the UE 115 and the network entity 105.

Figure 2:
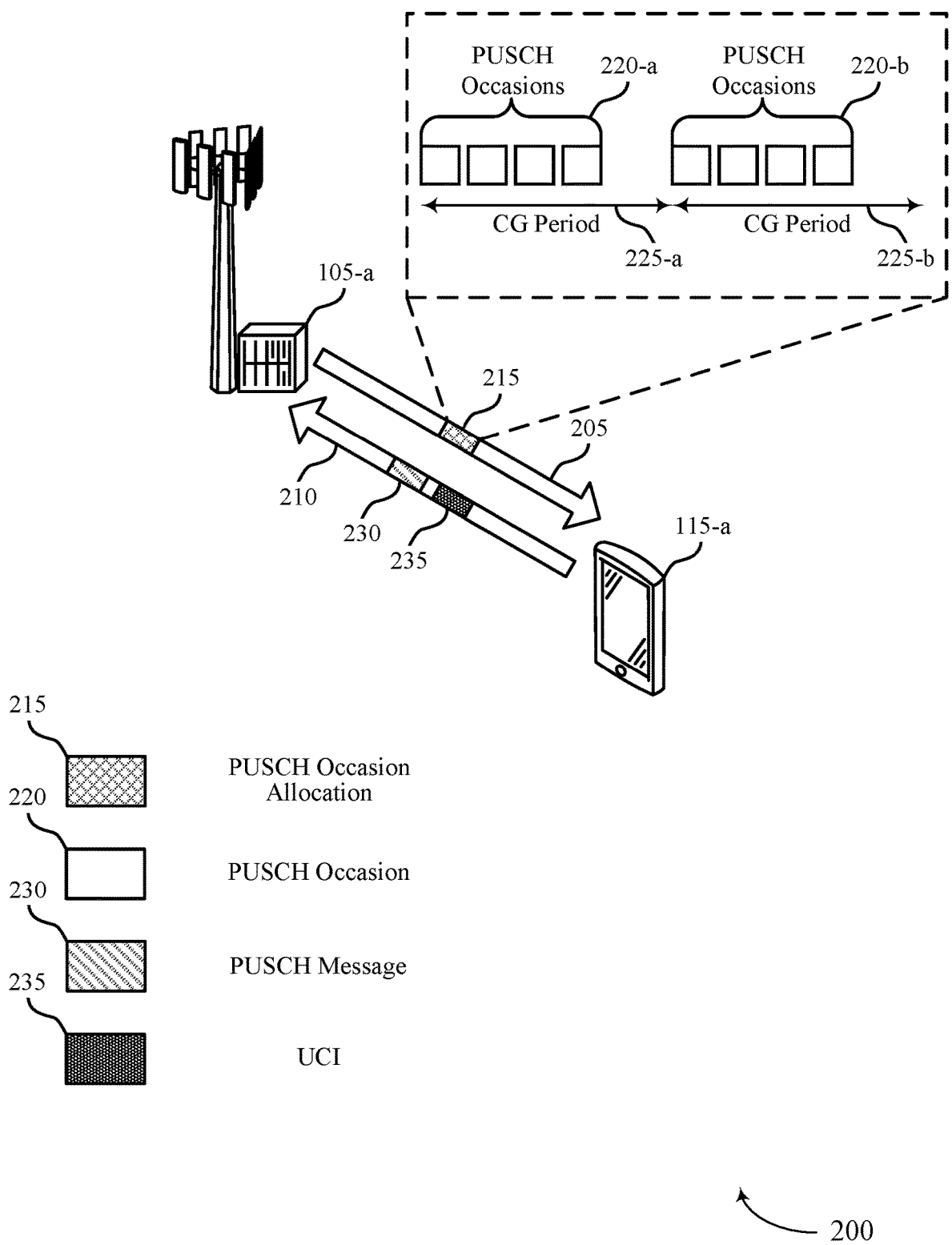
FIG. 2 illustrates an example of a wireless communication system that supports indication of unused uplink shared channel occasions in accordance with one or more aspects of the present disclosure.

FIG. 2 illustrates an example of a wireless communication system 200 that supports indication of unused uplink shared channel occasions in accordance with one or more aspects of the present disclosure. In some examples, the wireless communication system 200 may implement or be implemented by the wireless communication system 100. For example, the wireless communication system 200 may include a UE 115-a and a network entity 105-a, which may be examples of devices described herein with reference to FIG. 1. In some examples, the UE 115-a and the network entity 105-a may communicate via a downlink communication link 205 and via an uplink communication link 210, which may be examples of a communication link 125 described herein with reference to FIG. 1. For example, the downlink communication link 205 and the uplink communication link 210 may be examples of a Uu link, a sidelink, a backhaul link, a D2D link or some other type of communication link 125.

In some examples, the UE 115-a may transmit periodic uplink traffic via the uplink communication link 210 with variable data burst size. For example, the UE 115-a may transmit video frames (e.g., XR video frames) with various different sizes. As such, the network entity 105-a may configure the UE 115-a with a PUSCH occasion allocation 215 with multiple PUSCH occasions 220 within a configured grant period 225. In a configured grant period 225-a, the network entity 105-a may configure the UE 115-a with a set of multiple (e.g., four) PUSCH occasions 220-a. In each PUSCH occasion 220 of the set of PUSCH occasions 220-a there may be multiple slots for transmission of a PUSCH message 230. For example, for each PUSCH occasion 220 of the set of PUSCH occasions 220-a, the network entity 105-a may configure four slots in a PUSCH occasion 220 for transmission of the PUSCH message 230.

In some cases, the UE 115-a may use the slots of a PUSCH occasion 220 to transmit repetitions of a PUSCH message 230. In such cases, the UE 115-a may transmit the repetitions of the PUSCH message 230 in multiple contiguous slots of a PUSCH occasion where all the symbols contained in the time domain resource assignment (TDRA) are flexible symbols or configured for uplink transmissions (e.g., uplink symbols). When transmitting the repetitions of the PUSCH message 230, a signal to interference noise ratio (SINR) measured for signal quality may increase with the repetitions. An increased SINR value may represent a higher signal quality as a signal quality value may be greater than a value of the interference.

In some other cases, the UE 115-a may use the slots of the PUSCH occasion 220 to transmit a single transport block over multiple slots. Compared to transmitting multiple transport blocks over the multiple slots of the PUSCH occasion 220, transmitting a single transport block over the multiple slots of the PUSCH occasion 220 may reduce a header overhead associated with the transmissions for the UE 115-a. Additionally, or alternatively, the UE 115-a transmitting a transport block over multiple slots may reduce and avoid inter-cell interference when UEs 115 (e.g., UE 115-a) are located at the edge of a cell (where bandwidth may be split among adjacent cells). In both cases, the multiple PUSCH occasions 220 within a configured grant period 225 (e.g., PUSCH occasions 220-a in configured grant period 225-a, PUSCH occasions 220-b in configured grant period 225-b) may be part of a DMRS bundle when DMRS bundling is enabled at the UE 115-a. The UE 115-a may transmit the DMRS of the DMRS bundle with phase coherency in contiguous slots across a PUSCH occasion 220. In some examples, based on the coherent processing and phase continuity of the DMRS bundling, the DMRS bundling may also result in higher SINR values in the estimated channel.

For devices such as XR UEs 115 or quasi-stationary UEs 115, being allocated with multiple PUSCH occasions 220 and multiple slots per PUSCH occasion 220 may enhance communications between the UE 115-a and the network entity 105-b. For example, if the UE 115-a transmits repetitions of the PUSCH message 230 or transmits a transport block of the PUSCH message 230 over multiple slots of a PUSCH occasion 220, there may have a higher chance of the network entity 105-a receiving and successfully decoding the PUSCH message 230. In some other examples, for a PUSCH message 230 containing a video frame (e.g., an XR video frame), the UE 115-a may benefit from having multiple PUSCH occasions 220 and multiple slots for each PUSCH occasion 220 as the size of the video frame may vary. In some cases, the size of the video frame may be based on a compression rate of the application data determined by a compression algorithm (e.g., joint photographic experts group (JPEG) algorithms, moving picture experts group (MPEG) algorithms, H.261, and the like). The compression rate determined by the compression algorithm may vary based on attributes of the video packet (e.g., a frame rate of the video or a resolution quality of the video). In some other cases, the size of the video frame may be based on the content of the video frame, the correlation to adjacent frames, or any combination thereof. As such, if the size of the video frame is relatively large, the UE 115-a may use all of the slots of all the PUSCH occasions 220 to accurately transmit the video frame. However, in some cases, if the size of the video frame is relatively small, the UE 115-a may use a portion of the slots in a portion of the PUSCH occasions 220.

When the UE 115-a uses a portion of the slots of a portion of the PUSCH occasions 220, the network entity 105-a may desire to reallocate those unused slots. Unused slots of the PUSCH occasion 220 may be slots that the UE 115-a skipped when transmitting the PUSCH message 230 or repetitions of the PUSCH message 230. As such, the unused slots may also be empty (e.g., lack any data or other payload within the slot). However, the network entity 105-a may lack an efficient way of detecting which slots of the PUSCH occasion 220 may be unused. Therefore, the network entity 105-a may attempt to blindly detect the unused slots of the PUSCH occasion 220. In some cases, the network entity 105-a may also attempt to detect the unused resource blocks or symbols of a slot of the PUSCH occasion 220. In such cases, the network entity 105-*a* may perform extensive and complicated processing techniques to detect the unused resources (e.g., slots, resource blocks, symbols) of a PUSCH occasion 220. These procedures may be relatively power consuming for the network entity 105-*a* and may cause a processing overload, resulting in a delay of communications between the UE 115-*a* and the network entity 105-*a*.

Therefore, to support more enhanced and efficient communications in the wireless communication system 200, the UE 115-*a* may use the techniques of the present disclosure to transmit control information (e.g., a UCI 235) indicating the used and unused slots of a PUSCH occasion 220 or the used and unused resource blocks or symbols of a slot of the PUSCH occasion 220. In some cases, the control signaling may be a UCI 235 or a configured grant UCI 235 (e.g., a CG-UCI). In some examples (e.g., an urban macro scenario), uplink transmissions may be a performance bottleneck for AR users (e.g., AR UEs 115) at a cell edge. In such examples, having the UE 115-*a* transmit the UCI 235 indicating the unused slots of a PUSCH occasion 220 or the unused resource blocks or symbols of a slot of the PUSCH occasion 220 may further enhance communications for AR UEs 115 by improving the quality and efficiency of the uplink transmissions. However, the UCI 235 indicating the unused slots of a PUSCH occasion 220 may cause phase discontinuity for UEs 115 using DMRS bundling. For example, if the UE 115-*a* skips a slot of a PUSCH occasion 220, as phase continuity is based on the UE 115-*b* transmitting the PUSCH message 230 in contiguous slots, the phase continuity may be broken based on the UE 115-*a* skipping a slot of the PUSCH occasion 220.

As described herein, the UE 115-*a* may transmit the UCI 235 indicating the unused slots or resources of a PUSCH occasion 220 via a PUSCH-level indication, a slot level indication, or a group level indication. Such descriptions of using the UCI 235 to indicate unused slot or resources of a PUSCH occasion 220 when the UE 115-*a* transmits repetitions of a PUSCH message 230 are further described herein with reference to FIG. 3. In addition, descriptions of using the UCI to indicate unused slot or resources of a PUSCH occasion 220 when the UE 115-*a* transmits a transport block over multiple slots are further described herein with reference to FIG. 4. Descriptions for indicating unused slot or resources of a PUSCH occasion 220 when the DMRS bundling is enabled may be further described herein with reference to FIGS. 3-4.

Figure 3:
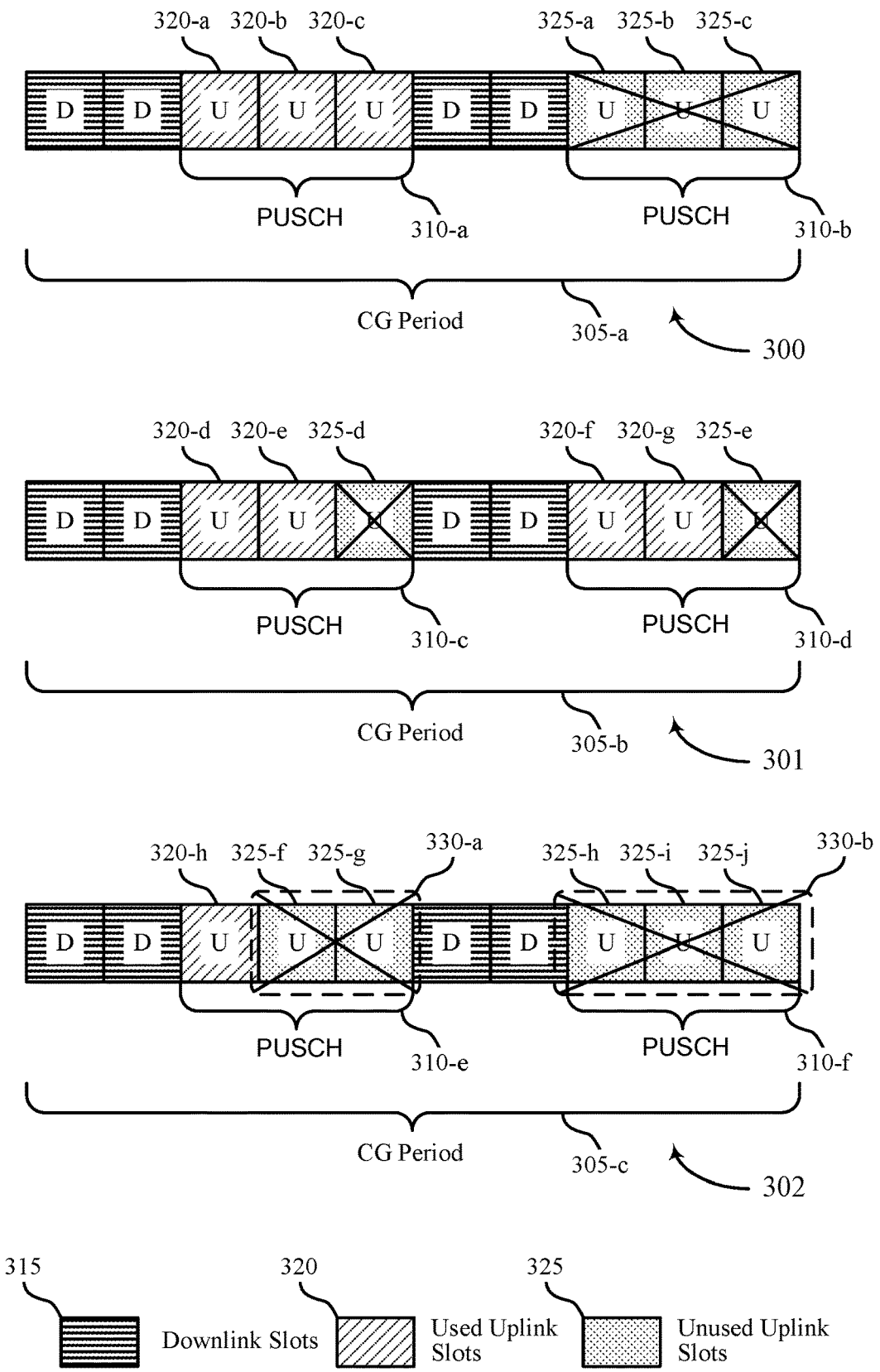
FIGS. 3 and 4 illustrate examples of resource configurations that support indications of unused uplink shared channel occasions in accordance with one or more aspects of the present disclosure.

FIG. 3 illustrates examples of a resource configuration 300, a resource configuration 301, and a resource configuration 302 that support indication of unused uplink shared channel occasions in accordance with one or more aspects of the present disclosure. In some examples, the resource configuration 300, the resource configuration 301, and the resource configuration 302 may implement or be implemented by the wireless communication system 100 or the wireless communication system 200. For example, the resource configuration 300, the resource configuration 301, and the resource configuration 302 may include downlink slots 315 and uplink slots (e.g., used uplink slots 320 and unused uplink slots 325), which may be transmitted via communication links described herein with reference to FIGS. 1-2 (e.g., communication link 125, downlink communication link 205, and uplink communication link 210).

In some examples, the resource configuration 300 may be associated with a UE 115 transmitting a PUSCH-level indication in UCI. The PUSCH-level indication may indicate to a network entity 105, that the UE 115 has used all the slots of a PUSCH occasion 310 (e.g., used uplink slots 320) or that the UE 115 has skipped all the slots of a PUSCH occasion 310 (e.g., unused uplink slots 325). For example, the UE 115 may transmit PUSCH repetitions in a PUSCH occasion 310 within a configured grant period 305-*a*.

As illustrated in the resource configuration 300, within the configured grant period 305-*a*, a PUSCH occasion 310-*a* may include a set of three uplink slots (e.g., used uplink slot 320-*a*, used uplink slot 320-*b*, and used uplink slot 320-*c*) for transmitting repetitions of a first PUSCH message. In some cases, all of the uplink slots in the PUSCH occasion 310-*a* may be used uplink slots 320. That is, the UE 115 may have used each slot of the PUSCH occasion 310-*a* for transmitting repetitions of the first PUSCH message. As such, since the UE 115 may be configured to transmit a PUSCH-level indication to indicate unused slots of a PUSCH occasion 310, the UE 115 may transmit a bit in a UCI message indicating that all the slots of the PUSCH occasion 310-*a* are used uplink slots 320. In some cases, the UE 115 may use a bit with a value of 1 to indicate that all the slots of the PUSCH occasion 310-*a* are used and use a bit with a value of 0 to indicate that all the slots of the PUSCH occasion 310-*a* are unused, or vice versa. In some examples, to save power, the UE 115 may refrain from transmitting a UCI message if all the uplink slots in a PUSCH occasion 310 are used uplink slots 320. In such cases, the network entity 105 may assume that unless the UE 115 signals otherwise, the UE 115 has used all the slots within a PUSCH occasion.

In some cases, the UE 115 may skip all three slots (e.g., unused uplink slot 325-*a*, unused uplink slot 325-*b*, and unused uplink slot 325-*c*) of a PUSCH occasion 310-*b* within the configured grant period 305-*a*. That is, the UE 115 may refrain from transmitting any data or other payload (e.g., a second PUSCH message) during the PUSCH occasion 310-*b* such that all three uplink slots (e.g., the unused uplink slot 325-*a*, the unused uplink slot 325-*b*, and the unused uplink slot 325-*c*) may be empty. As such, since the UE 115 may be configured to transmit a PUSCH-level indication, the UE 115 may include, via a UCI message, a bit that indicates that the UE 115 has skipped all the slots of the PUSCH occasion 310-*b* (e.g., indicate the unused uplink slots 325). In some cases, if a bit with a value of 0 represents that all the slots of the PUSCH occasion 310-*b* are used, a bit with a value of 1 may represent that all the slots of the PUSCH occasion 310-*b* are unused, or vice versa. After the network entity 105 receives the UCI indicating that the UE 115 may have skipped all the slots of the PUSCH occasion 310-*b*, the network entity 105 may reallocate the resources associated with the unused uplink slots 325 to other UEs 115 or other wireless devices.

When using the PUSCH-level indication, the UE 115 may only be able to indicate whether the UE 115 used all the slots of a PUSCH occasion 310 or skipped all the slots of the PUSCH occasion 310. Due to the relative simplicity of this indication, the UE 115 may have a relatively low uplink signaling overhead. However, in some cases, the UE 115 may use a portion of the slots of a PUSCH occasion 310 and leave the remaining portion of slots in the PUSCH occasion unused. As such, when the UE 115 may be configured to use a PUSCH-level indication, the UE 115 may be unable to indicate to the network entity 105 that some slots of a PUSCH occasion 310 are used and that some slots of a PUSCH occasion 310 are skipped (unused). Thus, the UE 115 may be configured to transmit a slot-level indication to indicate to the network entity 105, via a bit of a UCI message, that a slot of a PUSCH occasion 310 has been used or unused. The slot-level indication may allow for a more flexible balance between resource usage and uplink reliability.

As illustrated in the resource configuration 301, within a configured grant period 305-b, the network entity 105 may configure a PUSCH occasion 310-c with a set of three uplink slots (e.g., a used uplink slot 320-d, a used uplink slot 320-e, and an unused uplink slot 325-d) for transmitting repetitions of a third PUSCH message. In some cases, when configured to transmit a slot-level indication, the UE 115 may transmit a UCI message for each uplink slot to indicate whether the UE 115 has used or skipped a slot of a PUSCH occasion 310. In some other cases, the UE 115 may transmit a single UCI message before the start of the PUSCH occasion 310 indicating that a slot of the PUSCH occasion 310 is an unused uplink slot 325 (is skipped or unused).

For example, if the UE 115 transmits UCI for each slot of the PUSCH occasion 310-c, for the first two uplink slots (e.g., the used uplink slot 320-d and the used uplink slot 320-e) the UE 115 may transmit, via UCI messages, a bit indicating that the uplink slots may be used uplink slots 320. Then for UCI for the third uplink slot (e.g., the unused uplink slot 325-d) may include a bit indicating that the uplink slot may be an unused uplink slot 325. In some cases, a bit with a value of 1 in the UCI message may indicate a used uplink slot 320 and a bit with a value of 0 in the UCI message may indicate an unused uplink slot 325, or vice versa.

In some examples, if the UE 115 transmits a single UCI message for the entire PUSCH occasion 310-c, the UE 115 may include a bit in the UCI that indicates that the third slot (e.g., the unused uplink slot 325-d) of the PUSCH occasion 310-c may be unused (skipped). In some cases, to indicate which slot of the PUSCH occasion 310-c the UE 115 skipped, the UE 115 may also include a slot-identifier (ID) in addition to the bit indicating the unused uplink slot 325. In such examples, since the UE 115 may transmit a quantity of repetitions lower than a quantity of allocated uplink slots for the repetitions, and based on a downlink control state information (CSI) measurement showing a good channel quality for the downlink communication link, the UE 115 may increase an effective coding rate given a fixed coding rate for each repetition. As such, the UE 115 may adjust its parameters for transmitting the repetitions based on the current conditions of communications.

In some other examples, the UE 115 may be configured to transmit a repetition-level indication. For example, the UE 115 may transmit multiple repetitions of a PUSCH message in one or more uplink slots (not illustrated). That is, the one or more slots may be configured with a set of repetition resources. For example, in some cases, the UE 115 may transmit multiple repetitions of a PUSCH message via a single slot of a PUSCH occasion 310 (e.g., each slot of a PUSCH occasion 310 may include a set of one or more repetition resources). In some other cases, the UE 115 may transmit a repetition of the PUSCH message over multiple slots (e.g., a repetition resource may span one or more slots of a PUSCH occasion 310). As such, each PUSCH occasion 310 may include a set of repetition resources. However, in some cases, the UE 115 may refrain from using all the repetition resources in the one or more slots of a PUSCH occasion 310 (e.g., the UE 115 may skip transmitting some repetitions in the one or multiple slots of the PUSCH occasion 310). As such, some repetition resources of the set of repetition resources may be skipped and unused to transmit one of the repetitions of a PUSCH message. To indicate such unused repetition resources, similar to the slot-level indication, the UE 115 may transmit a UCI message to indicate unused repetition resources either for per repetition resource of the set of repetition resources in an uplink slot or per repetition resource of the set of repetition resources in a PUSCH occasion 310, per uplink slot, or per PUSCH occasion 310.

For example, if the UE 115 transmits the UCI message per repetition resource, the UE 115 may transmit multiple UCI messages for the PUSCH message. As such, in each UCI, the UE 115 may indicate via a bit if a repetition resource is unused. In some cases, a bit with a value of 1 in the UCI message may indicate a used repetition resource and a bit with a value of 0 in the UCI message may indicate an unused repetition resource, or vice versa. In some cases, if the UE 115 transmits the UCI message per each repetition of a PUSCH occasion 310, if the repetition resources span multiple slots of a PUSCH occasion 310, the UCI message may include a repetition-ID to indicate which repetition resource of the PUSCH occasion 310 the UE 115 skipped. If there are multiple repetitions transmitted per slot, the UE 115 may transmit the UCI message per slot and include the repetition-ID to indicate which repetition resource in the slot was unused. In some cases, when there are multiple repetition resources per slot the UE 115 may transmit a UCI message for each repetition resource of the slot (e.g., the UE 115 may transmit multiple UCI messages for each slot).

In other cases where the UE 115 transmits the UCI message per PUSCH occasion 310, the UE 115 may include both a slot-ID, a repetition-ID, or both to indicate which repetition resource was unused. For example, if the repetitions span multiple slots, the UE 115 may include the repetition-ID and may refrain from including the slot-ID. However, if each slot contains multiple repetition resources, the UE 115 may include both the repetition-ID and the slot-ID. Additionally, or alternatively, the UE 115 may refrain from transmitting a repetitions in one of the repetition resources of each slot of the PUSCH occasion 310 or the UE 115 may refrain from transmitting a repetition in one of the repetition resources of the PUSCH occasion 310 and the UCI message may indicate as such.

In some examples, the UE 115 may transmit a single repetition per uplink slot. That is, each slot of a PUSCH occasion 310 may be configured with one repetition resource. In such examples, the slot-level indication and the repetition-level indication may be used interchangeably. As such, the slot-IDs and the repetition-IDs may be similar or identical.

Additionally, or alternatively, the UE 115 may indicate an unused resource block of an uplink slot or an unused resource block of a repetition resource, via a bit of a UCI message. For example, in some cases, the UE 115 may include a bit in the UCI message indicating that a resource block from a set of resource blocks in an uplink slot or in a repetition resource may be unused. In some other cases, the UE 115 may indicate, via a UCI message, that a resource block from a set of resource block is unused for transmitting repetitions of a PUSCH message in a PUSCH occasion 310. For example, within the configured grant period 305-b, the network entity 105 may configure a PUSCH occasion 310-d with three uplink slots (e.g., a used uplink slot 320-f, a used uplink slot 320-g, and an unused uplink slot 325-e) used for transmitting a fourth PUSCH message. Each of the three uplink slots may include three resource blocks. In some examples, a first uplink slot (e.g., the used uplink slot 320-f) and a second uplink slot (e.g., the used uplink slot 320-g) of the PUSCH occasion 310-d may be used to transmit repetitions of the fourth PUSCH message. As such, the first uplink slot may carry the initial transmission of the fourth PUSCH message and the second uplink slot may carry a first repetition of the initial transmission. Both the initial transmission of the fourth PUSCH message and the first repetition of the fourth PUSCH message may both be referred to as repetitions of the fourth PUSCH message herein. In some cases, the UE 115 may include a bit in the UCI indicating that a third resource block of both the first uplink slot and the second uplink slot may be unused for transmitting the repetitions of the fourth PUSCH message. That is, the UE 115 may use the first two resource blocks of both the first uplink slot and the second uplink slot when transmitting the repetitions of the fourth PUSCH message and the UE 115 may skip the third resource block for both the first uplink slot and the second uplink slot.

In some other examples, when configured for repetition-level indications, the UE 115 may indicate, via a UCI message, that a resource of a set of resource blocks in a repetition resource may be unused. That is, each repetition resource may include a set of resource blocks and the UCI message may indicate an unused resource block in the repetition resource. Similar to the slot-level indication, in some cases, the UE 115 may indicate that the UE 115 may skip a resource block in multiple repetition resources in each slot configured for transmitting the PUSCH message, where a slot may include one or more repetition resources. In some other cases, the UE 115 may indicate that the UE 115 may skip a resource block in each repetition resource of a PUSCH occasion 310, where the repetition resources may span multiple slots of the PUSCH occasion 310. As such, the slot-level indication and the repetition-level indication may provide a more specific indication compared to the PUSCH-level indication described with reference to the resource configuration 300.

However, while the slot-level indication and repetition-level indication may be more accurate than the PUSCH-level indication in some cases, it may result in more signaling overhead and latency as the UE 115 may transmit a separate UCI for each slot of a PUSCH occasion 310. For a PUSCH occasion 310 with a relatively large quantity of slots, or a configured grant period 305 with a relatively large quantity of PUSCH occasions 310, a slot-level indication may decrease the accuracy and reliability of communications between the UE 115 and the network entity 105 due to an increase in latency and high signaling overhead. As such, in another example, the UE 115 may be configured to transmit a group-level indication.

As illustrated in the resource configuration 302, within a configured grant period 305-c, the network entity 105 may configure a PUSCH occasion 310-e with three uplink slots (e.g., a used uplink slot 320-h, an unused uplink slot 325-f, and an unused uplink slot 325-g) for transmitting repetitions of a fifth PUSCH message. In some cases, when configured to transmit a group-level indication, the UE 115 may transmit a UCI message to the network entity 105 indicating that a group of slots may be unused. For example, for the PUSCH occasion 310-e, the UE 115 may detect a group 330-a of unused uplink slots 325 (e.g., the group 330-a including the unused uplink slot 325-f and the unused uplink slot 325-g). As such, the UE 115 may include a bit in a UCI message (e.g., for transmission to the network entity 105) indicating the group 330-a of unused uplink slots 325. In some cases, the bit may indicate a group-ID for the group 330-a of unused uplink slots 325, or each unused uplink slot 325 of the group 330-a (e.g., the unused uplink slot 325-f and the unused uplink slot 325-g) may have a common slot-ID and the bit may indicate the common slot-ID. In some examples, the group 330-a may represent a group of unused repetition resources. For example, the UE 115 may skip multiple repetition resources in an uplink slot or multiple repetition resources in the PUSCH occasion 310-e, therefore, the UE 115 may use the group-level indication to indicate that a group of unused repetition resources. In some cases, if the group 330-a represents a group of unused repetition resources the group 330-a may be within a same uplink slot or over multiple uplink slots (e.g., the unused uplink slot 325-f and the unused uplink slot 325-g).

In addition, within the configured grant period 305-c, the network entity 105 may configure a PUSCH occasion 310-f with three uplink slots (e.g., an unused uplink slot 325-h, an unused uplink slot 325-i, and an unused uplink slot 325-j) for transmitting repetitions of a sixth PUSCH message. However, all three uplink slots in the PUSCH occasion 310-f may be unused uplink slots 325. As such, the UE 115 may detect a group 330-b of unused uplink slots 325, which may include each slot of the PUSCH occasion 310-f. The UE 115 may include a bit in the UCI indicating the group 330-b of unused uplink slots 325. If the quantity of unused uplink slots 325 in the group 330 is equal to the quantity of uplink slots in the PUSCH occasion 310, the group-level indication may be a similar indication as the PUSCH-level indication.

In some cases, the group-level indication may also indicate a group of resource blocks of a slot of a PUSCH occasion 310 or a group of resource blocks of a repetition resource of a PUSCH occasion 310. For example, the UE 115 may skip multiple resource blocks of a slot of a PUSCH occasion 310 or the UE 115 may skip multiple resource blocks of a repetition resource. However using a slot-level indication for each resource block of each slot of a PUSCH occasion 310 or for each resource block of each repetition of the PUSCH occasion 310, may result in increased signaling overhead. As such, if the UE 115 detects a group of resource blocks in a slot that the UE 115 may have skipped or a group of resource blocks in a repetition resource that the UE 115 may have skipped, the UE 115 may transmit the group-level indication to the network entity 105. Additionally, or alternatively, if the UE 115 detects a group of unused resource blocks in each slot of a PUSCH occasion 310 or a group of unused resource blocks in each repetition resource of a PUSCH occasion 310, the UE 115 may indicate the unused resource blocks to the network entity 105. In addition, similar to the PUSCH-level indications, the group-level indication may represent an entire PUSCH occasion 310 and support a more specific indication of unused PUSCH resources of a PUSCH occasion 310. Therefore, the group-level indication may have both the benefits of the PUSCH-level indication and the slot-level indication with minimal negative effects.

In some examples, the network entity 105 may transmit a control message (e.g., an RRC message, a MAC-CE message, or a downlink control information (DCI) message) triggering the UE 115 to indicate the unused slots of a PUSCH occasion 310 via a PUSCH-level indication, a slot-level indication, a repetition-level indication, a group-level indication, or any combination thereof. In some cases, the network entity 105 may transmit the control message to the UE 115 based on the UE 115 transmitting a capability message. The capability message may indicate whether the UE 115 may be capable of transmitting a PUSCH-level indication, a slot-level indication, a repetition-level indication, a group-level indication, or any combination thereof. In some cases, the capability message may be based on a power level in regards to a power level threshold, a complexity level of the UE 115, a processing load in regards to a processing load threshold, a type of UE 115, or any combination thereof. For example, if the UE 115 is a reduced capability UE 115 (e.g., the power level is below the power level threshold, the processing level is below the processing level, or the complexity level is relatively low), the UE 115 may indicate it can only transmit a PUSCH-level indication as the PUSCH-level indication may have the lowest signaling overhead and may result in relatively low amounts of power consumption and processing load consumption.

In combination with such indications of which slots of a PUSCH occasion 310 are unused, the network entity 105 may configure and enable the UE 115 to use DMRS bundling between slots of a PUSCH occasions 310 or between PUSCH occasions 310 of a set of PUSCH occasions 310. DMRS bundling may occur when DMRSs for the slots of the PUSCH occasions 310 may be bundled together in order to support improved channel estimations and communication performance. DMRS bundling may rely on phase continuity between slots of a PUSCH occasion 310 or between PUSCH occasions 310 of a set of PUSCH occasions within a configured grant period 305. Phase continuity may occur when there are no gaps in transmission between the PUSCH occasions 310 that are DMRS bundled or when there are no gaps in transmission within a PUSCH occasion 310 (e.g., a PUSCH message transmitted in contiguous slots). However, in cases where the UE 115 skips all the slots of a PUSCH occasion 310, slot of a PUSCH occasion 310, a resource block of the slot of the PUSCH occasion 310, or a group of slots of a PUSCH occasion 310, the phase continuity of the DMRS bundle may be broken. Phase continuity may break when a specific event occurs such as when timing advance changes, transmission power changes, resource block allocation changes, a relatively long gap (e.g., larger than 14 symbols) between adjacent transmissions occurs, a transmission of a new transport block, or any combination thereof. As such, the phase continuity may break when the UE 115 skips a part (e.g., slots, resource block, symbol) of a PUSCH occasion 310 (such that the part may be unused).

To prevent delay in communications, the UE 115 may have a predefined condition-based rule for when phase continuity may be broken within a PUSCH occasion 310 with a set of slots. For example, the phase continuity between the set of slots may be broken based on one or more unused uplink slots 325 of the set of slots being connected to a repetition of a PUSCH message. That is, the unused uplink slots 325 may be associated with a repetition of a PUSCH message and while the UE 115 may skip the slot, the slot may contain data or information related to the repetition of the PUSCH message. In some examples, if the UE 115 transmits a UCI indicating that a resource block used in a first slot of the set of slots may be unused in a second slot of the set of slots that may adjacent to the first slot, the phase continuity between the set of slots may be broken based on the indication from the UCI.

In some other examples, the phase continuity between the set of slots may be broken based on a quantity of silent time units after an unused uplink slot 325 being greater than a time threshold (e.g., 14 OFDM symbols). That is, if the UE 115 refrains from transmitting data for a time period equal to or greater than the time threshold after the most recent unused uplink slot 325, the phase continuity may be broken. In some cases, the UE 115 may also be configured with a time threshold which if exceeded (e.g., if the quantity of silent time units is greater than the time threshold) the UE 115 may not assume that a power amplitude may be maintained (e.g., for power saving purposes). As such, the UE 115 may assume that the phase continuity may be broken when the power amplitude changes state and a random phase may be generated.

Additionally, or alternatively, the UE 115 and the network entity 105 may understand that the phase continuity of the DMRS bundle may be broken whenever the UE 115 transmits a UCI to the network entity 105 indicating unused resources of a PUSCH occasion 310 (e.g., an unused uplink slot 325 or an unused resource block of a slot). In some examples, the UE 115 may transmit the UCI and the UCI may indicate that the phase continuity between the set of slots may be broken. For example, the UE 115 may indicate, via the UCI, that the UE 115 may refrain from maintaining the phase continuity to support power savings at the UE 115. The UE 115 may transmit the indication that the UE 115 may refrain from maintaining the phase continuity in conjunction with the UCI that indicates an unused resource of a PUSCH occasion 310 (e.g., indication transmitted in the UCI or multiplexed with the UCI) or the UE 115 may transmit the indication separately.

As such, whether the UE 115 is enabled with DMRS bundling or not, transmitting the UCI to the network entity 105 indicating unused resources of a PUSCH occasion 310 may enhance communications with the network entity 105. After receiving the UCI, the network entity 105 may reallocate the unused resources therefore increasing the efficiency of communications and reducing any delay caused by lack of resources. Further description of the UE 115 indicating, via a UCI, unused resources of a PUSCH occasion 310 to the network entity 105 may be described herein, including with reference to FIGS. 4-5.

Figure 4:
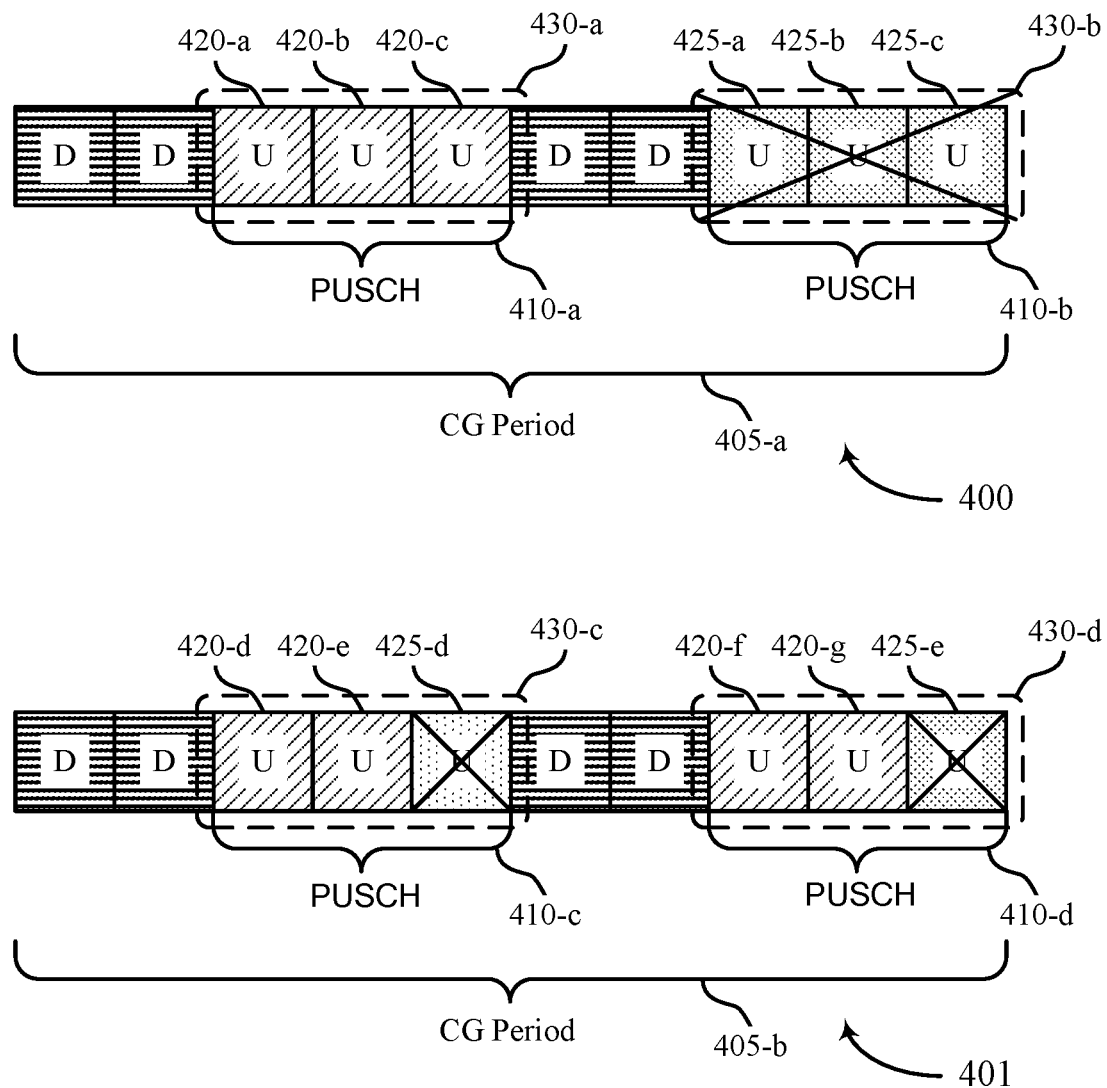
Figure 4:

FIG. 4 illustrates examples of a resource configuration 400 and a resource configuration 401 that support indications of unused uplink shared channel occasions in accordance with one or more aspects of the present disclosure. In some examples, the resource configuration 400 and the resource configuration 401 may implement or be implemented by the wireless communication system 100 or the wireless communication system 200. For example, the resource configuration 400 and the resource configuration 401 may include downlink slots 415 and uplink slots (e.g., used uplink slots 420 and unused uplink slots 425) which may be transmitted in communication links described herein with reference to FIGS. 1-2 (e.g., communication link 125, downlink communication link 205, and uplink communication link 210).

In some examples, the resource configuration 400 may be associated with a transport block-level indication to that the UE 115 may have used all slots of a PUSCH occasion 410 (e.g., used uplink slots 420) or that the UE 115 may have skipped all the slots of a PUSCH occasion 410 (e.g., unused uplink slots 425). For example, the UE 115 may transmit a transport block 430 over multiple uplink slots in a PUSCH occasion 410-*a* within a configured grant period 405-*a*. As illustrated in resource configuration 400, within the configured grant period 405-*a*, the PUSCH occasion 410-*a* may include a set of three uplink slots (e.g., a used uplink slot 420-*a*, a used uplink slot 420-*b*, and a used uplink slot 420-*c*) for transmitting a transport block 430-*a*. In some examples, the transport block 430 may be referred to as PUSCH message and may be referred to as either a transport block 430 or a PUSCH message herein.

In some cases, in the PUSCH occasion 410-*a*, all the uplink slots may be used uplink slots 420. That is, the UE 115 may use each slot of the PUSCH occasion 410-*a* for transmitting the transport block 430-*a*. As such, since the UE 115 may be configured to transmit a transport block-level indication to indicate unused slots 425 of the PUSCH occasion 410-*a*, the UE 115 may transmit a UCI message to the network entity 105 including a bit, the bit indicating that all the slots of the PUSCH occasion 410-*a* have been used. In some cases, the UE 115 may use a bit with a value of 1 to indicate that all the slots of the PUSCH occasion 410-*a* are used and use a bit with a value of 0 to indicate that all the slots of the PUSCH occasion 410-*a* are unused, or vice versa. In some examples, to save power, if the UE 115 uses all the uplink slots in the PUSCH occasion 410-*a*, the UE 115 may refrain from transmitting the UCI message to the network entity 105. In such cases, the network entity 105 may be configured to assume that unless the UE 115 signals otherwise, the UE 115 has used all the slots within the PUSCH occasion 410-*a*.

In some cases, as illustrated in a PUSCH occasion 410-*b* within the configured grant period 405-*a*, the UE 115 may skip all three slots (e.g., an unused uplink slot 425-*a*, an unused uplink slot 425-*b*, and an unused uplink slot 425-*c*) of the PUSCH occasion 410-*b*. That is, the UE 115 may refrain from transmitting a transport block 430-*b* during the PUSCH occasion 410-*b* and all three uplink slots (e.g., the unused uplink slot 425-*a*, the unused uplink slot 425-*b*, and the unused uplink slot 425-*c*) may be empty. As such, since the UE 115 may be configured to transmit a transport block-level indication, the UE 115 may include a bit in the UCI message that indicates that the UE 115 has skipped all the slots of the PUSCH occasion 410-*b* (e.g., indicate the unused slots 425). In some cases, if a bit with a value of 0 represents that all the slots of the PUSCH occasion 410-*b* are used, a bit with a value of 1 may represent that all the slots of the PUSCH occasion 410-*b* are unused, or vice versa. After the network entity 105 receives the UCI indicating that all the slots of the PUSCH occasion 410-*b* are unused, the network entity 105 may reallocate resources associated with the unused slots 425 to other UEs 115 or other wireless devices.

When using the transport block-level indication, the UE 115 may only be able to indicate if the UE 115 has used all the slots or skipped all the slots of a PUSCH occasion 410. Due to the relative simplicity of this indication, the UE 115 may have a relatively low uplink signaling overhead. However, in some cases, the UE 115 may use a portion of the slots of a PUSCH occasion 410 and leave the remaining portion of slots in the PUSCH occasion 410 unused. As such, when the UE 115 may be configured to use a transport block-level indication, the UE 115 may be unable to indicate to the network entity 105 that the UE 115 has used some slots of a PUSCH occasion 410 and that the UE 115 has skipped some slots of a PUSCH occasion 410. Thus, in some other examples, the UE 115 may be configured to transmit a slot-level indication, via a bit of a UCI message, to indicate that the UE 115 may have used or skipped a slot of a PUSCH occasion 410. The slot-level indication may allow for a more flexible balance between resource usage and uplink reliability.

As illustrated in the resource configuration 401, within a configured grant period 405-*b*, the network entity 105 may configure a PUSCH occasion 410-*c* with a set of three uplink slots (e.g., a used uplink slot 420-*d*, a used uplink slot 420-*e*, and an unused uplink slot 425-*d*) for transmitting a transport block 430-*c*. In some cases, when configured to transmit a slot-level indication, the UE 115 may transmit a UCI message for each uplink slot to indicate to the network entity 105 whether the UE 115 has used or skipped a slot of the PUSCH occasion 410-*c*. In some other cases, the UE 115 may transmit a single UCI message before the start of the PUSCH occasion 410-*c* indicating that a slot of the PUSCH occasion 410 may be unused.

For example, if the UE 115 transmits UCI for each slot of the PUSCH occasion 410-*c*, for the first two uplink slots (e.g., the used uplink slot 420-*d* and the used uplink slot 420-*e*) the UE 115 may include bits in UCI messages indicating that the UE 115 may have used the uplink slot (e.g., used uplink slot 420). Then in the UCI for the third uplink slot (e.g., the unused uplink slot 425-*d*), the UE 115 may include a bit in the UCI message indicating that the UE 115 may have skipped the uplink slot (e.g., the unused uplink slot 425). In some cases, a bit with a value of 1 in the UCI message may indicate a used uplink slot 420 and a bit with a value of 0 in the UCI message may indicate an unused uplink slot 425, or vice versa.

In some examples, if the UE 115 transmits a single UCI message for the entire PUSCH occasion 410-*c*, the UE 115 may include a bit in the UCI that indicates that the UE 115 may have skipped third slot (e.g., the unused uplink slot 425-*d*) of the PUSCH occasion 410-*c*. In some cases, to indicate which slot of the PUSCH occasion 410-*c* the UE 115 skipped, the UE 115 may also include a slot-ID in addition to the bit indicating the unused uplink slot 425. In such examples, since the UE 115 may be transmitting the transport block 430-*c* in a fewer quantity of slots than the quantity of allocated uplink slots, and based on a downlink CSI measurement showing a good channel quality for the downlink communication link, the UE 115 may increase an effective coding rate given a fixed coding rate for transmitting the transport block 430-*c*. As such, the UE 115 may adjust its parameters for transmitting the transport block 430-*c* based on the current conditions of communications.

In some cases, the UE 115 may also transmit a slot-level indication to the network entity 105 to indicate unused resource blocks of a slot as described herein with reference to FIG. 3. For example, for a PUSCH occasion 410-*d* configured with three slots (e.g., a used uplink slot 420-*f*, a used uplink slot 420-*g*, and an unused uplink slot 425-*e*) used to transmit a transport block 430-*d*, the UE 115 may transmit a slot-indication to indicate unused resource blocks in the uplink slots of the PUSCH occasion 410-*d*. However, while the slot-level indication may be more accurate than the transport block-level indication in some cases, it may result in more signaling overhead and latency and decrease the accuracy and reliability of communications between the UE 115 and the network entity 105. As such, the network entity 105 may configure the UE 115 to transmit a group-level indication as described herein with reference to FIG. 3.

Additionally, or alternatively, the UE 115 may be enabled with DMRS bundling based on phase continuity between slots of a PUSCH occasion 410 as described herein with reference to FIG. 3. The UE 115 may also transmit a capability message indicating that the UE 115 may support indicating unused PUSCH resources according to a transport block-level indication, a slot-level indication, or a group-level indication, as described herein with reference to FIG. 3. Further description of enhancing the communications between the UE 115 and the network entity 105 via a UCI indicating unused PUSCH resources (e.g., an unused PUSCH occasion 410, an unused slot of a PUSCH occasion 410, an unused resource block of a slot, an unused group of slots of a PUSCH occasion 410, or any combination thereof) is described herein with reference to FIG. 5.

Figure 5:
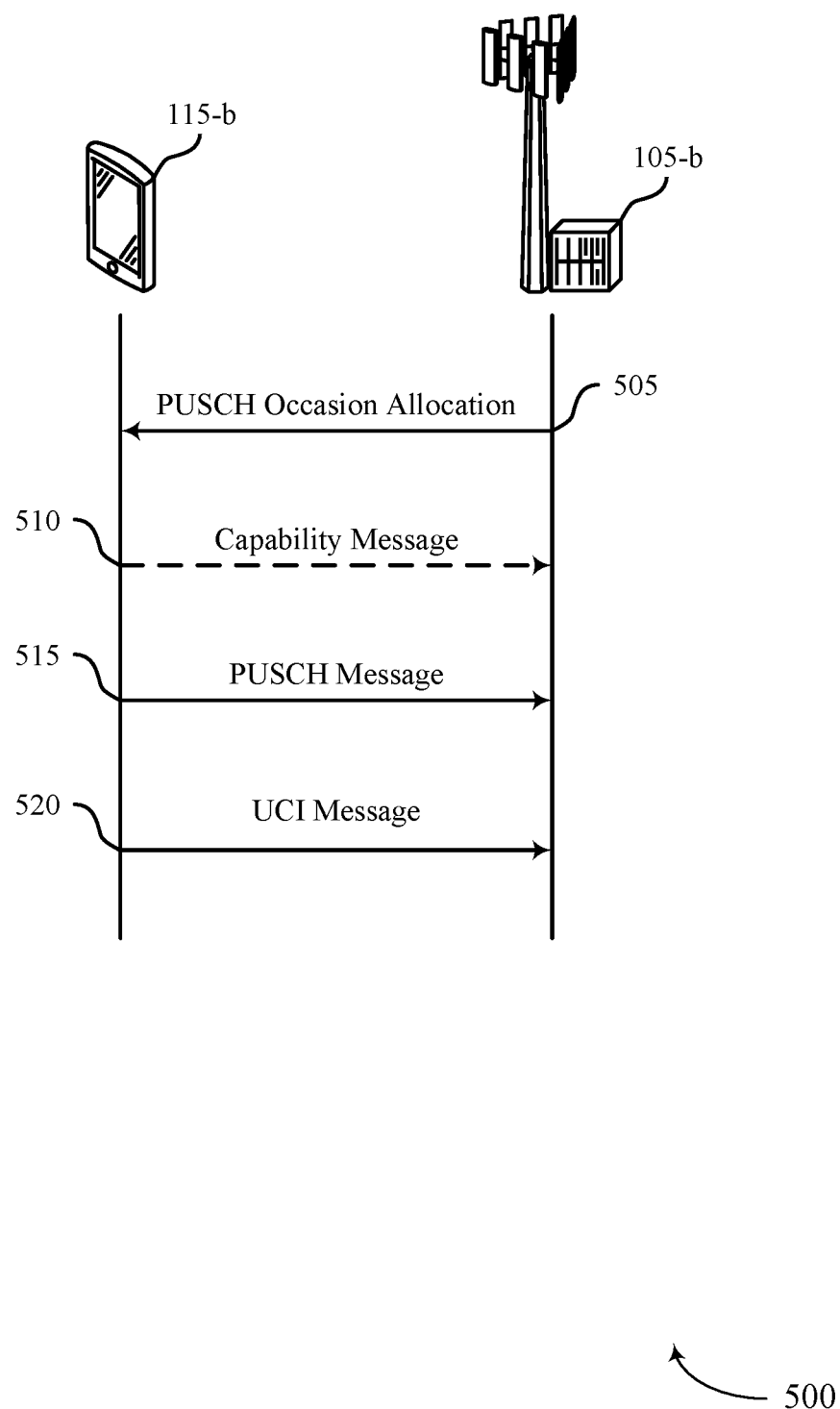
FIG. 5 illustrates an example of a process flow that supports indication of unused uplink shared channel occasions in accordance with one or more aspects of the present disclosure.

FIG. 5 illustrates an example of a process flow 500 that supports indication of unused uplink shared channel occasions in accordance with one or more aspects of the present disclosure. In some examples, the process flow 500 may implement or be implemented by the wireless communication system 100 or the wireless communication system 200. For example, the process flow 500 may include a UE 115-*b* and a network entity 105-*b*, which may examples of devices described herein with reference to FIGS. 1-2. In the following description of the process flow 500, the operations between the UE 115-*b* and the network entity 105-*b* may be performed in different orders or at different times. Some operations may also be left out of the process flow 500, or other operations may be added. Although the UE 115-*b* and the network entity 105-*b* are shown performing the operations of the process flow 500, some aspects of some operations may also be performed by one or more other wireless devices.

At 505, the UE 115-*b* may receive control signaling, from the network entity 105-*b*, indicating a plurality of PUSCH occasions within a configured grant period. Each PUSCH occasion of the plurality of PUSCH occasions may include a set of multiple slots for transmitting a PUSCH message. In some examples, the UE 115 may use the set of slots for transmitting a plurality of repetitions of the PUSCH message (e.g., plurality of PUSCH repetitions). In some other examples, the UE 115 may use the set of slots for transmitting a transport block over multiple slots of the one or more slots of the PUSCH occasion. Additionally, or alternatively, the control signaling from the network entity 105-*b* may enable DMRS bundling at the UE 115-*b* for the plurality of PUSCH occasions. The DMRS bundling may be based on a phase continuity between the set of slots for each PUSCH occasion of the plurality of PUSCH occasions.

At 510, in some cases the UE 115-*b* may transmit a capability message indicating a capability of the UE 115-*b* to transmit a UCI indicating that each slot of a first PUSCH occasion may be unused, a first slot of the first PUSCH occasion may be unused, a first repetition resource of the first PUSCH occasion may be unused, a group of slots of the first PUSCH occasion may be unused, a group of repetition resources of the first PUSCH occasion may be unused, or any combination thereof. In some examples, the capability message may be based on a power level of the UE 115-*b* satisfying a power level threshold, a complexity level of the UE 115-*b*, a UE 115 type that the UE 115-*b* may belong to, or any combination thereof.

At 515, the UE 115-*b* may transmit the PUSCH message, to the network entity 105-*b*, via the set of slots of the first PUSCH occasion of the plurality of PUSCH occasions in accordance with the control information. In some examples, the UE 115-*b* may transmit the plurality of PUSCH repetitions over the set of slots of the first PUSCH occasion. In some cases, the first PUSCH occasion may include a set of repetition resources for transmitting the plurality of PUSCH repetitions where each repetition resource may span one or more slots of the set of slot of the first PUSCH occasion. In some other cases, each slot of the set of slots of the first PUSCH occasion may be used for transmitting one or more of the plurality of PUSCH repetitions and each slot may include a set of repetition resources In some other examples, the UE 115-*b* may transmit a first transport block over the set of slots of the first PUSCH occasion.

At 520, the UE 115-*b* may transmit the UCI, to the network entity 105-*b*, indicating that one or more slots of the set of slots of the first PUSCH occasion may be unused. That is, the UE 115-*b* may skip the one or more unused slots when transmitting the plurality of PUSCH repetitions or transmitting the first transport block during the configured grant period. In some cases, the UE 115-*b* may receive a control message, from the network entity 105-*b*, triggering the UE 115-*b* to transmit the UCI. In some examples, the UE 115-*b* may include a bit in the UCI indicating that each slot of the set of slots of the first PUSCH occasion of the plurality of PUSCH occasions may be unused for transmitting the plurality of PUSCH repetitions related to the first PUSCH occasion or unused for transmitting the first transport block related to the first PUSCH occasion. Additionally, or alternatively, the network entity 105-*b* may transmit the control message based on the capability of the UE 115-*b* indicated in the capability message transmitted at 510.

In some other examples, the UE 115-*b* may transmit, via the UCI, a bit to the network entity 105-*b* indicating that a first slot of the first PUSCH occasion or a first repetition resource of the first PUSCH occasion may be unused for transmitting a first PUSCH repetition of the plurality of repetitions related to the first PUSCH occasion or unused for transmitting the first transport block related to the first PUSCH occasion. In some cases, the UCI may also indicate that a resource block of a plurality of resource blocs of the first slot or of the first repetition resource may be unused for transmitting the first PUSCH repetition of the plurality of PUSCH repetitions related to the first PUSCH occasion or unused for transmitting a first part of the first transport block related to the first PUSCH occasion. In some other cases, the UCI may indicate that a resource block of the plurality of resource block may be unused for transmitting the plurality of PUSCH repetitions or unused for transmitting the first transport block, via one or more slots of the set of slots in the first PUSCH occasion.

In another example, the UE 115-*b* may transmit, via the UCI, a bit to the network entity 105-*b* indicating that a group of slots of the first PUSCH occasion or a group of repetition resources of the first PUSCH occasion may be unused for transmitting the plurality of PUSCH repetitions related to the first PUSCH occasion or unused for transmitting the first transport block of the first PUSCH occasion. In some cases, the group of slots or the group of repetition resources may be equal to the quantity of the set of slots or set of repetition resources allocated for the first PUSCH occasion. As such, the indication may be similar or the same as if the UE 115-*b* transmitted an indication, to the network entity 105-*b*, that each slot of the first PUSCH occasion may be unused.

In such examples, the UE 115-*b* may be enabled with DMRS bundling where the phase continuity may be between the set of slots of a PUSCH occasion. In some examples, when the UCI indicates that a resource block used in a first slot of the set of slots may be unused in a second slot of the set of slots that is adjacent to the first slot, the phase continuity may be broken between the set of slots based on the indication from the UCI. In some other examples, the UCI may indicate that the phase continuity may be broken based on the UE 115-*b* entering a power saving mode or a power level of the UE 115-*b* being below a power level threshold. Additionally, or alternatively, the phase continuity may be broken whenever the UE 115-*b* indicates some unused PUSCH resources (e.g., unused PUSCH occasion, unused slot of a PUSCH occasion, unused resource block of a slot, or unused group of PUSCH occasions).

In some cases, the phase continuity between the set of slots may also be broken based on the one or more unused slots being related to one or more PUSCH repetitions of the plurality of PUSCH repetitions or being related to the first transport block. In some other cases, the phase continuity between the set of slots may be broken based on a quantity of silent time units after other the one or more unused slots of the first PUSCH occasion being greater than a time threshold. That is, the phase continuity may be broken if the UE 115-*b* refrains from transmitting data for a length of time (e.g., the length of time including the quantity of silent time units) longer than the time threshold.

Such techniques of the present disclose described herein may enable the UE 115-*b* and the network entity 105-*b* to communicate more efficiently, reliably, and with less latency. Additionally, or alternatively, the techniques described herein may support for more efficient use of resources in the whole wireless communication system and may enhance communications of other UEs 115 with the network entity 105-*b*. Further descriptions of such techniques of the present disclosure may be described herein including with reference to FIGS. 6-22.

Figure 6:
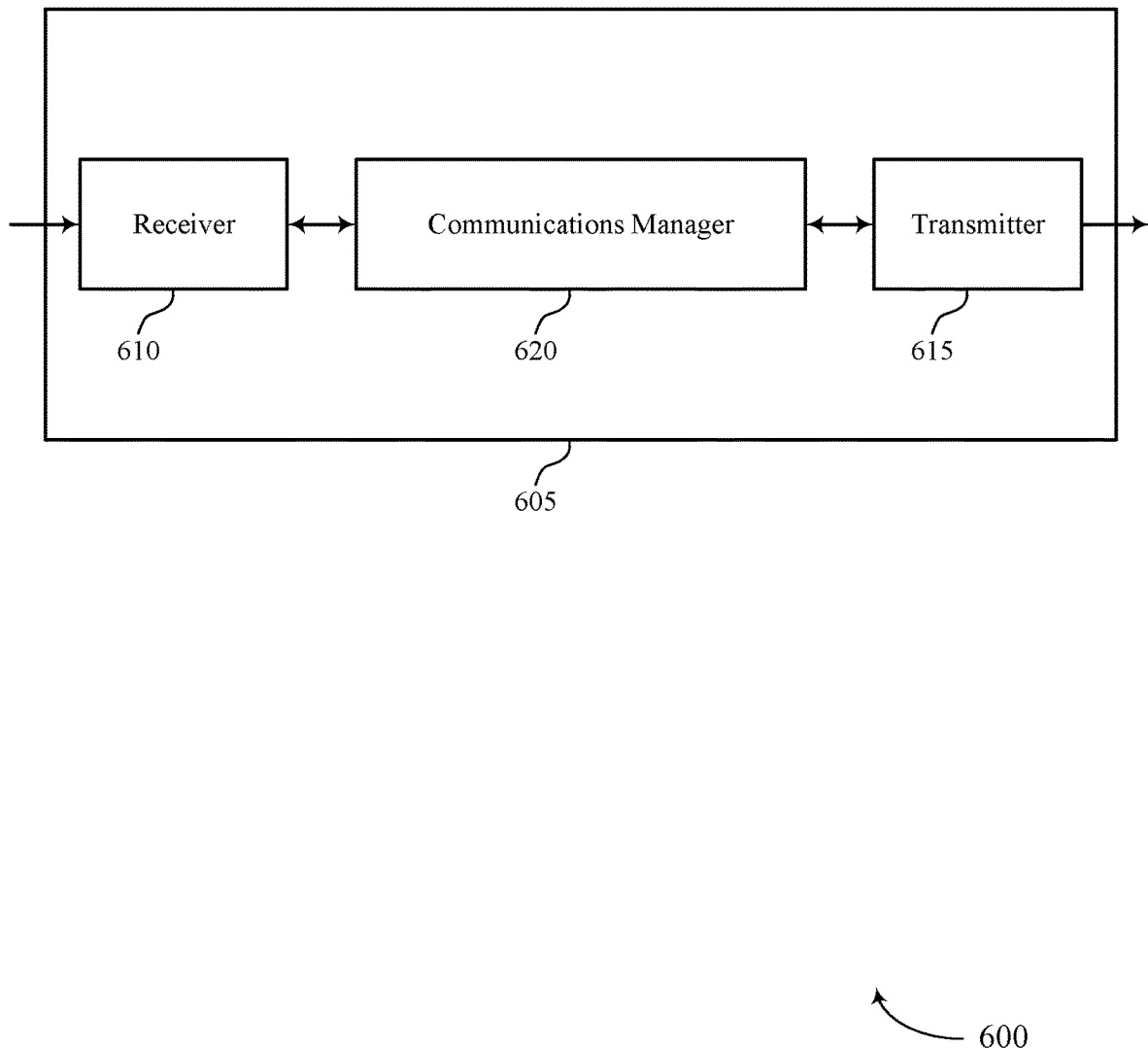
FIGS. 6 and 7 illustrate block diagrams of devices that support indication of unused uplink shared channel occasions in accordance with one or more aspects of the present disclosure.

FIG. 6 shows a block diagram 600 of a device 605 that supports indication of unused uplink shared channel occasions in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to indication of unused uplink shared channel occasions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to indication of unused uplink shared channel occasions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of indication of unused uplink shared channel occasions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 is capable of, configured to, or operable to support a means for receiving control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions. The communications manager 620 is capable of, configured to, or operable to support a means for transmitting the set of multiple uplink shared channel repetitions in the set of multiple slots of a first uplink shared channel occasion of the set of multiple uplink shared channel occasions in accordance with the received control information. The communications manager 620 is capable of, configured to, or operable to support a means for transmitting UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 620 may support wireless communications at a UE in accordance with examples as disclosed herein. For example, the communications manager 620 is capable of, configured to, or operable to support a means for receiving control information indicating a set of multiple uplink shared channel occasions within a configured grant period, where each uplink shared channel occasion of the set of multiple uplink shared channel occasions includes a set of multiple slots for transmitting a transport block. The communications manager 620 is capable of, configured to, or operable to support a means for transmitting a first transport block in the set of multiple slots of a first uplink shared channel occasion of the set of multiple uplink shared channel occasions in accordance with the received control information. The communications manager 620 is capable of, configured to, or operable to support a means for transmitting UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 620 may support wireless communications at a UE in accordance with examples as disclosed herein. For example, the communications manager 620 is capable of, configured to, or operable to support a means for receiving control information indicating an enabling DMRS for a set of multiple uplink shared channel occasions within a configured grant period, where each uplink shared channel occasion of the set of multiple uplink shared channel occasions includes a set of one or more slots for transmitting a set of multiple uplink shared channel repetitions, and where the DMRS is based on a phase continuity between the set of slots. The communications manager 620 is capable of, configured to, or operable to support a means for transmitting the set of multiple uplink shared channel repetitions in the set of slots of a first uplink shared channel occasion of the set of multiple uplink shared channel occasions in accordance with the received control information. The communications manager 620 is capable of, configured to, or operable to support a means for transmitting UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for indicating unused resources of a PUSCH occasion for reduced processing, reduced power consumption, and more efficient utilization of communication resources.

Figure 7:
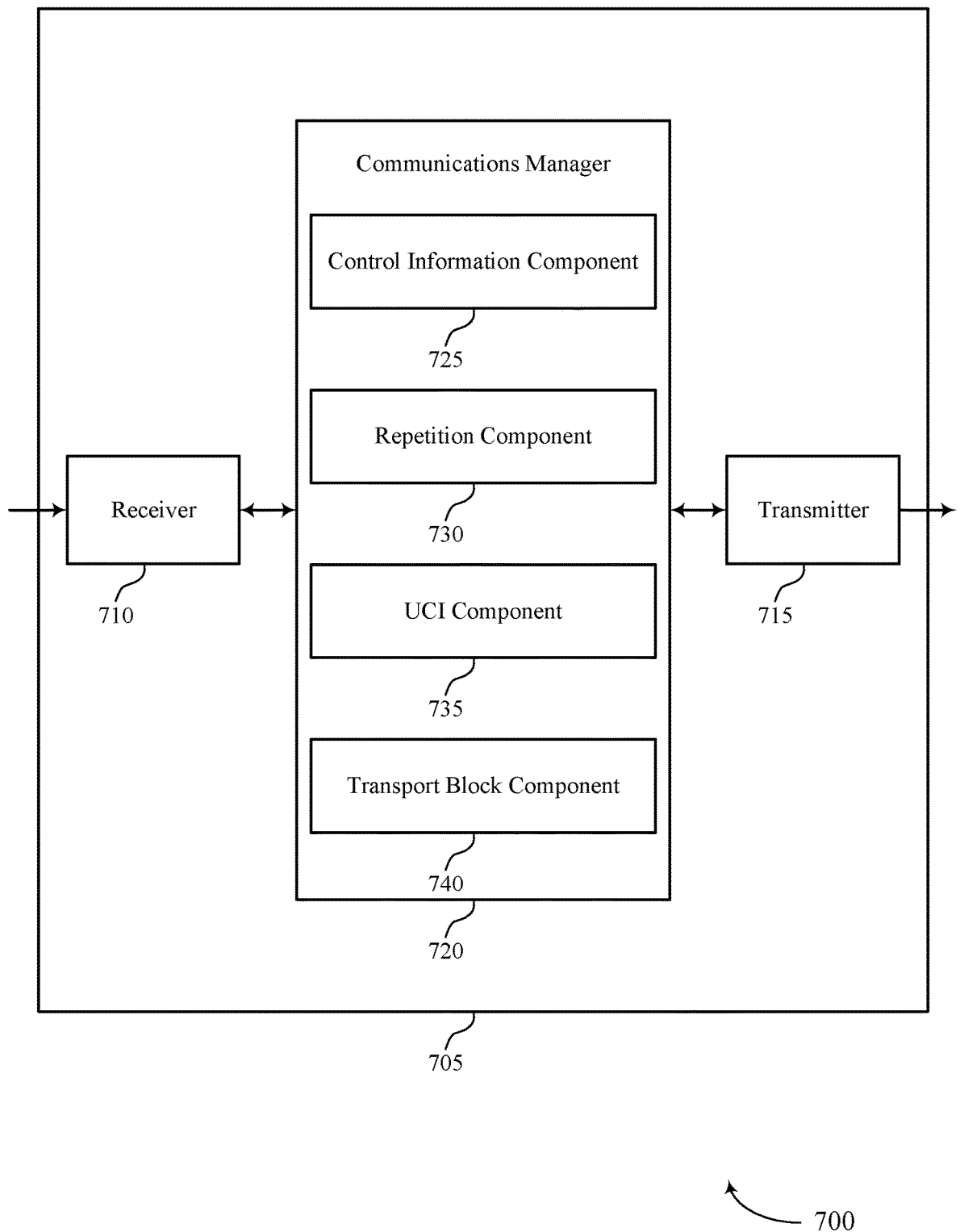

FIG. 7 shows a block diagram 700 of a device 705 that supports indication of unused uplink shared channel occasions in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to indication of unused uplink shared channel occasions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to indication of unused uplink shared channel occasions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of indication of unused uplink shared channel occasions as described herein. For example, the communications manager 720 may include a control information component 725, a repetition component 730, a UCI component 735, a transport block component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The control information component 725 is capable of, configured to, or operable to support a means for receiving control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions. The repetition component 730 is capable of, configured to, or operable to support a means for transmitting the set of multiple uplink shared channel repetitions in the set of multiple slots of a first uplink shared channel occasion of the set of multiple uplink shared channel occasions in accordance with the received control information. The UCI component 735 is capable of, configured to, or operable to support a means for transmit UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 720 may support wireless communications at a UE in accordance with examples as disclosed herein. The control information component 725 is capable of, configured to, or operable to support a means for receiving control information indicating a set of multiple uplink shared channel occasions within a configured grant period, where each uplink shared channel occasion of the set of multiple uplink shared channel occasions includes a set of multiple slots for transmitting a transport block. The transport block component 740 is capable of, configured to, or operable to support a means for transmitting a first transport block in the set of multiple slots of a first uplink shared channel occasion of the set of multiple uplink shared channel occasions in accordance with the received control information. The UCI component 735 is capable of, configured to, or operable to support a means for transmitting UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 720 may support wireless communications at a UE in accordance with examples as disclosed herein. The control information component 725 is capable of, configured to, or operable to support a means for receiving control information indicating an enabling DMRS for a set of multiple uplink shared channel occasions within a configured grant period, where each uplink shared channel occasion of the set of multiple uplink shared channel occasions includes a set of one or more slots for transmitting a set of multiple uplink shared channel repetitions, and where the DMRS is based on a phase continuity between the set of slots. The repetition component 730 is capable of, configured to, or operable to support a means for transmitting the set of multiple uplink shared channel repetitions in the set of slots of a first uplink shared channel occasion of the set of multiple uplink shared channel occasions in accordance with the received control information. The UCI component 735 is capable of, configured to, or operable to support a means for transmitting UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

Figure 8:
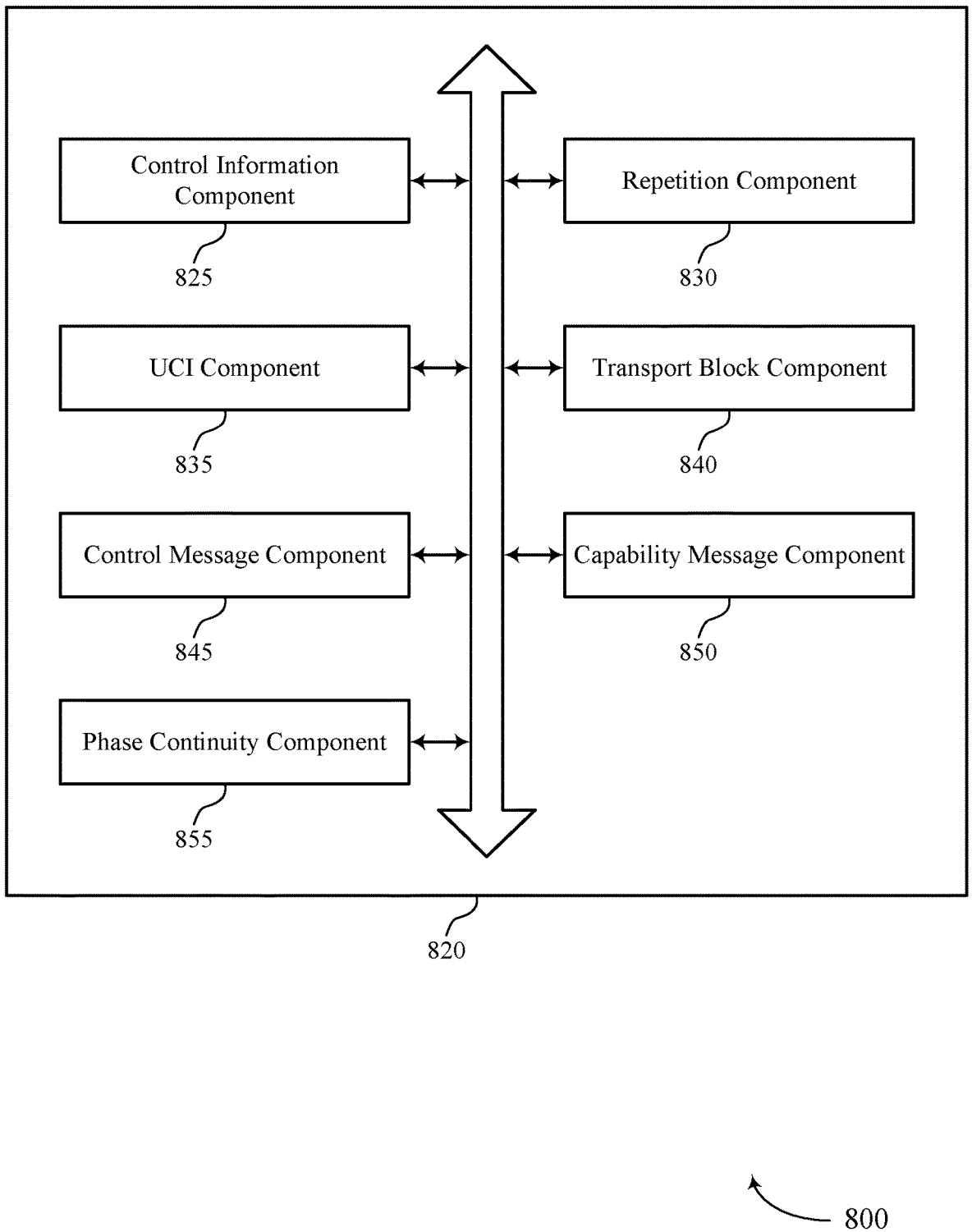
FIG. 8 illustrates a block diagram of a communications manager that supports indication of unused uplink shared channel occasions in accordance with one or more aspects of the present disclosure.

FIG. 8 shows a block diagram 800 of a communications manager 820 that supports indication of unused uplink shared channel occasions in accordance with one or more aspects of the present disclosure. The communications manager 820 may be an example of aspects of a communications manager 620, a communications manager 720, or both, as described herein. The communications manager 820, or various components thereof, may be an example of means for performing various aspects of indication of unused uplink shared channel occasions as described herein. For example, the communications manager 820 may include a control information component 825, a repetition component 830, a UCI component 835, a transport block component 840, a control message component 845, a capability message component 850, a phase continuity component 855, or any combination thereof. Each of these components may communicate, directly or indirectly, with one another (e.g., via one or more buses).

The communications manager 820 may support wireless communication at a UE in accordance with examples as disclosed herein. The control information component 825 is capable of, configured to, or operable to support a means for receiving control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions. The repetition component 830 is capable of, configured to, or operable to support a means for transmitting the set of multiple uplink shared channel repetitions in the set of multiple slots of a first uplink shared channel occasion of the set of multiple uplink shared channel occasions in accordance with the received control information. The UCI component 835 is capable of, configured to, or operable to support a means for transmit UCI indicating that one or more slots of the set of multiple slots of the first uplink shared channel occasion are unused, where the one or more unused slots of the first uplink shared channel occasion are skipped during the configured grant period.

In some examples, to support transmitting the UCI, the UCI component 835 is capable of, configured to, or operable to support a means for transmitting, via the UCI, a bit indicating that each slot of the set of multiple slots of the first uplink shared channel occasion of the set of multiple uplink shared channel occasions is unused for transmitting the set of multiple uplink shared channel repetitions associated with the first uplink shared channel occasion.

In some examples, to support transmitting the UCI, the UCI component 835 is capable of, configured to, or operable to support a means for transmitting, via the UCI, a bit indicating that a first slot of the first uplink shared channel occasion or a first repetition resource of the first uplink shared channel occasion is unused for transmitting a first uplink shared channel repetition of the set of multiple uplink shared channel repetitions associated with the first uplink shared channel occasion.

In some examples, the UCI indicates that a resource block of a set of multiple resource blocks of the first slot or the first repetition resource is unused for transmitting the first uplink shared channel repetition of the set of multiple uplink shared channel repetitions associated with the first uplink shared channel occasion.

In some examples, the UCI indicates that a resource block of a set of multiple resource blocks is unused for transmitting the set of multiple uplink shared channel repetitions via the one or more slots of the set of multiple slots in the first uplink shared channel occasion.

In some examples, to support transmitting the UCI, the UCI component 835 is capable of, configured to, or operable to support a means for transmitting, via the UCI, a bit indicating that a group of slots of the first uplink shared channel occasion or a group of repetition resources of the first uplink shared channel occasion is unused for transmitting the set of multiple uplink shared channel repetitions associated with the first uplink shared channel occasion.

In some examples, the control message component 845 is capable of, configured to, or operable to support a means for receiving a control message triggering the UE to transmit the UCI indicating that each slot of the first uplink shared channel occasion is unused, a first slot of the first uplink shared channel occasion is unused, a first repetition resource of the first uplink shared channel occasion is unused, a group of slots of the first uplink shared channel occasion is unused, a group of repetition resources of the first uplink shared channel occasion is unused, or any combination thereof.

In some examples, the capability message component 850 is capable of, configured to, or operable to support a means for transmitting a capability message indicating a capability of the UE to transmit the UCI indicating that each slot of the first uplink shared channel occasion is unused, a first slot of the first uplink shared channel occasion is unused, a first repetition resource of the first uplink shared channel occasion is unused, a group of slots of the first uplink shared channel occasion is unused, a group of repetition resources of the first uplink shared channel occasion is unused, or any combination thereof.

In some examples, the capability message indicates the capability of the UE to transmit the UCI indicating that each slot of the first uplink shared channel occasion is unused based on a power level of the UE satisfying a power level threshold, a complexity level of the UE, a UE type, or any combination thereof.

Additionally, or alternatively, the communications manager 820 may support wireless communications at a UE in accordance with examples as disclosed herein. In some examples, the control information component 825 is capable of, configured to, or operable to support a means for receiving control information indicating a set of multiple uplink shared channel occasions within a configured grant period, where each uplink shared channel occasion of the set of multiple uplink shared channel occasions includes a set of multiple slots for transmitting a transport block. The transport block component 840 is capable of, configured to, or operable to support a means for transmitting a first transport block in the set of multiple slots of a first uplink shared channel occasion of the set of multiple uplink shared channel occasions in accordance with the received control information. In some examples, the UCI component 835 is capable of, configured to, or operable to support a means for transmitting UCI indicating that one or more slots of the set of multiple slots of the first uplink shared channel occasion are unused, where the one or more unused slots of the first uplink shared channel occasion are skipped during the configured grant period.

In some examples, to support transmitting the UCI, the UCI component 835 is capable of, configured to, or operable to support a means for transmitting, via the UCI, a bit indicating that each slot of the set of multiple slots of the first uplink shared channel occasion of the set of multiple uplink shared channel occasions is unused for transmitting the first transport block associated with the first uplink shared channel occasion.

In some examples, to support transmitting the UCI, the UCI component 835 is capable of, configured to, or operable to support a means for transmitting, via the UCI, a bit indicating that a first slot of the first uplink shared channel occasion is unused for transmitting the first transport block associated with the first uplink shared channel occasion.

Additionally, or alternatively, the communications manager 820 may support wireless communications at a UE in accordance with examples as disclosed herein. In some examples, the control information component 825 is capable of, configured to, or operable to support a means for receiving control information indicating an enabling DMRS for a set of multiple uplink shared channel occasions within a configured grant period, where each uplink shared channel occasion of the set of multiple uplink shared channel occasions includes a set of one or more slots for transmitting a set of multiple uplink shared channel repetitions, and where the DMRS is based on a phase continuity between the set of slots. In some examples, the repetition component 830 is capable of, configured to, or operable to support a means for transmitting the set of multiple uplink shared channel repetitions in the set of slots of a first uplink shared channel occasion of the set of multiple uplink shared channel occasions in accordance with the received control information. In some examples, the UCI component 835 is capable of, configured to, or operable to support a means for transmitting UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

In some examples, the phase continuity between the set of slots is broken based on the one or more unused slots, the one or more unused slots associated with one or more uplink shared channel repetitions of the set of multiple uplink shared channel repetitions.

In some examples, the UCI indicates that a resource block used in a first slot of the set of slots is unused in a second slot in the set of slots, the first slot adjacent to the second slot in the first uplink shared channel occasion, and where the phase continuity between the set of slots is broken based on the UCI.

In some examples, the phase continuity between the set of slots is broken based on a quantity of silent time units after the one or more unused slots of the first uplink shared channel occasion is greater than a time threshold.

In some examples, the phase continuity component 855 is capable of, configured to, or operable to support a means for the phase continuity between the set of slots is broken based on the UCI indicating an unused slot of the first uplink shared channel occasion or an unused resource block of a first slot of the first uplink shared channel occasion.

In some examples, the UCI indicates that the phase continuity between the set of slots is broken.

Figure 9:
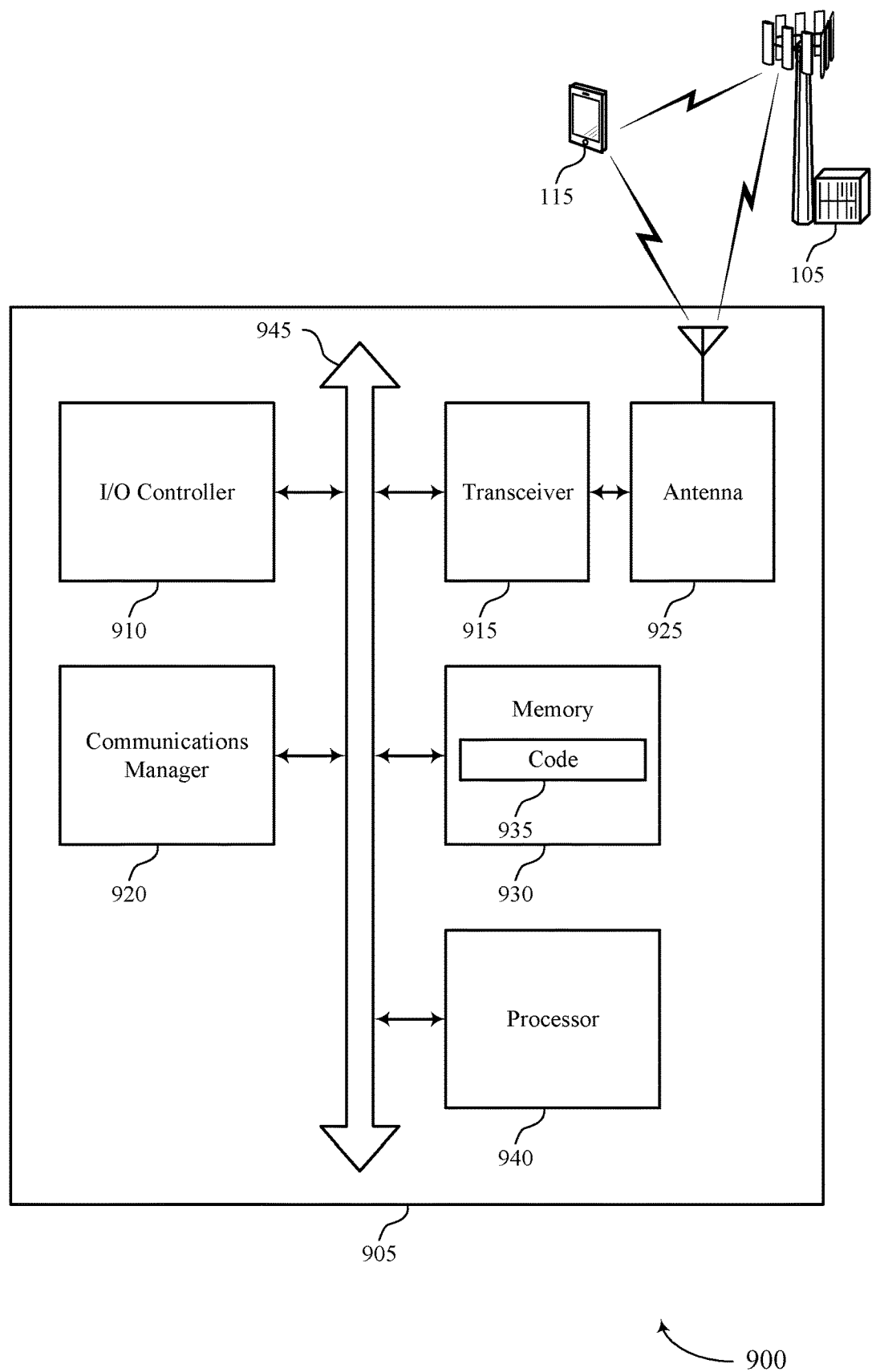
FIG. 9 illustrates a diagram of a system including a device that supports indication of unused uplink shared channel occasions in accordance with one or more aspects of the present disclosure.

FIG. 9 shows a diagram of a system 900 including a device 905 that supports indication of unused uplink shared channel occasions in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting indication of unused uplink shared channel occasions). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 is capable of, configured to, or operable to support a means for receiving control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions. The communications manager 920 is capable of, configured to, or operable to support a means for transmitting the set of multiple uplink shared channel repetitions in the set of multiple slots of a first uplink shared channel occasion of the set of multiple uplink shared channel occasions in accordance with the received control information. The communications manager 920 is capable of, configured to, or operable to support a means for transmitting UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 920 may support wireless communications at a UE in accordance with examples as disclosed herein. For example, the communications manager 920 is capable of, configured to, or operable to support a means for receiving control information indicating a set of multiple uplink shared channel occasions within a configured grant period, where each uplink shared channel occasion of the set of multiple uplink shared channel occasions includes a set of multiple slots for transmitting a transport block. The communications manager 920 is capable of, configured to, or operable to support a means for transmitting a first transport block in the set of multiple slots of a first uplink shared channel occasion of the set of multiple uplink shared channel occasions in accordance with the received control information. The communications manager 920 is capable of, configured to, or operable to support a means for transmitting UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 920 may support wireless communications at a UE in accordance with examples as disclosed herein. For example, the communications manager 920 is capable of, configured to, or operable to support a means for receiving control information indicating an enabling DMRS for a set of multiple uplink shared channel occasions within a configured grant period, where each uplink shared channel occasion of the set of multiple uplink shared channel occasions includes a set of one or more slots for transmitting a set of multiple uplink shared channel repetitions, and where the DMRS is based on a phase continuity between the set of slots. The communications manager 920 is capable of, configured to, or operable to support a means for transmitting the set of multiple uplink shared channel repetitions in the set of slots of a first uplink shared channel occasion of the set of multiple uplink shared channel occasions in accordance with the received control information. The communications manager 920 is capable of, configured to, or operable to support a means for transmitting UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

By including or configuring the communications manager 920 in accordance with examples as described herein, the device 905 may support techniques for indicating unused resources of a PUSCH occasion for improved communication reliability, reduced latency, improved user experience related to reduced processing, reduced power consumption, more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of indication of unused uplink shared channel occasions as described herein, or the processor 940 and the memory 930 may be otherwise configured to perform or support such operations.

Figure 10:
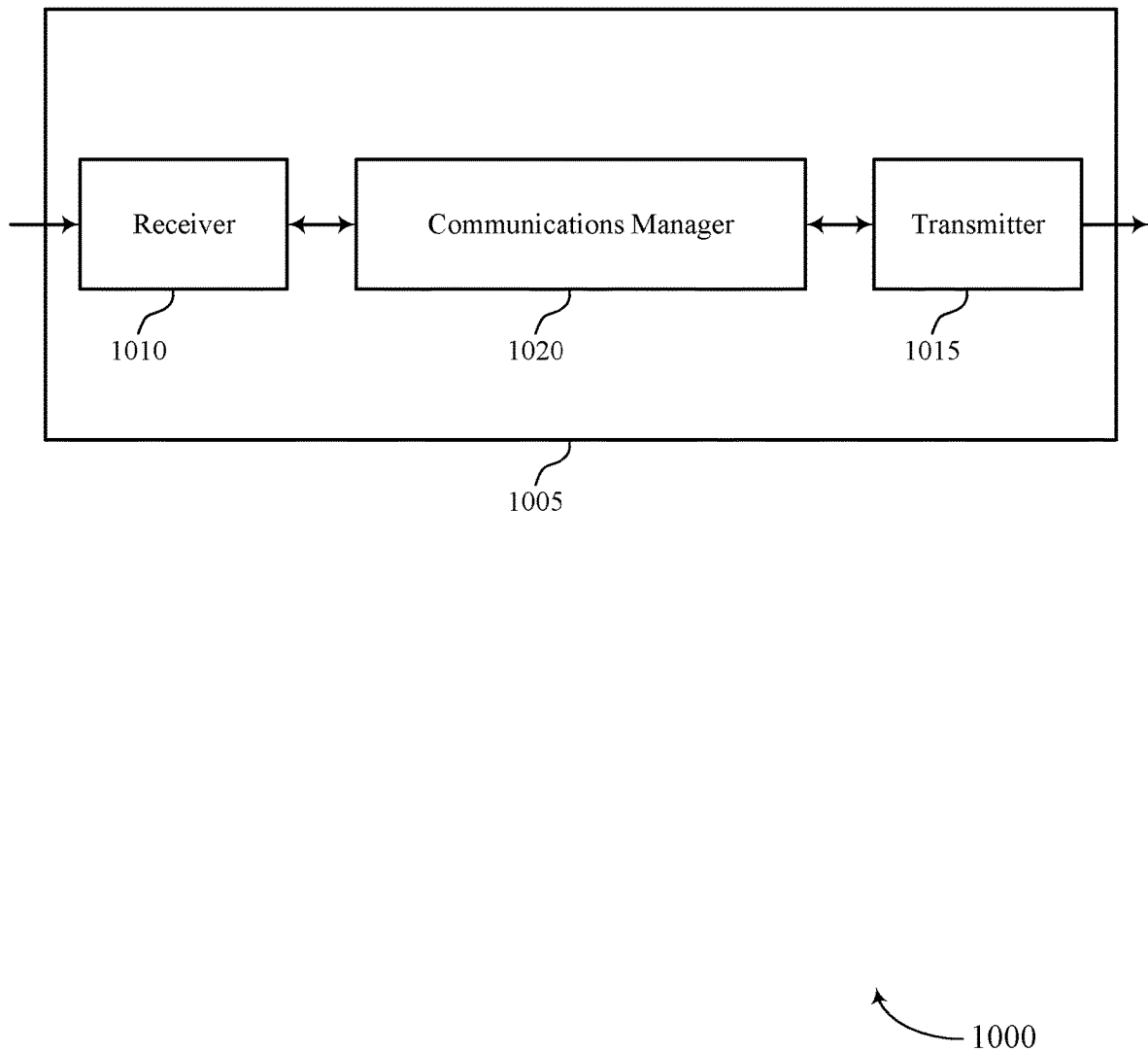
FIGS. 10 and 11 illustrate block diagrams of devices that support indication of unused uplink shared channel occasions in accordance with one or more aspects of the present disclosure.

FIG. 10 shows a block diagram 1000 of a device 1005 that supports indication of unused uplink shared channel occasions in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of indication of unused uplink shared channel occasions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 is capable of, configured to, or operable to support a means for transmitting control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions. The communications manager 1020 is capable of, configured to, or operable to support a means for receiving the set of multiple uplink shared channel repetitions in the set of multiple slots of a first uplink shared channel occasion of the set of multiple uplink shared channel occasions in accordance with the transmitted control information. The communications manager 1020 is capable of, configured to, or operable to support a means for receiving UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 1020 may support wireless communications at a network entity in accordance with examples as disclosed herein. For example, the communications manager 1020 is capable of, configured to, or operable to support a means for transmitting control information indicating a set of multiple uplink shared channel occasions within a configured grant period, where each uplink shared channel occasion of the set of multiple uplink shared channel occasions includes a set of multiple slots for transmitting a transport block. The communications manager 1020 is capable of, configured to, or operable to support a means for receiving a first transport block in the set of multiple slots of a first uplink shared channel occasion of the set of multiple uplink shared channel occasions in accordance with the transmitted control information. The communications manager 1020 is capable of, configured to, or operable to support a means for receiving UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 1020 may support wireless communications at a network entity in accordance with examples as disclosed herein. For example, the communications manager 1020 is capable of, configured to, or operable to support a means for transmitting control information indicating enabling DMRS for a set of multiple uplink shared channel occasions within a configured grant period, where each uplink shared channel occasion of the set of multiple uplink shared channel occasions includes a set of one or more slots for transmitting a set of multiple uplink shared channel repetitions and where the DMRS is based on a phase continuity between the set of slots. The communications manager 1020 is capable of, configured to, or operable to support a means for receiving the set of multiple uplink shared channel repetitions in the set of slots of a first uplink shared channel occasion of the set of multiple uplink shared channel occasions in accordance with the transmitted control information. The communications manager 1020 is capable of, configured to, or operable to support a means for receiving UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for indicating unused resources of a PUSCH occasion for reduced processing, reduced power consumption, and more efficient utilization of communication resources.

Figure 11:
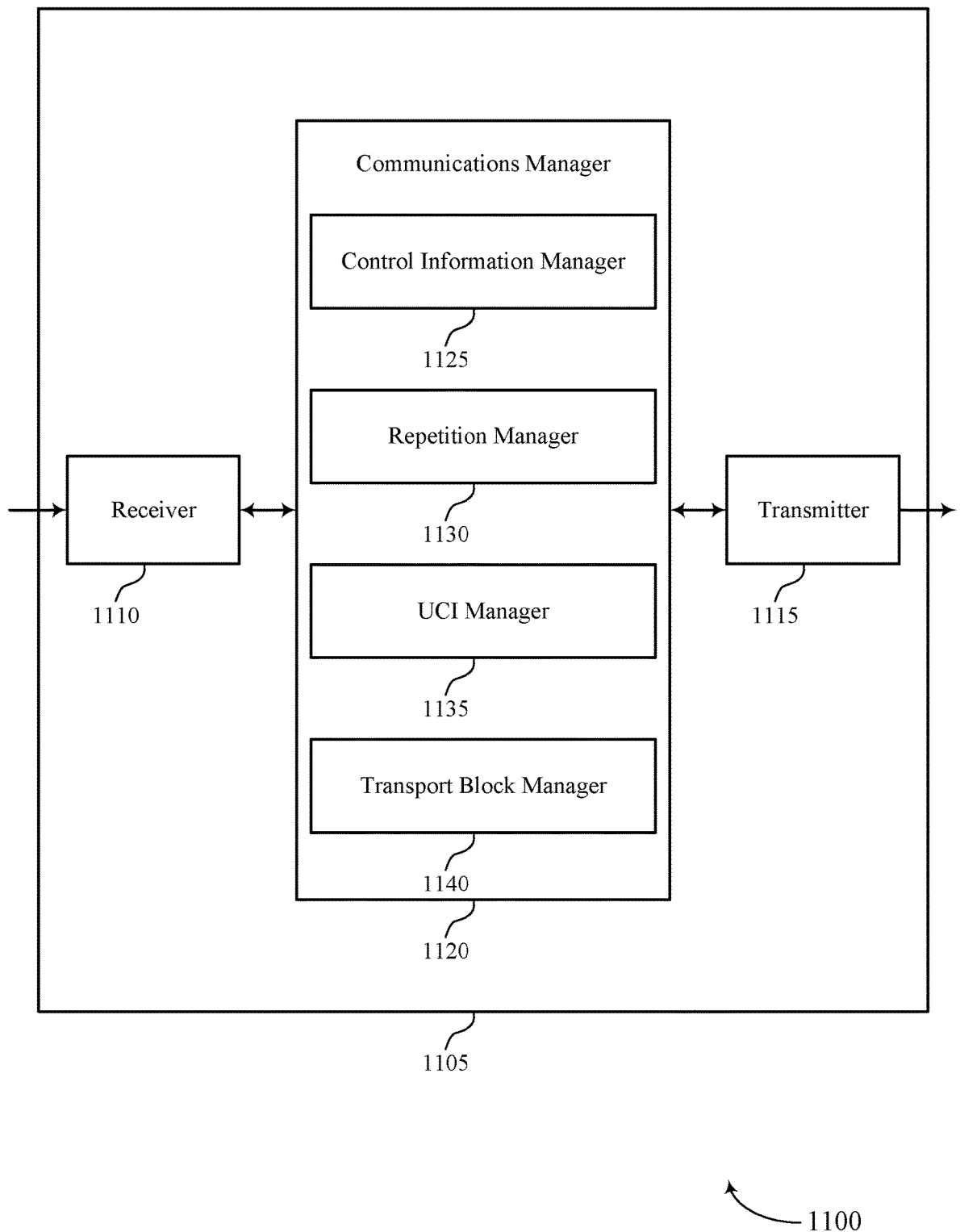

FIG. 11 shows a block diagram 1100 of a device 1105 that supports indication of unused uplink shared channel occasions in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of indication of unused uplink shared channel occasions as described herein. For example, the communications manager 1120 may include a control information manager 1125, a repetition manager 1130, a UCI manager 1135, a transport block manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The control information manager 1125 is capable of, configured to, or operable to support a means for transmitting control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions. The repetition manager 1130 is capable of, configured to, or operable to support a means for receiving the set of multiple uplink shared channel repetitions in the set of multiple slots of a first uplink shared channel occasion of the set of multiple uplink shared channel occasions in accordance with the transmitted control information. The UCI manager 1135 is capable of, configured to, or operable to support a means for receiving UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 1120 may support wireless communications at a network entity in accordance with examples as disclosed herein. The control information manager 1125 is capable of, configured to, or operable to support a means for transmitting control information indicating a set of multiple uplink shared channel occasions within a configured grant period, where each uplink shared channel occasion of the set of multiple uplink shared channel occasions includes a set of multiple slots for transmitting a transport block. The transport block manager 1140 is capable of, configured to, or operable to support a means for receiving a first transport block in the set of multiple slots of a first uplink shared channel occasion of the set of multiple uplink shared channel occasions in accordance with the transmitted control information. The UCI manager 1135 is capable of, configured to, or operable to support a means for receiving UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 1120 may support wireless communications at a network entity in accordance with examples as disclosed herein. The control information manager 1125 is capable of, configured to, or operable to support a means for transmitting control information indicating enabling DMRS for a set of multiple uplink shared channel occasions within a configured grant period, where each uplink shared channel occasion of the set of multiple uplink shared channel occasions includes a set of one or more slots for transmitting a set of multiple uplink shared channel repetitions and where the DMRS is based on a phase continuity between the set of slots. The repetition manager 1130 is capable of, configured to, or operable to support a means for receiving the set of multiple uplink shared channel repetitions in the set of slots of a first uplink shared channel occasion of the set of multiple uplink shared channel occasions in accordance with the transmitted control information. The UCI manager 1135 is capable of, configured to, or operable to support a means for receiving UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

Figure 12:
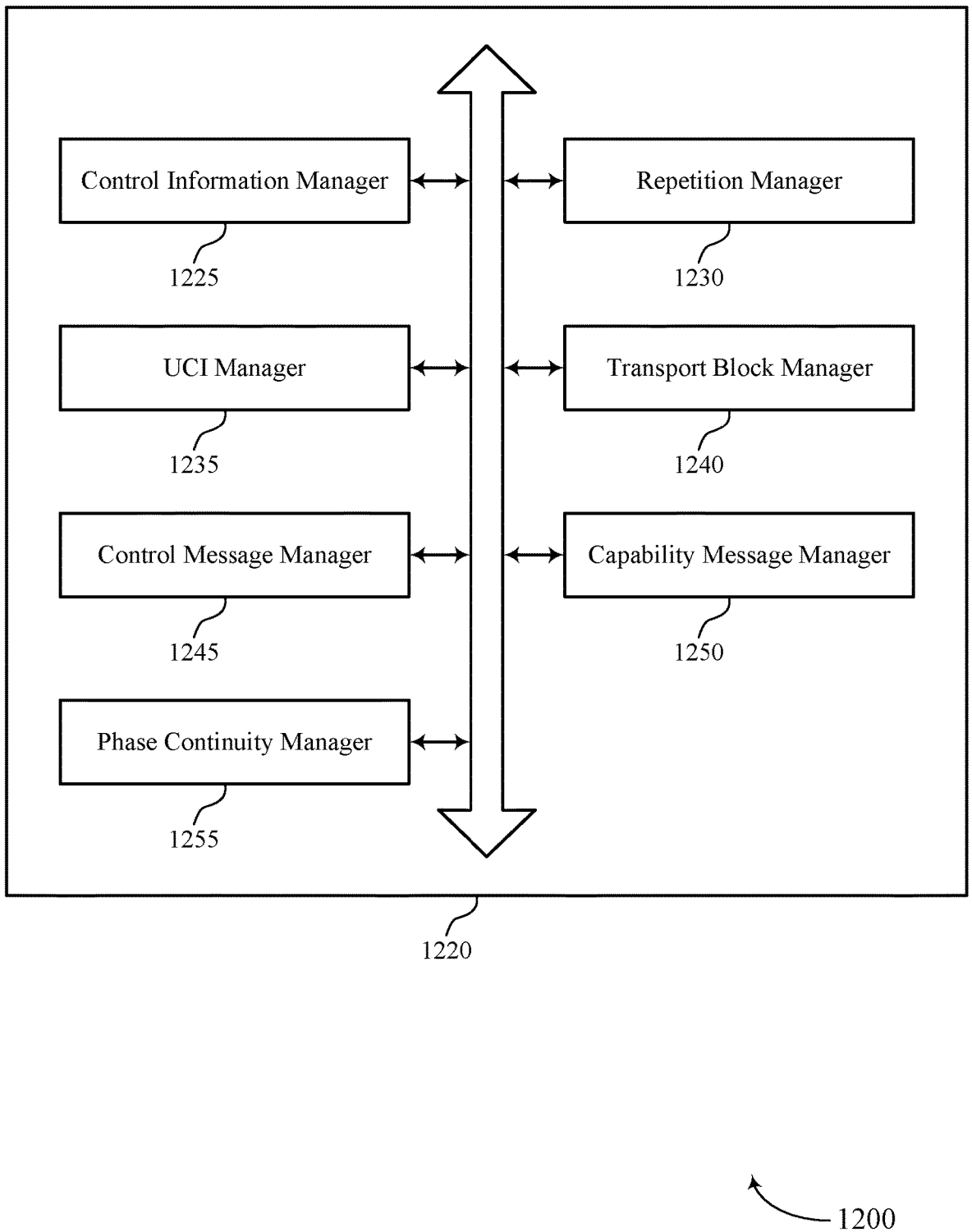
FIG. 12 illustrates a block diagram of a communications manager that supports indication of unused uplink shared channel occasions in accordance with one or more aspects of the present disclosure.

FIG. 12 shows a block diagram 1200 of a communications manager 1220 that supports indication of unused uplink shared channel occasions in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of indication of unused uplink shared channel occasions as described herein. For example, the communications manager 1220 may include a control information manager 1225, a repetition manager 1230, a UCI manager 1235, a transport block manager 1240, a control message manager 1245, a capability message manager 1250, a phase continuity manager 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The control information manager 1225 is capable of, configured to, or operable to support a means for transmitting control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions. The repetition manager 1230 is capable of, configured to, or operable to support a means for receiving the set of multiple uplink shared channel repetitions in the set of multiple slots of a first uplink shared channel occasion of the set of multiple uplink shared channel occasions in accordance with the transmitted control information. The UCI manager 1235 is capable of, configured to, or operable to support a means for receiving UCI indicating that one or more slots of the set of multiple slots of the first uplink shared channel occasion are unused, where the one or more unused slots of the first uplink shared channel occasion are skipped during the configured grant period.

In some examples, to support receiving the UCI, the UCI manager 1235 is capable of, configured to, or operable to support a means for receiving, via the UCI, a bit indicating that each slot of the set of multiple slots of the first uplink shared channel occasion of the set of multiple uplink shared channel occasions is unused for transmitting the set of multiple uplink shared channel repetitions associated with the first uplink shared channel occasion.

In some examples, to support receiving the UCI, the UCI manager 1235 is capable of, configured to, or operable to support a means for receiving, via the UCI, a bit indicating that a first slot of the first uplink shared channel occasion or a first repetition resource of the first uplink shared channel occasion is unused for transmitting a first uplink shared channel repetition of the set of multiple uplink shared channel repetitions associated with the first uplink shared channel occasion.

In some examples, the UCI indicates that a resource block of a set of multiple resource blocks of the first slot or a first repetition resource is unused for transmitting the first uplink shared channel repetition of the set of multiple uplink shared channel repetitions associated with the first uplink shared channel occasion.

In some examples, the UCI indicates that a resource block of a set of multiple resource blocks is unused for transmitting the set of multiple uplink shared channel repetitions via one or more slots of a set of multiple slots in the first uplink shared channel occasion.

In some examples, to support receiving the UCI, the UCI manager 1235 is capable of, configured to, or operable to support a means for receiving, via the UCI, a bit indicating that a group of slots of the first uplink shared channel occasion or a group of repetition resources of the first uplink shared channel occasion is unused for transmitting the set of multiple uplink shared channel repetitions associated with the first uplink shared channel occasion.

In some examples, the control message manager 1245 is capable of, configured to, or operable to support a means for transmitting a control message triggering a UE to transmit the UCI indicating that each slot of the first uplink shared channel occasion is unused, a first slot of the first uplink shared channel occasion is unused, a group of slots of the first uplink shared channel occasion is unused, or any combination thereof.

In some examples, the capability message manager 1250 is capable of, configured to, or operable to support a means for receiving a capability message indicating a capability of a UE to transmit the UCI indicating that each slot of the first uplink shared channel occasion is unused, a first slot of the first uplink shared channel occasion is unused, a first repetition resource of the first uplink shared channel occasion is unused, a group of slots of the first uplink shared channel occasion are unused, a group of repetition resources of the first uplink shared channel occasion are unused, or any combination thereof.

In some examples, the capability message indicates the capability of the UE to transmit the UCI indicating that each slot of the first uplink shared channel occasion is unused based on a power level of the UE satisfying a power level threshold, a complexity level of the UE, or a UE type, or any combination thereof.

Additionally, or alternatively, the communications manager 1220 may support wireless communications at a network entity in accordance with examples as disclosed herein. In some examples, the control information manager 1225 is capable of, configured to, or operable to support a means for transmitting control information indicating a set of multiple uplink shared channel occasions within a configured grant period, where each uplink shared channel occasion of the set of multiple uplink shared channel occasions includes a set of multiple slots for transmitting a transport block. The transport block manager 1240 is capable of, configured to, or operable to support a means for receiving a first transport block in the set of multiple slots of a first uplink shared channel occasion of the set of multiple uplink shared channel occasions in accordance with the transmitted control information. In some examples, the UCI manager 1235 is capable of, configured to, or operable to support a means for receiving UCI indicating that one or more slots of the set of multiple slots of the first uplink shared channel occasion are unused, where the one or more unused slots of the first uplink shared channel occasion are skipped during the configured grant period.

In some examples, to support receiving the UCI, the UCI manager 1235 is capable of, configured to, or operable to support a means for receiving, via the UCI, a bit indicating that each slot of the set of multiple slots of the first uplink shared channel occasion of the set of multiple uplink shared channel occasions in unused for transmitting the first transport block associated with the first uplink shared channel occasion.

In some examples, to support receiving the UCI, the UCI manager 1235 is capable of, configured to, or operable to support a means for transmitting, via the UCI, a bit indicating that a first slot of the first uplink shared channel occasion is unused for transmitting the first transport block associated with the first uplink shared channel occasion.

Additionally, or alternatively, the communications manager 1220 may support wireless communications at a network entity in accordance with examples as disclosed herein. In some examples, the control information manager 1225 is capable of, configured to, or operable to support a means for transmitting control information indicating enabling DMRS for a set of multiple uplink shared channel occasions within a configured grant period, where each uplink shared channel occasion of the set of multiple uplink shared channel occasions includes a set of one or more slots for transmitting a set of multiple uplink shared channel repetitions and where the DMRS is based on a phase continuity between the set of slots. In some examples, the repetition manager 1230 is capable of, configured to, or operable to support a means for receiving the set of multiple uplink shared channel repetitions in the set of slots of a first uplink shared channel occasion of the set of multiple uplink shared channel occasions in accordance with the transmitted control information. In some examples, the UCI manager 1235 is capable of, configured to, or operable to support a means for receiving UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

In some examples, the phase continuity between the set of slots is broken based on the one or more unused slots, the one or more unused slots associated with one or more uplink shared channel repetitions of the set of multiple uplink shared channel repetitions.

In some examples, the UCI indicates that a resource block used in a first slot of the set of slots is unused in a second slot in the set of slots, the first slot adjacent to the second slot in the first uplink shared channel occasion, and where the phase continuity between the set of slots is broken based on the UCI.

In some examples, the phase continuity between the set of slots is broken based on a quantity of silent time units after the one or more unused slots of the first uplink shared channel occasion is greater than a time threshold.

In some examples, the phase continuity between the set of slots is broken based on the UCI indicating an unused slot of the first uplink shared channel occasion or an unused resource block of a first slot of the first uplink shared channel occasion.

In some examples, the UCI indicates that the phase continuity between the set of slots is broken.

Figure 13:
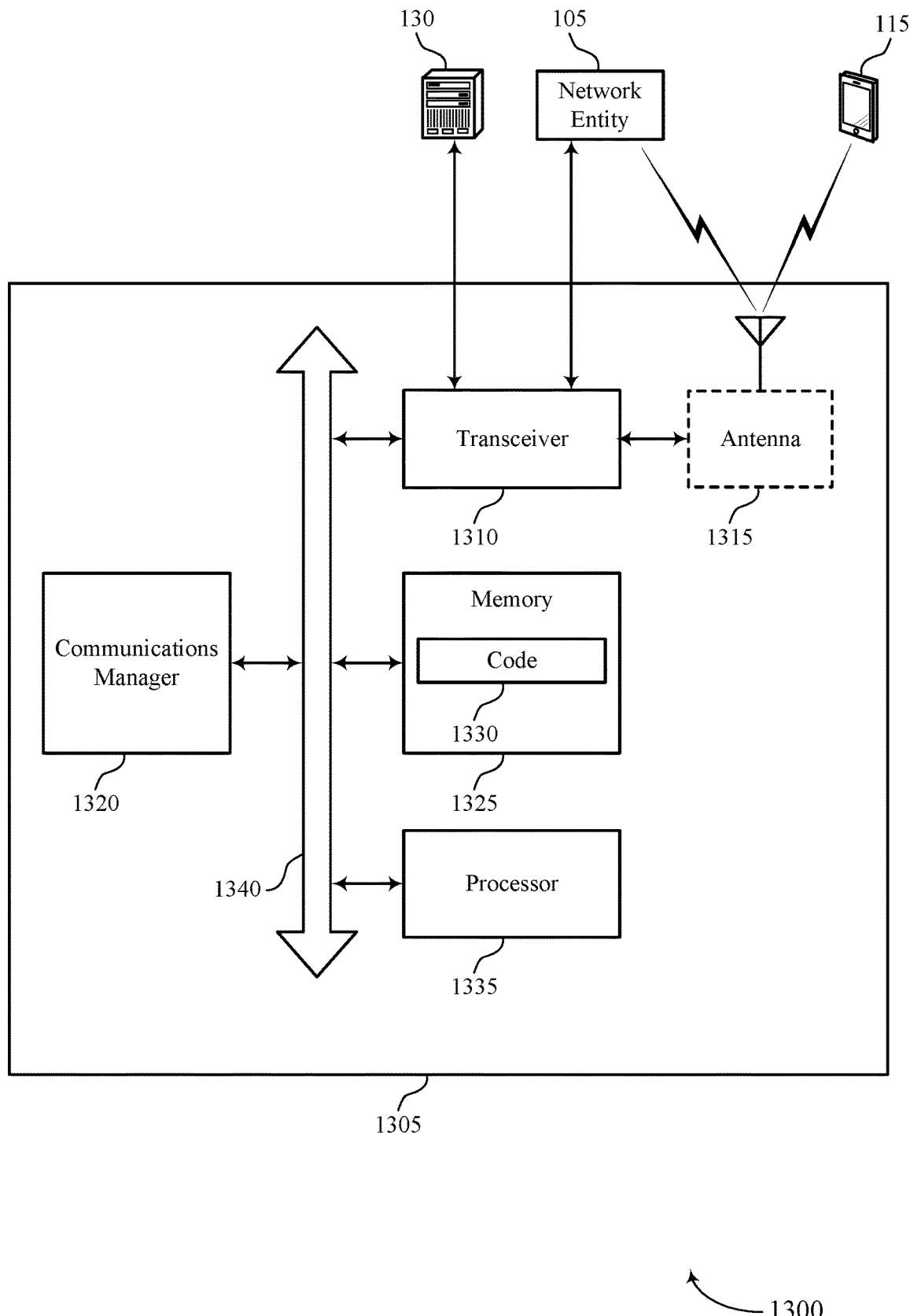
FIG. 13 illustrates a diagram of a system including a device that supports indication of unused uplink shared channel occasions in accordance with one or more aspects of the present disclosure.

FIG. 13 shows a diagram of a system 1300 including a device 1305 that supports indication of unused uplink shared channel occasions in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting indication of unused uplink shared channel occasions). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 is capable of, configured to, or operable to support a means for transmitting control information indicating a set of multiple uplink shared channel occasions within a configured grant period, where each uplink shared channel occasion of the set of multiple uplink shared channel occasions includes a set of multiple slots for transmitting a set of multiple uplink shared channel repetitions. The communications manager 1320 is capable of, configured to, or operable to support a means for receiving the set of multiple uplink shared channel repetitions in the set of multiple slots of a first uplink shared channel occasion of the set of multiple uplink shared channel occasions in accordance with the transmitted control information. The communications manager 1320 is capable of, configured to, or operable to support a means for receiving UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 1320 may support wireless communications at a network entity in accordance with examples as disclosed herein. For example, the communications manager 1320 is capable of, configured to, or operable to support a means for transmitting control information indicating a set of multiple uplink shared channel occasions within a configured grant period, where each uplink shared channel occasion of the set of multiple uplink shared channel occasions includes a set of multiple slots for transmitting a transport block. The communications manager 1320 is capable of, configured to, or operable to support a means for receiving a first transport block in the set of multiple slots of a first uplink shared channel occasion of the set of multiple uplink shared channel occasions in accordance with the transmitted control information. The communications manager 1320 is capable of, configured to, or operable to support a means for receiving UCI indicating that one or more slots of the set of multiple slots of the first uplink shared channel occasion are unused, where the one or more unused slots of the first uplink shared channel occasion are skipped during the configured grant period.

Additionally, or alternatively, the communications manager 1320 may support wireless communications at a network entity in accordance with examples as disclosed herein. For example, the communications manager 1320 is capable of, configured to, or operable to support a means for transmitting control information indicating enabling DMRS for a set of multiple uplink shared channel occasions within a configured grant period, where each uplink shared channel occasion of the set of multiple uplink shared channel occasions includes a set of one or more slots for transmitting a set of multiple uplink shared channel repetitions and where the DMRS is based on a phase continuity between the set of slots. The communications manager 1320 is capable of, configured to, or operable to support a means for receiving the set of multiple uplink shared channel repetitions in the set of slots of a first uplink shared channel occasion of the set of multiple uplink shared channel occasions in accordance with the transmitted control information. The communications manager 1320 is capable of, configured to, or operable to support a means for receiving UCI indicating that one or more slots of the set of slots of the first uplink shared channel occasion for transmitting the set of multiple uplink shared channel repetitions are unused, where the one or more unused slots of the first uplink shared channel occasion are skipped during the configured grant period.

By including or configuring the communications manager 1320 in accordance with examples as described herein, the device 1305 may support techniques for indicating unused resources of a PUSCH occasion for improved communication reliability, reduced latency, improved user experience related to reduced processing, reduced power consumption, more efficient utilization of communication resources, improved coordination between devices, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of indication of unused uplink shared channel occasions as described herein, or the processor 1335 and the memory 1325 may be otherwise configured to perform or support such operations.

Figure 14:
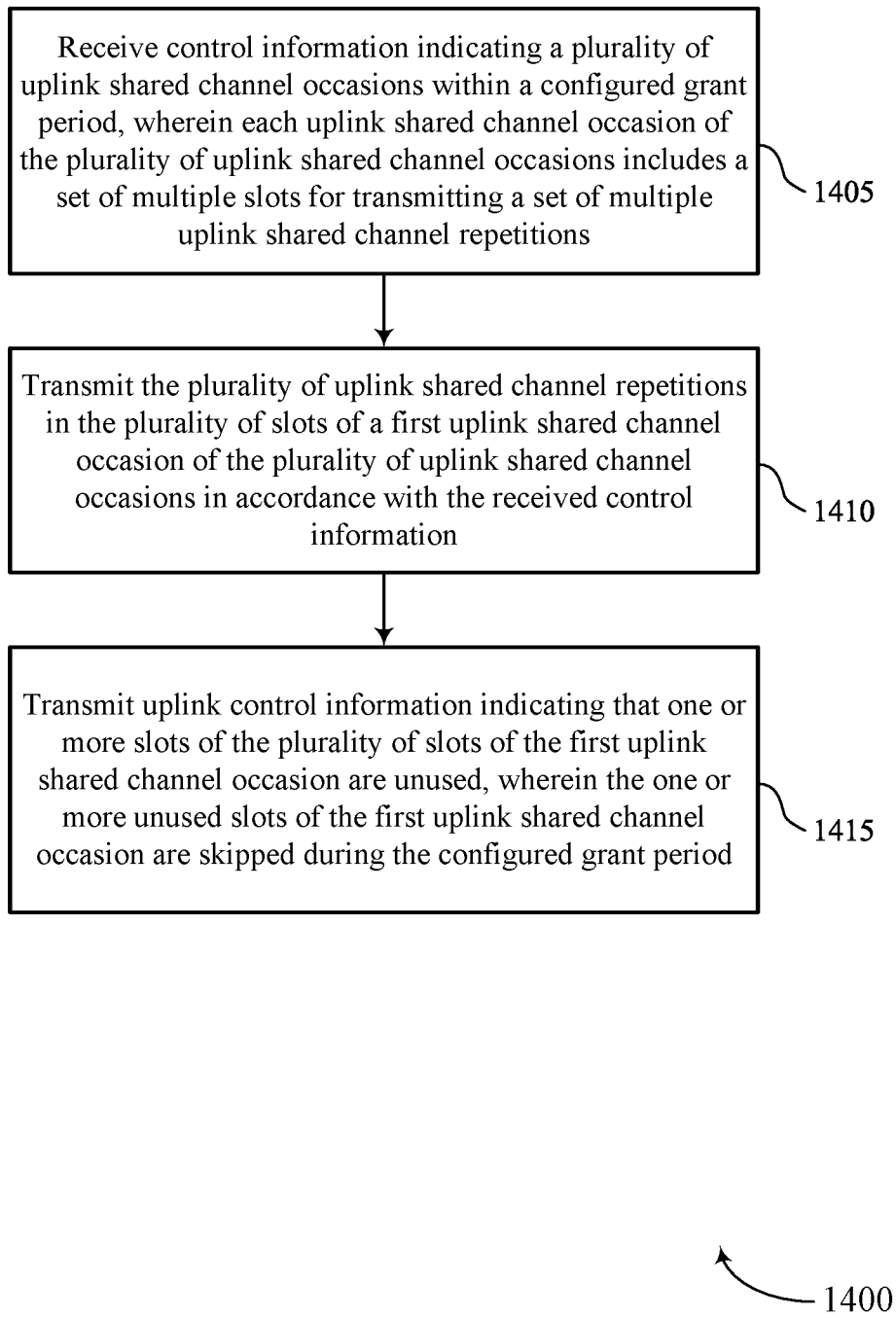
FIGS. 14 through 22 illustrate flowcharts showing methods that support indication of unused uplink shared channel occasions in accordance with one or more aspects of the present disclosure.

FIG. 14 shows a flowchart illustrating a method 1400 that supports indication of unused uplink shared channel occasions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving control information indicating a plurality of uplink shared channel occasions within a configured grant period, wherein each uplink shared channel occasion of the plurality of uplink shared channel occasions includes a plurality of slots for transmitting a plurality of uplink shared channel repetitions. The operations of 1405 may be performed in accordance with examples as disclosed herein. In some examples, aspects of the operations of 1405 may be performed by a control information component 825 as described with reference to FIG. 8.

At 1410, the method may include transmitting the plurality of uplink shared channel repetitions in the plurality of slots of a first uplink shared channel occasion of the plurality of uplink shared channel occasions in accordance with the received control information. The operations of 1410 may be performed in accordance with examples as disclosed herein. In some examples, aspects of the operations of 1410 may be performed by a repetition component 830 as described with reference to FIG. 8.

At 1415, the method may include transmit UCI indicating that one or more slots of the plurality of slots of the first uplink shared channel occasion are unused, wherein the one or more unused slots of the first uplink shared channel occasion are skipped during the configured grant period. The operations of 1415 may be performed in accordance with examples as disclosed herein. In some examples, aspects of the operations of 1415 may be performed by a UCI component 835 as described with reference to FIG. 8.

Figure 15:
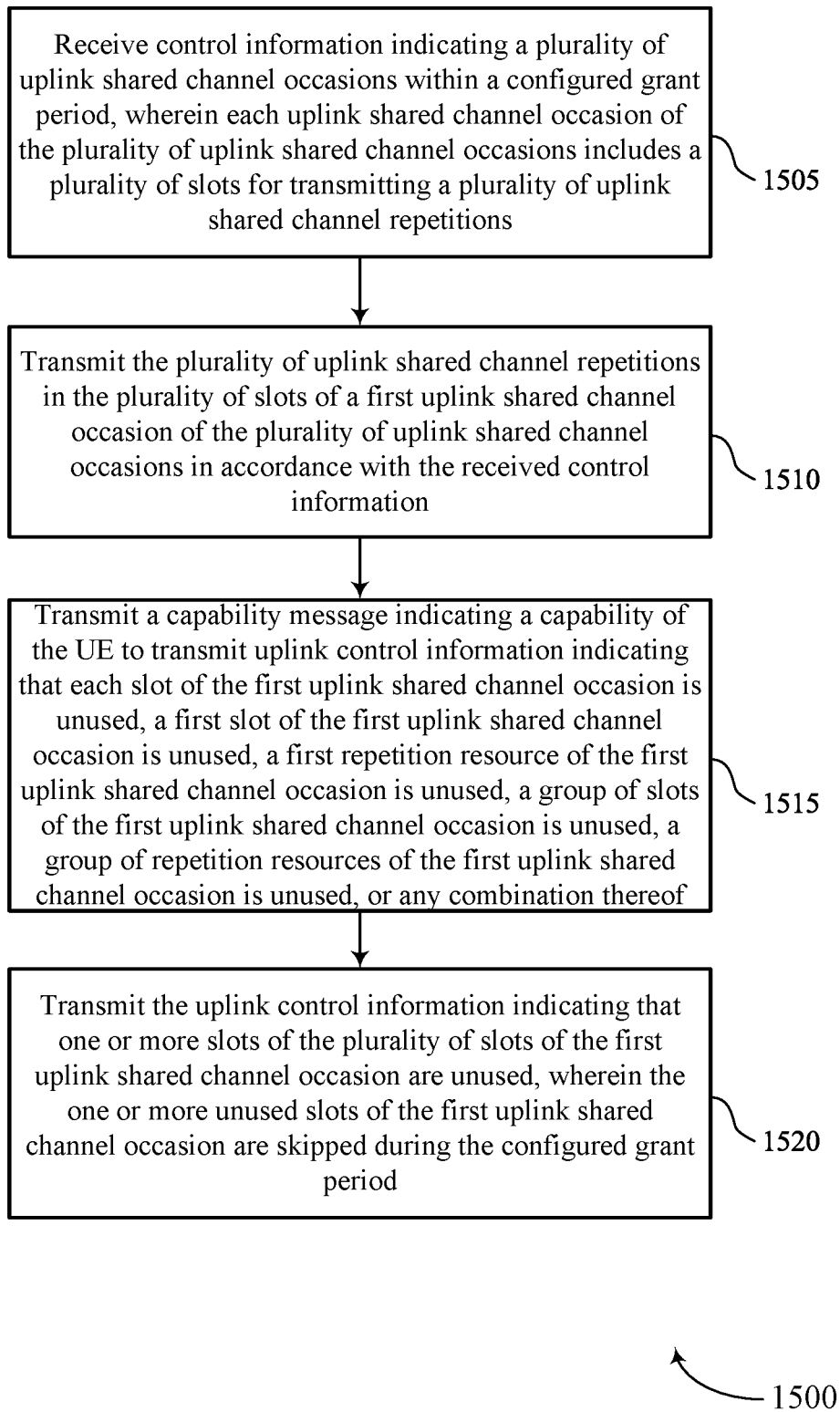

FIG. 15 shows a flowchart illustrating a method 1500 that supports indication of unused uplink shared channel occasions in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving control information indicating a plurality of uplink shared channel occasions within a configured grant period, wherein each uplink shared channel occasion of the plurality of uplink shared channel occasions includes a plurality of slots for transmitting a plurality of uplink shared channel repetitions. The operations of 1505 may be performed in accordance with examples as disclosed herein. In some examples, aspects of the operations of 1505 may be performed by a control information component 825 as described with reference to FIG. 8.

At 1510, the method may include transmitting the plurality of uplink shared channel repetitions in the plurality of slots of a first uplink shared channel occasion of the plurality of uplink shared channel occasions in accordance with the received control information. The operations of 1510 may be performed in accordance with examples as disclosed herein. In some examples, aspects of the operations of 1510 may be performed by a repetition component 830 as described with reference to FIG. 8.

At 1515, the method may include transmitting a capability message indicating a capability of the UE to transmit the UCI indicating that each slot of the first uplink shared channel occasion is unused, a first slot of the first uplink shared channel occasion is unused, a first repetition resource of the first uplink shared channel occasion is unused, a group of slots of the first uplink shared channel occasion is unused, a group of repetition resources of the first uplink shared channel occasion is unused, or any combination thereof. The operations of 1515 may be performed in accordance with examples as disclosed herein. In some examples, aspects of the operations of 1515 may be performed by a capability message component 850 as described with reference to FIG. 8.

At 1520, the method may include transmit UCI indicating that one or more slots of the plurality of slots of the first uplink shared channel occasion are unused, wherein the one or more unused slots of the first uplink shared channel occasion are skipped during the configured grant period. The operations of 1520 may be performed in accordance with examples as disclosed herein. In some examples, aspects of the operations of 1520 may be performed by a UCI component 835 as described with reference to FIG. 8.

Figure 16:
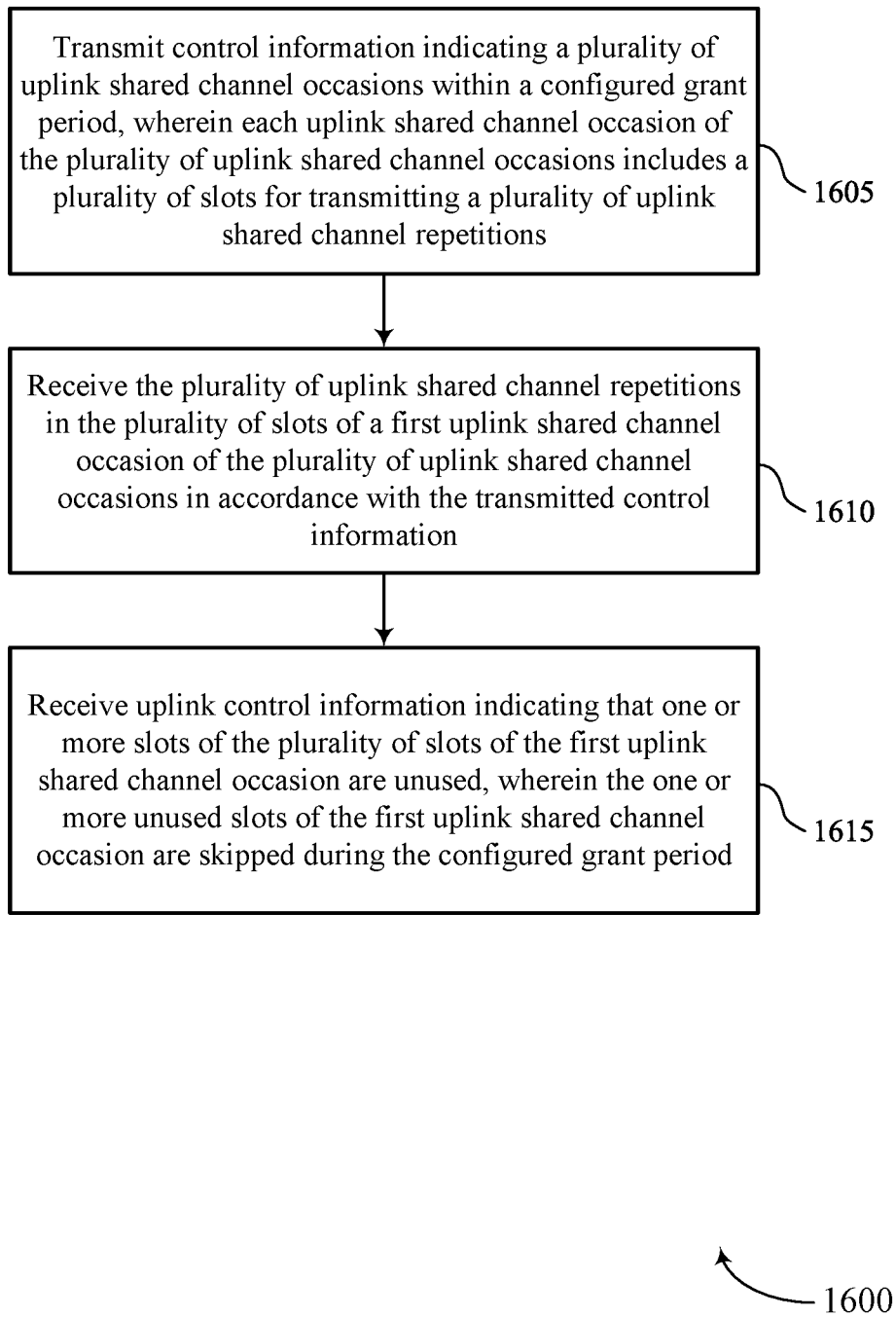

FIG. 16 shows a flowchart illustrating a method 1600 that supports indication of unused uplink shared channel occasions in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include transmitting control information indicating a plurality of uplink shared channel occasions within a configured grant period, wherein each uplink shared channel occasion of the plurality of uplink shared channel occasions includes a plurality of slots for transmitting a plurality of uplink shared channel repetitions. The operations of 1605 may be performed in accordance with examples as disclosed herein. In some examples, aspects of the operations of 1605 may be performed by a control information manager 1225 as described with reference to FIG. 12.

At 1610, the method may include receiving the plurality of uplink shared channel repetitions in the plurality of slots of a first uplink shared channel occasion of the plurality of uplink shared channel occasions in accordance with the transmitted control information. The operations of 1610 may be performed in accordance with examples as disclosed herein. In some examples, aspects of the operations of 1610 may be performed by a repetition manager 1230 as described with reference to FIG. 12.

At 1615, the method may include receiving UCI indicating that one or more slots of the plurality of slots of the first uplink shared channel occasion are unused, wherein the one or more unused slots of the first uplink shared channel occasion are skipped during the configured grant period. The operations of 1615 may be performed in accordance with examples as disclosed herein. In some examples, aspects of the operations of 1615 may be performed by a UCI manager 1235 as described with reference to FIG. 12.

Figure 17:
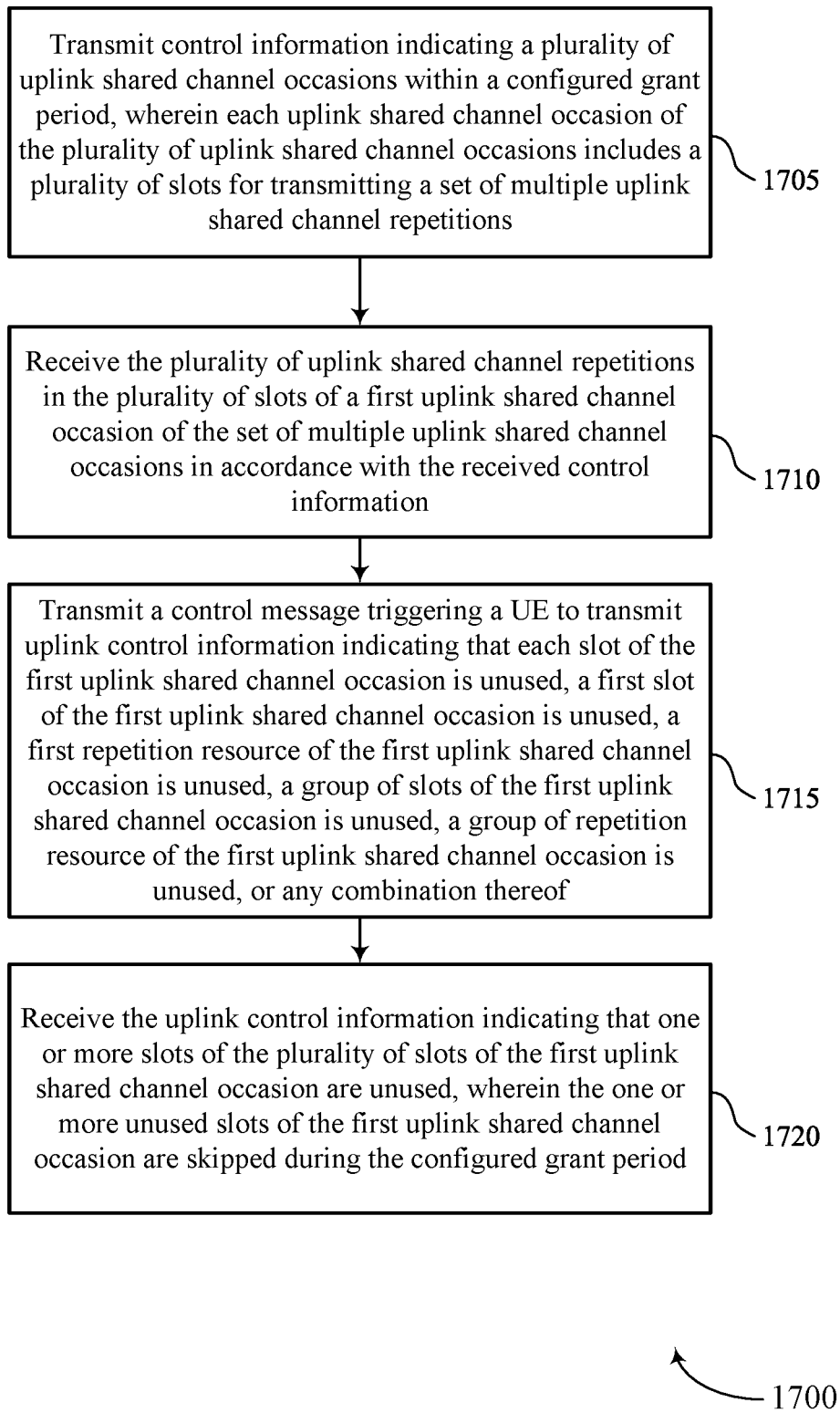

FIG. 17 shows a flowchart illustrating a method 1700 that supports indication of unused uplink shared channel occasions in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1705, the method may include transmitting control information indicating a plurality of uplink shared channel occasions within a configured grant period, wherein each uplink shared channel occasion of the plurality of uplink shared channel occasions includes a plurality of slots for transmitting a plurality of uplink shared channel repetitions. The operations of 1705 may be performed in accordance with examples as disclosed herein. In some examples, aspects of the operations of 1705 may be performed by a control information manager 1225 as described with reference to FIG. 12.

At 1710, the method may include receiving the plurality of uplink shared channel repetitions in the plurality of slots of a first uplink shared channel occasion of the plurality of uplink shared channel occasions in accordance with the transmitted control information. The operations of 1710 may be performed in accordance with examples as disclosed herein. In some examples, aspects of the operations of 1710 may be performed by a repetition manager 1230 as described with reference to FIG. 12.

At 1715, the method may include transmitting a control message triggering a UE to transmit the UCI indicating that each slot of the first uplink shared channel occasion is unused, a first slot of the first uplink shared channel occasion is unused, a group of slots of the first uplink shared channel occasion is unused, or any combination thereof. The operations of 1715 may be performed in accordance with examples as disclosed herein. In some examples, aspects of the operations of 1715 may be performed by a control message manager 1245 as described with reference to FIG. 12.

At 1720, the method may include receiving UCI indicating that one or more slots of the plurality of slots of the first uplink shared channel occasion are unused, wherein the one or more unused slots of the first uplink shared channel occasion are skipped during the configured grant period. The operations of 1720 may be performed in accordance with examples as disclosed herein. In some examples, aspects of the operations of 1720 may be performed by a UCI manager 1235 as described with reference to FIG. 12.

Figure 18:
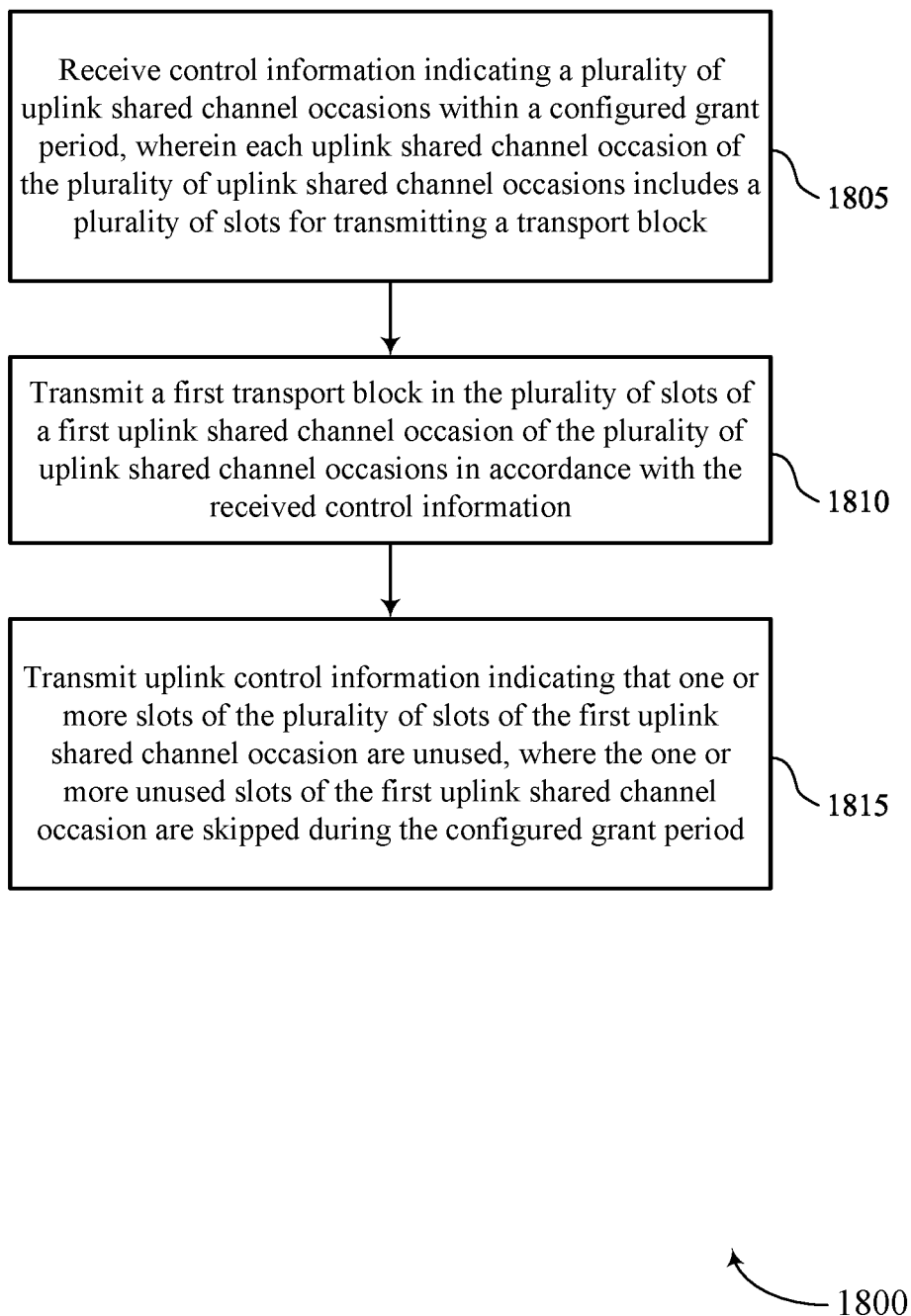

FIG. 18 shows a flowchart illustrating a method 1800 that supports indication of unused uplink shared channel occasions in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1805, the method may include receiving control information indicating a plurality of uplink shared channel occasions within a configured grant period, wherein each uplink shared channel occasion of the plurality of uplink shared channel occasions includes a plurality of slots for transmitting a transport block. The operations of 1805 may be performed in accordance with examples as disclosed herein. In some examples, aspects of the operations of 1805 may be performed by a control information component 825 as described with reference to FIG. 8.

At 1810, the method may include transmitting a first transport block in the plurality of slots of a first uplink shared channel occasion of the plurality of uplink shared channel occasions in accordance with the received control information. The operations of 1810 may be performed in accordance with examples as disclosed herein. In some examples, aspects of the operations of 1810 may be performed by a transport block component 840 as described with reference to FIG. 8.

At 1815, the method may include transmitting UCI indicating that one or more slots of the plurality of slots of the first uplink shared channel occasion are unused, wherein the one or more unused slots of the first uplink shared channel occasion are skipped during the configured grant period. The operations of 1815 may be performed in accordance with examples as disclosed herein. In some examples, aspects of the operations of 1815 may be performed by a UCI component 835 as described with reference to FIG. 8.

Figure 19:
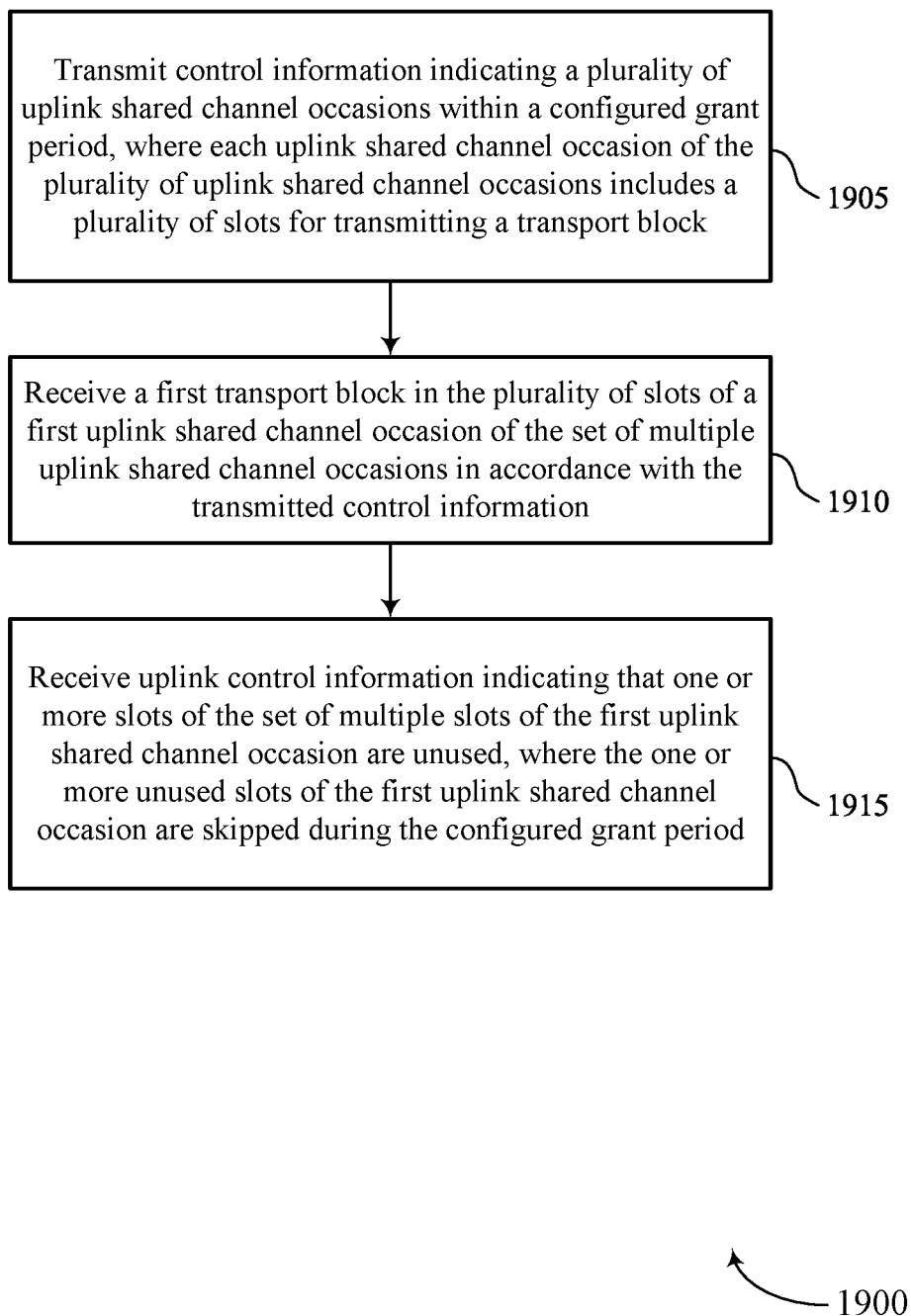

FIG. 19 shows a flowchart illustrating a method 1900 that supports indication of unused uplink shared channel occasions in accordance with aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1905, the method may include transmitting control information indicating a plurality of uplink shared channel occasions within a configured grant period, wherein each uplink shared channel occasion of the plurality of uplink shared channel occasions includes a plurality of slots for transmitting a transport block. The operations of 1905 may be performed in accordance with examples as disclosed herein. In some examples, aspects of the operations of 1905 may be performed by a control information manager 1225 as described with reference to FIG. 12.

At 1910, the method may include receiving a first transport block in the plurality of slots of a first uplink shared channel occasion of the plurality of uplink shared channel occasions in accordance with the transmitted control information. The operations of 1910 may be performed in accordance with examples as disclosed herein. In some examples, aspects of the operations of 1910 may be performed by a transport block manager 1240 as described with reference to FIG. 12.

At 1915, the method may include receiving UCI indicating that one or more slots of the plurality of slots of the first uplink shared channel occasion are unused, wherein the one or more unused slots of the first uplink shared channel occasion are skipped during the configured grant period. The operations of 1915 may be performed in accordance with examples as disclosed herein. In some examples, aspects of the operations of 1915 may be performed by a UCI manager 1235 as described with reference to FIG. 12.

Figure 20:
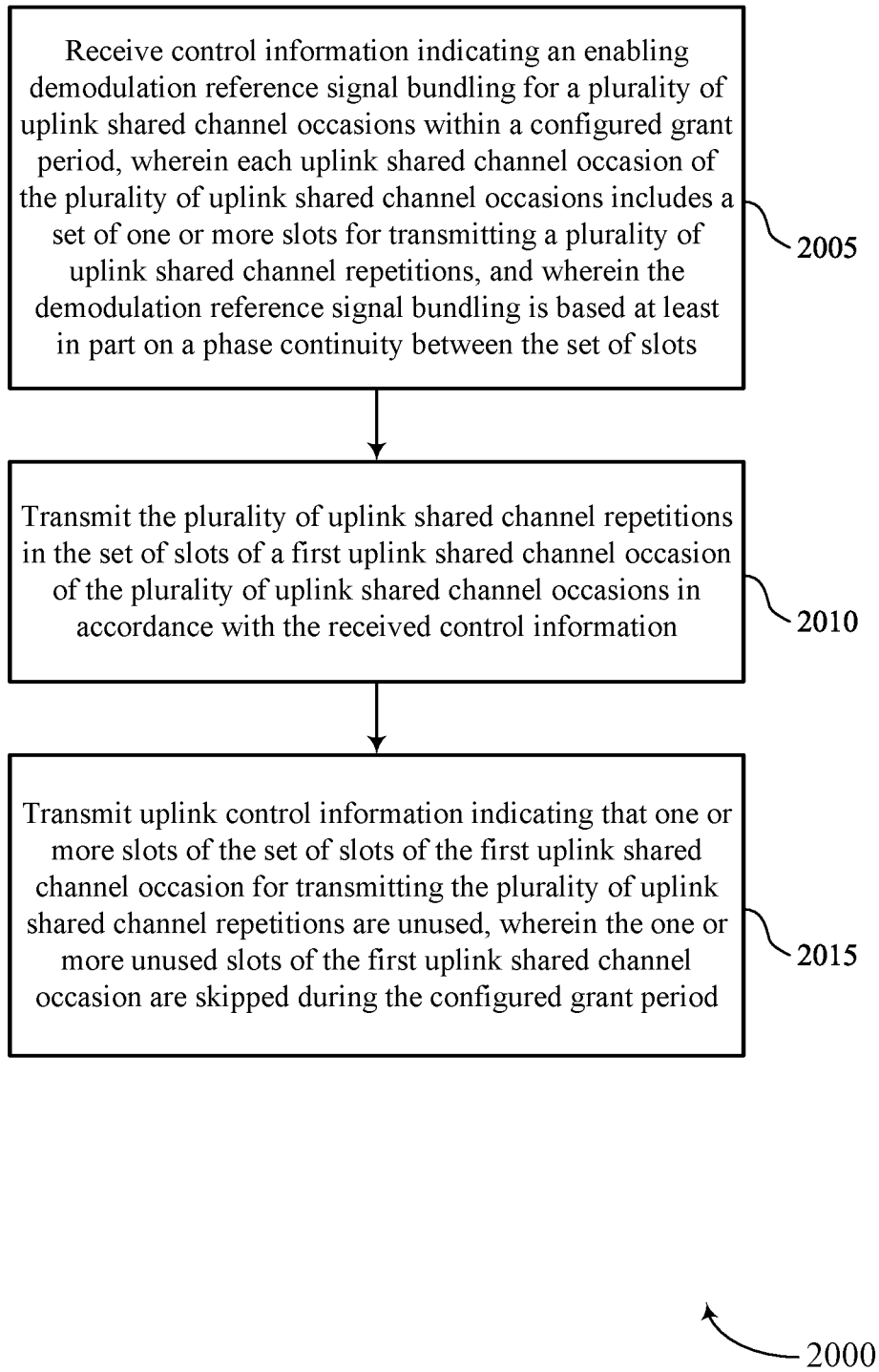

FIG. 20 shows a flowchart illustrating a method 2000 that supports indication of unused uplink shared channel occasions in accordance with aspects of the present disclosure. The operations of the method 2000 may be implemented by a UE or its components as described herein. For example, the operations of the method 2000 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 2005, the method may include receiving control information indicating an enabling DMRS for a plurality of uplink shared channel occasions within a configured grant period, wherein each uplink shared channel occasion of the plurality of uplink shared channel occasions includes a set of one or more slots for transmitting a plurality of uplink shared channel repetitions, and wherein the DMRS is based at least in part on a phase continuity between the set of slots. The operations of 2005 may be performed in accordance with examples as disclosed herein. In some examples, aspects of the operations of 2005 may be performed by a control information component 825 as described with reference to FIG. 8.

At 2010, the method may include transmitting the plurality of uplink shared channel repetitions in the set of slots of a first uplink shared channel occasion of the plurality of uplink shared channel occasions in accordance with the received control information. The operations of 2010 may be performed in accordance with examples as disclosed herein. In some examples, aspects of the operations of 2010 may be performed by a repetition component 830 as described with reference to FIG. 8.

At 2015, the method may include transmitting UCI indicating that one or more slots of the set of slots of the first uplink shared channel occasion for transmitting the plurality of uplink shared channel repetitions are unused, wherein the one or more unused slots of the first uplink shared channel occasion are skipped during the configured grant period. The operations of 2015 may be performed in accordance with examples as disclosed herein. In some examples, aspects of the operations of 2015 may be performed by a UCI component 835 as described with reference to FIG. 8.

Figure 21:
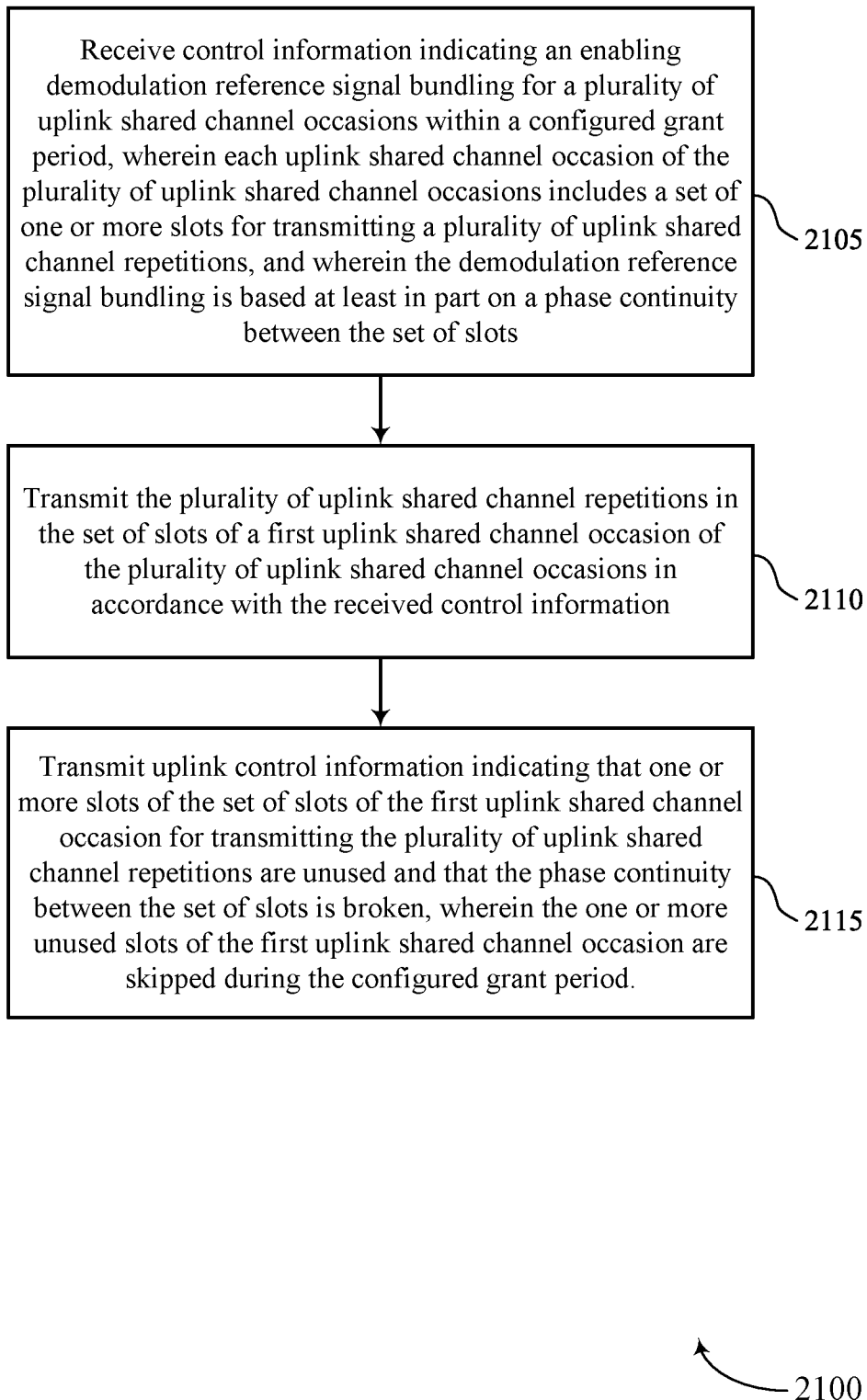

FIG. 21 shows a flowchart illustrating a method 2100 that supports indication of unused uplink shared channel occasions in accordance with aspects of the present disclosure. The operations of the method 2100 may be implemented by a UE or its components as described herein. For example, the operations of the method 2100 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 2105, the method may include receiving control information indicating an enabling DMRS for a plurality of uplink shared channel occasions within a configured grant period, wherein each uplink shared channel occasion of the plurality of uplink shared channel occasions includes a set of one or more slots for transmitting a plurality of uplink shared channel repetitions, and wherein the DMRS is based at least in part on a phase continuity between the set of slots. The operations of 2105 may be performed in accordance with examples as disclosed herein. In some examples, aspects of the operations of 2105 may be performed by a control information component 825 as described with reference to FIG. 8.

At 2110, the method may include transmitting the plurality of uplink shared channel repetitions in the set of slots of a first uplink shared channel occasion of the plurality of uplink shared channel occasions in accordance with the received control information. The operations of 2110 may be performed in accordance with examples as disclosed herein.

In some examples, aspects of the operations of 2110 may be performed by a repetition component 830 as described with reference to FIG. 8.

At 2115, the method may include transmitting UCI indicating that one or more slots of the set of slots of the first uplink shared channel occasion for transmitting the plurality of uplink shared channel repetitions are unused, wherein the one or more unused slots of the first uplink shared channel occasion are skipped during the configured grant period. The operations of 2115 may be performed in accordance with examples as disclosed herein. In some examples, aspects of the operations of 2115 may be performed by a UCI component 835 as described with reference to FIG. 8.

At 2120, the method may include the UCI indicating that the phase continuity between the set of slots is broken. The operations of 2120 may be performed in accordance with examples as disclosed herein. In some examples, aspects of the operations of 2120 may be performed by a UCI component 835 as described with reference to FIG. 8.

Figure 22:
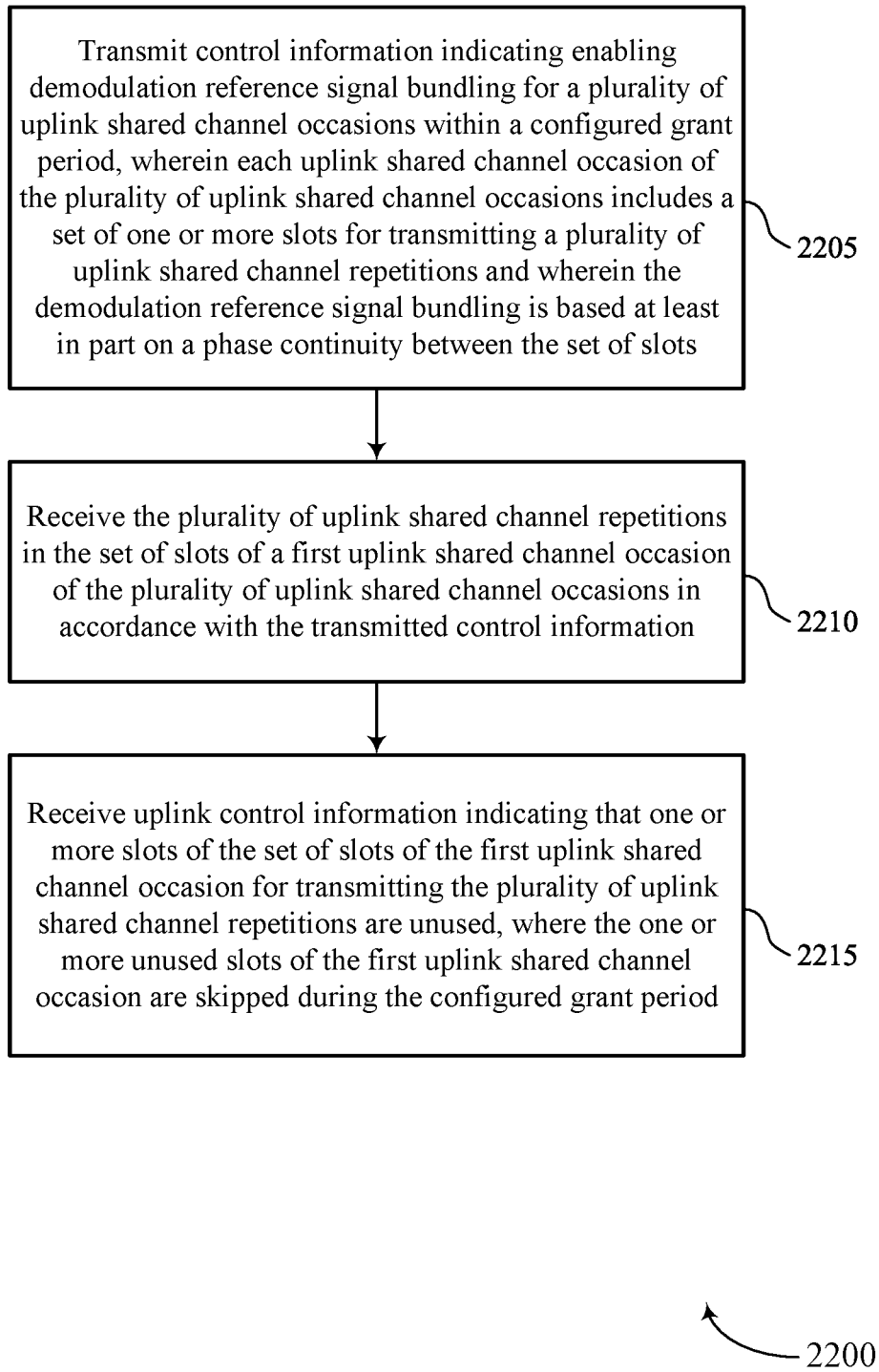

FIG. 22 shows a flowchart illustrating a method 2200 that supports indication of unused uplink shared channel occasions in accordance with aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 2205, the method may include transmitting control information indicating enabling DMRS for a plurality of uplink shared channel occasions within a configured grant period, wherein each uplink shared channel occasion of the plurality of uplink shared channel occasions includes a set of one or more slots for transmitting a plurality of uplink shared channel repetitions and wherein the DMRS is based at least in part on a phase continuity between the set of slots. The operations of 2205 may be performed in accordance with examples as disclosed herein. In some examples, aspects of the operations of 2205 may be performed by a control information manager 1225 as described with reference to FIG. 12.

At 2210, the method may include receiving the plurality of uplink shared channel repetitions in the set of slots of a first uplink shared channel occasion of the plurality of uplink shared channel occasions in accordance with the transmitted control information. The operations of 2210 may be performed in accordance with examples as disclosed herein. In some examples, aspects of the operations of 2210 may be performed by a repetition manager 1230 as described with reference to FIG. 12.

At 2215, the method may include receiving UCI indicating that one or more slots of the set of slots of the first uplink shared channel occasion for transmitting the plurality of uplink shared channel repetitions are unused, wherein the one or more unused slots of the first uplink shared channel occasion are skipped during the configured grant period. The operations of 2215 may be performed in accordance with examples as disclosed herein. In some examples, aspects of the operations of 2215 may be performed by a UCI manager 1235 as described with reference to FIG. 12.

The following provides an overview of aspects of the present disclosure:

Aspect 1: A method for wireless communication at a UE, comprising: receiving control information indicating a plurality of uplink shared channel occasions within a configured grant period, wherein each uplink shared channel occasion of the plurality of uplink shared channel occasions includes a plurality of slots for transmitting a plurality of uplink shared channel repetitions; transmitting the plurality of uplink shared channel repetitions in the plurality of slots of a first uplink shared channel occasion of the plurality of uplink shared channel occasions in accordance with the received control information; and transmit UCI indicating that one or more slots of the plurality of slots of the first uplink shared channel occasion are unused, wherein the one or more unused slots of the first uplink shared channel occasion are skipped during the configured grant period.

Aspect 2: The method of aspect 1, wherein transmitting the UCI comprises: transmitting, via the UCI, a bit indicating that each slot of the plurality of slots of the first uplink shared channel occasion of the plurality of uplink shared channel occasions is unused for transmitting the plurality of uplink shared channel repetitions associated with the first uplink shared channel occasion.

Aspect 3: The method of any of aspects 1 through 2, wherein transmitting the UCI comprises: transmitting, via the UCI, a bit indicating that a first slot of the first uplink shared channel occasion or a first repetition resource of the first uplink shared channel occasion is unused for transmitting a first uplink shared channel repetition of the plurality of uplink shared channel repetitions associated with the first uplink shared channel occasion.

Aspect 4: The method of aspect 3, wherein the UCI indicates that a resource block of a plurality of resource blocks of the first slot or the first repetition resource is unused for transmitting the first uplink shared channel repetition of the plurality of uplink shared channel repetitions associated with the first uplink shared channel occasion.

Aspect 5: The method of any of aspects 3 through 4, wherein the UCI indicates that a resource block of a plurality of resource blocks is unused for transmitting the plurality of uplink shared channel repetitions via the one or more slots of the plurality of slots in the first uplink shared channel occasion.

Aspect 6: The method of any of aspects 1 through 5, wherein transmitting the UCI comprises: transmitting, via the UCI, a bit indicating that a group of slots of the first uplink shared channel occasion or a group of repetition resources of the first uplink shared channel occasion is unused for transmitting the plurality of uplink shared channel repetitions associated with the first uplink shared channel occasion.

Aspect 7: The method of any of aspects 1 through 6, further comprising: receiving a control message triggering the UE to transmit the UCI indicating that each slot of the first uplink shared channel occasion is unused, a first slot of the first uplink shared channel occasion is unused, a first repetition resource of the first uplink shared channel occasion is unused, a group of slots of the first uplink shared channel occasion is unused, a group of repetition resources of the first uplink shared channel occasion is unused, or any combination thereof.

Aspect 8: The method of any of aspects 1 through 7, further comprising: transmitting a capability message indicating a capability of the UE to transmit the UCI indicating that each slot of the first uplink shared channel occasion is unused, a first slot of the first uplink shared channel occasion is unused, a first repetition resource of the first uplink shared channel occasion is unused, a group of slots of the first uplink shared channel occasion is unused, a group of repetition resources of the first uplink shared channel occasion is unused, or any combination thereof.

Aspect 9: The method of aspect 8, wherein the capability message indicates the capability of the UE to transmit the UCI indicating that each slot of the first uplink shared channel occasion is unused based at least in part on a power level of the UE satisfying a power level threshold, a complexity level of the UE, a UE type, or any combination thereof.

Aspect 10: A method for wireless communication at a network entity, comprising: transmitting control information indicating a plurality of uplink shared channel occasions within a configured grant period, wherein each uplink shared channel occasion of the plurality of uplink shared channel occasions includes a plurality of slots for transmitting a plurality of uplink shared channel repetitions; receiving the plurality of uplink shared channel repetitions in the plurality of slots of a first uplink shared channel occasion of the plurality of uplink shared channel occasions in accordance with the transmitted control information; and receiving UCI indicating that one or more slots of the plurality of slots of the first uplink shared channel occasion are unused, wherein the one or more unused slots of the first uplink shared channel occasion are skipped during the configured grant period.

Aspect 11: The method of aspect 10, wherein receiving the UCI comprises: receiving, via the UCI, a bit indicating that each slot of the plurality of slots of the first uplink shared channel occasion of the plurality of uplink shared channel occasions is unused for transmitting the plurality of uplink shared channel repetitions associated with the first uplink shared channel occasion.

Aspect 12: The method of any of aspects 10 through 11, wherein receiving the UCI comprises: receiving, via the UCI, a bit indicating that a first slot of the first uplink shared channel occasion or a first repetition resource of the first uplink shared channel occasion is unused for transmitting a first uplink shared channel repetition of the plurality of uplink shared channel repetitions associated with the first uplink shared channel occasion.

Aspect 13: The method of aspect 12, wherein the UCI indicates that a resource block of a plurality of resource blocks of the first slot or a first repetition resource is unused for transmitting the first uplink shared channel repetition of the plurality of uplink shared channel repetitions associated with the first uplink shared channel occasion.

Aspect 14: The method of any of aspects 12 through 13, wherein the UCI indicates that a resource block of a plurality of resource blocks is unused for transmitting the plurality of uplink shared channel repetitions via one or more slots of a plurality of slots in the first uplink shared channel occasion.

Aspect 15: The method of any of aspects 10 through 14, wherein receiving the UCI comprises: receiving, via the UCI, a bit indicating that a group of slots of the first uplink shared channel occasion or a group of repetition resources of the first uplink shared channel occasion is unused for transmitting the plurality of uplink shared channel repetitions associated with the first uplink shared channel occasion.

Aspect 16: The method of any of aspects 10 through 15, further comprising: transmitting a control message triggering a UE to transmit the UCI indicating that each slot of the first uplink shared channel occasion is unused, a first slot of the first uplink shared channel occasion is unused, a group of slots of the first uplink shared channel occasion is unused, or any combination thereof.

Aspect 17: The method of any of aspects 10 through 16, further comprising: receiving a capability message indicating a capability of a UE to transmit the UCI indicating that each slot of the first uplink shared channel occasion is unused, a first slot of the first uplink shared channel occasion is unused, a first repetition resource of the first uplink shared channel occasion is unused, a group of slots of the first uplink shared channel occasion are unused, a group of repetition resources of the first uplink shared channel occasion are unused, or any combination thereof.

Aspect 18: The method of aspect 17, wherein the capability message indicates the capability of the UE to transmit the UCI indicating that each slot of the first uplink shared channel occasion is unused based at least in part on a power level of the UE satisfying a power level threshold, a complexity level of the UE, or a UE type, or any combination thereof.

Aspect 19: A method for wireless communications at a UE, comprising: receiving control information indicating a plurality of uplink shared channel occasions within a configured grant period, wherein each uplink shared channel occasion of the plurality of uplink shared channel occasions comprises a plurality of slots for transmitting a transport block; transmitting a first transport block in the plurality of slots of a first uplink shared channel occasion of the plurality of uplink shared channel occasions in accordance with the received control information; and transmitting UCI indicating that one or more slots of the plurality of slots of the first uplink shared channel occasion are unused, wherein the one or more unused slots of the first uplink shared channel occasion are skipped during the configured grant period.

Aspect 20: The method of aspect 19, wherein transmitting the UCI comprises: transmitting, via the UCI, a bit indicating that each slot of the plurality of slots of the first uplink shared channel occasion of the plurality of uplink shared channel occasions is unused for transmitting the first transport block associated with the first uplink shared channel occasion.

Aspect 21: The method of any of aspects 19 through 20, wherein transmitting the UCI comprises: transmitting, via the UCI, a bit indicating that a first slot of the first uplink shared channel occasion is unused for transmitting the first transport block associated with the first uplink shared channel occasion.

Aspect 22: A method for wireless communications at a network entity, comprising: transmitting control information indicating a plurality of uplink shared channel occasions within a configured grant period, wherein each uplink shared channel occasion of the plurality of uplink shared channel occasions comprises a plurality of slots for transmitting a transport block; receiving a first transport block in the plurality of slots of a first uplink shared channel occasion of the plurality of uplink shared channel occasions in accordance with the transmitted control information; and receiving UCI indicating that one or more slots of the plurality of slots of the first uplink shared channel occasion are unused, wherein the one or more unused slots of the first uplink shared channel occasion are skipped during the configured grant period.

Aspect 23: The method of aspect 22, wherein receiving the UCI comprises: receiving, via the UCI, a bit indicating that each slot of the plurality of slots of the first uplink shared channel occasion of the plurality of uplink shared channel occasions in unused for transmitting the first transport block associated with the first uplink shared channel occasion.

Aspect 24: The method of any of aspects 22 through 23, wherein receiving the UCI comprises: transmitting, via the UCI, a bit indicating that a first slot of the first uplink shared channel occasion is unused for transmitting the first transport block associated with the first uplink shared channel occasion.

Aspect 25: A method for wireless communications at a UE, comprising: receiving control information indicating an enabling DMRS bundling for a plurality of uplink shared channel occasions within a configured grant period, wherein each uplink shared channel occasion of the plurality of uplink shared channel occasions comprises a set of one or more slots for transmitting a plurality of uplink shared channel repetitions, and wherein the DMRS bundling is based at least in part on a phase continuity between the set of slots; transmitting the plurality of uplink shared channel repetitions in the set of slots of a first uplink shared channel occasion of the plurality of uplink shared channel occasions in accordance with the received control information; and transmitting UCI indicating that one or more slots of the set of slots of the first uplink shared channel occasion for transmitting the plurality of uplink shared channel repetitions are unused, wherein the one or more unused slots of the first uplink shared channel occasion are skipped during the configured grant period.

Aspect 26: The method of aspect 25, wherein the phase continuity between the set of slots is broken based at least in part on the one or more unused slots, the one or more unused slots associated with one or more uplink shared channel repetitions of the plurality of uplink shared channel repetitions.

Aspect 27: The method of any of aspects 25 through 26, wherein the UCI indicates that a resource block used in a first slot of the set of slots is unused in a second slot in the set of slots, the first slot adjacent to the second slot in the first uplink shared channel occasion, and wherein the phase continuity between the set of slots is broken based at least in part on the UCI.

Aspect 28: The method of any of aspects 25 through 27, wherein the phase continuity between the set of slots is broken based at least in part on a quantity of silent time units after the one or more unused slots of the first uplink shared channel occasion is greater than a time threshold.

Aspect 29: The method of any of aspects 25 through 28, further comprising: the phase continuity between the set of slots is broken based at least in part on the UCI indicating an unused slot of the first uplink shared channel occasion or an unused resource block of a first slot of the first uplink shared channel occasion.

Aspect 30: The method of any of aspects 25 through 29, wherein the UCI indicates that the phase continuity between the set of slots is broken.

Aspect 31: A method for wireless communications at a network entity, comprising: transmitting control information indicating enabling DMRS bundling for a plurality of uplink shared channel occasions within a configured grant period, wherein each uplink shared channel occasion of the plurality of uplink shared channel occasions comprises a set of one or more slots for transmitting a plurality of uplink shared channel repetitions and wherein the DMRS bundling is based at least in part on a phase continuity between the set of slots; receiving the plurality of uplink shared channel repetitions in the set of slots of a first uplink shared channel occasion of the plurality of uplink shared channel occasions in accordance with the transmitted control information; and receiving UCI indicating that one or more slots of the set of slots of the first uplink shared channel occasion for transmitting the plurality of uplink shared channel repetitions are unused, wherein the one or more unused slots of the first uplink shared channel occasion are skipped during the configured grant period.

Aspect 32: The method of aspect 31, wherein the phase continuity between the set of slots is broken based at least in part on the one or more unused slots, the one or more unused slots associated with one or more uplink shared channel repetitions of the plurality of uplink shared channel repetitions.

Aspect 33: The method of any of aspects 31 through 32, wherein the UCI indicates that a resource block used in a first slot of the set of slots is unused in a second slot in the set of slots, the first slot adjacent to the second slot in the first uplink shared channel occasion, and wherein the phase continuity between the set of slots is broken based at least in part on the UCI.

Aspect 34: The method of any of aspects 31 through 33, wherein the phase continuity between the set of slots is broken based at least in part on a quantity of silent time units after the one or more unused slots of the first uplink shared channel occasion is greater than a time threshold.

Aspect 35: The method of any of aspects 31 through 34, wherein the phase continuity between the set of slots is broken based at least in part on the UCI indicating an unused slot of the first uplink shared channel occasion or an unused resource block of a first slot of the first uplink shared channel occasion.

Aspect 36: The method of any of aspects 31 through 35, wherein the UCI indicates that the phase continuity between the set of slots is broken.

Aspect 37: An apparatus for wireless communication at a UE, comprising a processor; memory coupled with the processor; and instructions stored in the memory and executable by the processor to cause the apparatus to perform a method of any of aspects 1 through 9.

Aspect 38: An apparatus for wireless communication at a UE, comprising at least one means for performing a method of any of aspects 1 through 9.

Aspect 39: A non-transitory computer-readable medium storing code for wireless communication at a UE, the code comprising instructions executable by a processor to perform a method of any of aspects 1 through 9.

Aspect 40: An apparatus for wireless communication at a network entity, comprising a processor; memory coupled with the processor; and instructions stored in the memory and executable by the processor to cause the apparatus to perform a method of any of aspects 10 through 18.

Aspect 41: An apparatus for wireless communication at a network entity, comprising at least one means for performing a method of any of aspects 10 through 18.

Aspect 42: A non-transitory computer-readable medium storing code for wireless communication at a network entity, the code comprising instructions executable by a processor to perform a method of any of aspects 10 through 18.

Aspect 43: An apparatus for wireless communications at a UE, comprising a processor; memory coupled with the processor; and instructions stored in the memory and executable by the processor to cause the apparatus to perform a method of any of aspects 19 through 21.

Aspect 44: An apparatus for wireless communications at a UE, comprising at least one means for performing a method of any of aspects 19 through 21.

Aspect 45: A non-transitory computer-readable medium storing code for wireless communications at a UE, the code comprising instructions executable by a processor to perform a method of any of aspects 19 through 21.

Aspect 46: An apparatus for wireless communications at a network entity, comprising a processor; memory coupled with the processor; and instructions stored in the memory and executable by the processor to cause the apparatus to perform a method of any of aspects 22 through 24.

Aspect 47: An apparatus for wireless communications at a network entity, comprising at least one means for performing a method of any of aspects 22 through 24.

Aspect 48: A non-transitory computer-readable medium storing code for wireless communications at a network entity, the code comprising instructions executable by a processor to perform a method of any of aspects 22 through 24.

Aspect 49: An apparatus for wireless communications at a UE, comprising a processor; memory coupled with the processor; and instructions stored in the memory and executable by the processor to cause the apparatus to perform a method of any of aspects 25 through 30.

Aspect 50: An apparatus for wireless communications at a UE, comprising at least one means for performing a method of any of aspects 25 through 30.

Aspect 51: A non-transitory computer-readable medium storing code for wireless communications at a UE, the code comprising instructions executable by a processor to perform a method of any of aspects 25 through 30.

Aspect 52: An apparatus for wireless communications at a network entity, comprising a processor; memory coupled with the processor; and instructions stored in the memory and executable by the processor to cause the apparatus to perform a method of any of aspects 31 through 36.

Aspect 53: An apparatus for wireless communications at a network entity, comprising at least one means for performing a method of any of aspects 31 through 36.

Aspect 54: A non-transitory computer-readable medium storing code for wireless communications at a network entity, the code comprising instructions executable by a processor to perform a method of any of aspects 31 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
a processor; and
a memory coupled with the processor, with instructions stored in the memory, the instructions being executable by the processor to cause the apparatus to:
receive control information indicating a plurality of uplink shared channel occasions within a configured grant period, wherein each uplink shared channel occasion of the plurality of uplink shared channel occasions includes a plurality of slots for transmitting a plurality of uplink shared channel repetitions;
transmit the plurality of uplink shared channel repetitions in the plurality of slots of a first uplink shared channel occasion of the plurality of uplink shared channel occasions in accordance with the received control information; and
transmit uplink control information indicating that one or more slots of the plurality of slots of the first uplink shared channel occasion are unused, wherein the one or more unused slots of the first uplink shared channel occasion are skipped during the configured grant period.

2. The apparatus of claim 1, wherein the instructions to transmit the uplink control information are executable by the processor to cause the apparatus to:
transmit, via the uplink control information, a bit indicating that each slot of the plurality of slots of the first uplink shared channel occasion of the plurality of uplink shared channel occasions is unused for transmitting the plurality of uplink shared channel repetitions associated with the first uplink shared channel occasion.

3. The apparatus of claim 1, wherein the instructions to transmit the uplink control information are executable by the processor to cause the apparatus to:
transmit, via the uplink control information, a bit indicating that a first slot of the first uplink shared channel occasion or a first repetition resource of the first uplink shared channel occasion is unused for transmitting a first uplink shared channel repetition of the plurality of uplink shared channel repetitions associated with the first uplink shared channel occasion.

4. The apparatus of claim 3, wherein the uplink control information indicates that a resource block of a plurality of resource blocks of the first slot or the first repetition resource is unused for transmitting the first uplink shared channel repetition of the plurality of uplink shared channel repetitions associated with the first uplink shared channel occasion.

5. The apparatus of claim 3, wherein the uplink control information indicates that a resource block of a plurality of resource blocks is unused for transmitting the plurality of uplink shared channel repetitions via the one or more slots of the plurality of slots in the first uplink shared channel occasion.

6. The apparatus of claim 1, wherein the instructions to transmit the uplink control information are executable by the processor to cause the apparatus to:
transmit, via the uplink control information, a bit indicating that a group of slots of the first uplink shared channel occasion or a group of repetition resources of the first uplink shared channel occasion is unused for transmitting the plurality of uplink shared channel repetitions associated with the first uplink shared channel occasion.

7. The apparatus of claim 1, wherein the instructions are further executable by the processor to cause the apparatus to:
receive a control message triggering the UE to transmit the uplink control information indicating that each slot of the first uplink shared channel occasion is unused, a first slot of the first uplink shared channel occasion is unused, a first repetition resource of the first uplink shared channel occasion is unused, a group of slots of the first uplink shared channel occasion is unused, a group of repetition resources of the first uplink shared channel occasion is unused, or any combination thereof.

8. The apparatus of claim 1, wherein the instructions are further executable by the processor to cause the apparatus to:
transmit a capability message indicating a capability of the UE to transmit the uplink control information indicating that each slot of the first uplink shared channel occasion is unused, a first slot of the first uplink shared channel occasion is unused, a first repetition resource of the first uplink shared channel occasion is unused, a group of slots of the first uplink shared channel occasion is unused, a group of repetition resources of the first uplink shared channel occasion is unused, or any combination thereof.

9. The apparatus of claim 8, wherein the capability message indicates the capability of the UE to transmit the uplink control information indicating that each slot of the first uplink shared channel occasion is unused based at least in part on a power level of the UE satisfying a power level threshold, a complexity level of the UE, a UE type, or any combination thereof.

10. An apparatus for wireless communication at a network entity, comprising:
   a processor; and
   a memory coupled with the processor, with instructions stored in the memory, the instructions being executable by the processor to cause the apparatus to:
      transmit control information indicating a plurality of uplink shared channel occasions within a configured grant period, wherein each uplink shared channel occasion of the plurality of uplink shared channel occasions includes a plurality of slots for transmitting a plurality of uplink shared channel repetitions;
      receive the plurality of uplink shared channel repetitions in the plurality of slots of a first uplink shared channel occasion of the plurality of uplink shared channel occasions in accordance with the transmitted control information; and
      receive uplink control information indicating that one or more slots of the plurality of slots of the first uplink shared channel occasion are unused, wherein the one or more unused slots of the first uplink shared channel occasion are skipped during the configured grant period.

11. The apparatus of claim 10, wherein the instructions to receive the uplink control information are executable by the processor to cause the apparatus to:
   receive, via the uplink control information, a bit indicating that each slot of the plurality of slots of the first uplink shared channel occasion of the plurality of uplink shared channel occasions is unused for transmitting the plurality of uplink shared channel repetitions associated with the first uplink shared channel occasion.

12. The apparatus of claim 10, wherein the instructions to receive the uplink control information are executable by the processor to cause the apparatus to:
   receive, via the uplink control information, a bit indicating that a first slot of the first uplink shared channel occasion or a first repetition resource of the first uplink shared channel occasion is unused for transmitting a first uplink shared channel repetition of the plurality of uplink shared channel repetitions associated with the first uplink shared channel occasion.

13. The apparatus of claim 12, wherein the uplink control information indicates that a resource block of a plurality of resource blocks of the first slot or a first repetition resource is unused for transmitting the first uplink shared channel repetition of the plurality of uplink shared channel repetitions associated with the first uplink shared channel occasion.

14. The apparatus of claim 12, wherein the uplink control information indicates that a resource block of a plurality of resource blocks is unused for transmitting the plurality of uplink shared channel repetitions via one or more slots of a plurality of slots in the first uplink shared channel occasion.

15. The apparatus of claim 10, wherein the instructions to receive the uplink control information are executable by the processor to cause the apparatus to:
   receive, via the uplink control information, a bit indicating that a group of slots of the first uplink shared channel occasion or a group of repetition resources of the first uplink shared channel occasion is unused for transmitting the plurality of uplink shared channel repetitions associated with the first uplink shared channel occasion.

16. The apparatus of claim 10, wherein the instructions are further executable by the processor to cause the apparatus to:
   transmit a control message triggering a user equipment (UE) to transmit the uplink control information indicating that each slot of the first uplink shared channel occasion is unused, a first slot of the first uplink shared channel occasion is unused, a group of slots of the first uplink shared channel occasion is unused, or any combination thereof.

17. The apparatus of claim 10, wherein the instructions are further executable by the processor to cause the apparatus to:
   receive a capability message indicating a capability of a UE to transmit the uplink control information indicating that each slot of the first uplink shared channel occasion is unused, a first slot of the first uplink shared channel occasion is unused, a first repetition resource of the first uplink shared channel occasion is unused, a group of slots of the first uplink shared channel occasion are unused, a group of repetition resources of the first uplink shared channel occasion are unused, or any combination thereof.

18. The apparatus of claim 17, wherein the capability message indicates the capability of the UE to transmit the uplink control information indicating that each slot of the first uplink shared channel occasion is unused based at least in part on a power level of the UE satisfying a power level threshold, a complexity level of the UE, or a UE type, or any combination thereof.

19. An apparatus for wireless communications at a user equipment (UE), comprising:
   a processor; and
   a memory coupled with the processor, with instructions stored in the memory, the instructions being executable by the processor to cause the apparatus to:
      receive control information indicating a plurality of uplink shared channel occasions within a configured grant period, wherein each uplink shared channel occasion of the plurality of uplink shared channel occasions comprises a plurality of slots for transmitting a transport block;
      transmit a first transport block in the plurality of slots of a first uplink shared channel occasion of the plurality of uplink shared channel occasions in accordance with the received control information; and
      transmit uplink control information indicating that one or more slots of the plurality of slots of the first uplink shared channel occasion are unused, wherein the one or more unused slots of the first uplink shared channel occasion are skipped during the configured grant period.

20. The apparatus of claim 19, wherein the instructions to transmit the uplink control information are executable by the processor to cause the apparatus to:

transmit, via the uplink control information, a bit indicating that each slot of the plurality of slots of the first uplink shared channel occasion of the plurality of uplink shared channel occasions is unused for transmitting the first transport block associated with the first uplink shared channel occasion.

21. The apparatus of claim 19, wherein the instructions to transmit the uplink control information are executable by the processor to cause the apparatus to:
transmit, via the uplink control information, a bit indicating that a first slot of the first uplink shared channel occasion is unused for transmitting the first transport block associated with the first uplink shared channel occasion.

22. An apparatus for wireless communications at a user equipment (UE), comprising:
a processor; and
a memory coupled with the processor, with instructions stored in the memory, the instructions being executable by the processor to cause the apparatus to:
receive control information indicating an enabling demodulation reference signal bundling for a plurality of uplink shared channel occasions within a configured grant period, wherein each uplink shared channel occasion of the plurality of uplink shared channel occasions comprises a set of one or more slots for transmitting a plurality of uplink shared channel repetitions, and wherein the demodulation reference signal bundling is based at least in part on a phase continuity between the set of slots;
transmit the plurality of uplink shared channel repetitions in the set of slots of a first uplink shared channel occasion of the plurality of uplink shared channel occasions in accordance with the received control information; and
transmit uplink control information indicating that one or more slots of the set of slots of the first uplink shared channel occasion for transmitting the plurality of uplink shared channel repetitions are unused, wherein the one or more unused slots of the first uplink shared channel occasion are skipped during the configured grant period.

23. The apparatus of claim 22, wherein the phase continuity between the set of slots is broken based at least in part on the one or more unused slots, the one or more unused slots associated with one or more uplink shared channel repetitions of the plurality of uplink shared channel repetitions.

24. The apparatus of claim 22, wherein the uplink control information indicates that a resource block used in a first slot of the set of slots is unused in a second slot in the set of slots, the first slot adjacent to the second slot in the first uplink shared channel occasion, and wherein the phase continuity between the set of slots is broken based at least in part on the uplink control information.

25. The apparatus of claim 22, wherein the phase continuity between the set of slots is broken based at least in part on a quantity of silent time units after the one or more unused slots of the first uplink shared channel occasion is greater than a time threshold.

26. The apparatus of claim 22, wherein the instructions are further executable by the processor to cause the apparatus to:
the phase continuity between the set of slots be broken based at least in part on the uplink control information indicating an unused slot of the first uplink shared channel occasion or an unused resource block of a first slot of the first uplink shared channel occasion.

27. The apparatus of claim 22, wherein the uplink control information indicates that the phase continuity between the set of slots is broken.

* * * * *